United States Patent
Ritter et al.

(10) Patent No.: US 11,423,295 B2
(45) Date of Patent: Aug. 23, 2022

(54) DYNAMIC, AUTOMATED FULFILLMENT OF COMPUTER-BASED RESOURCE REQUEST PROVISIONING USING DEEP REINFORCEMENT LEARNING

(71) Applicant: SAP SE, Walldorf (DE)

(72) Inventors: Marcus Ritter, Waldbrunn (DE); Owen Hickey-Moriarty, Wiesloch (DE); Baris Yalcin, Walldorf (DE)

(73) Assignee: SAP SE, Walldorf (DE)

( * ) Notice: Subject to any disclaimer, the term of this patent is extended or adjusted under 35 U.S.C. 154(b) by 1041 days.

(21) Appl. No.: 16/046,865

(22) Filed: Jul. 26, 2018

(65) Prior Publication Data

US 2020/0034701 A1    Jan. 30, 2020

(51) Int. Cl.
*G06N 3/08* (2006.01)
*G06F 9/50* (2006.01)

(52) U.S. Cl.
CPC ............... *G06N 3/08* (2013.01); *G06F 9/50* (2013.01)

(58) Field of Classification Search
CPC ........ G06F 9/50; G06F 9/5005; G06F 9/5011; G06F 9/5022; G06F 9/5027; G06F 30/27; G06F 2207/4822; G06F 11/1476; G06F 11/2263; G06N 3/08
See application file for complete search history.

(56) References Cited

U.S. PATENT DOCUMENTS

| | | | |
|---|---|---|---|
| 6,944,616 B2 * | 9/2005 | Ferguson | G05B 13/0265 706/45 |
| 7,266,492 B2 | 9/2007 | Goodman | |
| 8,370,280 B1 | 2/2013 | Lin et al. | |
| 10,339,470 B1 | 7/2019 | Dutta et al. | |
| 11,227,187 B1 * | 1/2022 | Weinberger | G06N 3/08 |
| 2018/0018577 A1 * | 1/2018 | Fink | G06N 5/022 |
| 2018/0247227 A1 * | 8/2018 | Holtham | G06N 3/0454 |
| 2020/0034750 A1 * | 1/2020 | Ritter | G06N 20/00 |
| 2022/0001181 A1 * | 1/2022 | Zylberberg | A61N 1/36067 |
| 2022/0004863 A1 * | 1/2022 | Park | G16H 50/20 |

OTHER PUBLICATIONS

Abraham, "Artificial neural networks," *handbook of measuring system design*, 8 pages, (2005).

(Continued)

*Primary Examiner* — Sargon N Nano
(74) *Attorney, Agent, or Firm* — Klarquist Sparkman, LLP

(57) ABSTRACT

A system and a process for provisioning a job through a trained machine-learning dynamic provisioning agent is provided herein. An input vector representing the job having one or more job components may be received. One or more additional data vectors representing additional job data may be obtained. For the one or more job components respectively, one or more action values corresponding to one or more provisioning options may be calculated based on the one or more additional data vectors. For the one or more job components respectively, one or more provisioning options for the respective one or more job components may be selected based on the corresponding one or more action values. The one or more selected provisioning options corresponding to the respective one or more job components may be aggregated. The aggregated selected provisioning options may be provided.

15 Claims, 36 Drawing Sheets

(56) References Cited

OTHER PUBLICATIONS

Bellman, "Dynamic Programming," Courier Corporation, cover, copyright and table of contents, 10 pages, (2013).
Brynjolfsson et al., "Frictionless commerce? A comparison of Internet and conventional retailers," *Management science*, 46(4):563-585, (2000).
U.S. Census Bureau, 2010 census redistricting data (public law 94-171) summary file, https://www.census.gov/prod/cen2010/doc/p194-171.pdf, (2011).
Chapelle et al., "Semi-supervised learning," (chapelle, o. et al., eds.; 2006) [book reviews], *IEEE Transactions on Neural Networks*, 20(3):542, 524 pages, (2009).
Chaslot et al, "Monte-Carlo Tree sSarch: A New Framework for Game AI," in AIIDE, *Proceedings of the Fourth Artificial Intelligence and Interactive Digital Entertainment Conference*, pp. 16-17, (2008).
Childers et al., "Hedonic and utilitarian motivations for online retail shopping behavior," *Journal of retailing*, 77(4):511-535 (2002).
Chopde et al., "Landmark based shortest path detection by using a * and havesine formula," *International Journal of Innovative Research in Computer and Communication Engineering*, 1(2):298-302 (2013).
EMarketer Retail, A brief overview of the global ecommerce market, available at: https://retail.emarketer.com/article/brief-overview-of-global-ecommerce-market/59690010ebd40005284d5cc5?ecid=NL1014, 5 pages, (2017).
Gelly et al., "Monte-Carlo Tree Search and Rapid Action Value Estimation In Computer Go," *Artificial Intelligence*, 175(11):1856-1875 (2011).
GoogleDevelopers, Hello World—machine learning receipts 1, YouTube: https://www.youtube.com/watch?v=cKxRvEZd3Mw, accessed Jul. 17, 2018, 3 pages. (2016).
Hastie et al., "Unsupervised Learning," in *The Elements of Statistical Learning*, pp. 485-585, Springer, (2009).
Kaelbling et al., "Reinforcement Learning: A Survey," *Journal of Artificial Intelligence Research*, 4:237-285 (1996).
Ralph L. Keeney, "The Value of Internet Commerce to the Customer," *Management Science*, 45(4): 533-542 (1999).
Kocsis et al., Bandit Based Monte-Carlo Planning, in *European Conference on Machine Learning*, pp. 282-293, Springer (2006).
Kotsiantis et al., Supervised Machine Learning: A Review of Classification Techniques, *Informatica* 31, pp. 249-268 (2007).
LeCun et al., "Deep Learning," *Nature*, vol. 521, pp. 436-444 (2015).
"Free World Cities Database," *MaxMind*, www.maxmind.com/en/free-world-cities-database, accessed Jul. 17, 2018, 3 pages, (2008).
Mnih et al., "Playing Atari with Deep Reinforcement Learning," https://arxiv.org/abs/1312.5602, *arXiv preprint arXiv:1312.5602*, 9 pages, (2013).
Mnih et al., "Human-Level Control Through Deep Reinforcement Learning," *Nature*, vol. 518(7540): pp. 529-533 (2015).
Mohri et al., "Foundations of Machine Learning," MIT press, 427 pages, (2012).
"Amazon Global Fulfillment Center Network," MWPVL, http://www.mwpvl.com/html/amazon-com.html, 40 pages, accessed Jul. 17, 2018, (2018).
Papadimitriou et al., "The Complexity of Markov Decision Process," *LIDS-P-1479* Jun. 1985, 12 pages.
Park et al., "Identifying Key Factors Affecting Consumer Purchase Behavior in an Online Shopping Context," *International Journal of Retail & Distribution Management*, 31(1):16-29 (2003).
Piotrowicz et al., "Introduction to the Special Issue Information Technology in Retail: Toward Omnichannel Retailing," *International Journal of Electronic Commerce*, 18(4):5-16 (2014).
Arthur L. Samuel, "Some Studies in Machine Learning using the game of Checkers," *IBM Journal of Research and Development*, 4(3):210-229 (1959).
Silver et al., "Mastering the Game of Go with Deep Neural Networks and Tree Search," *Nature* 529(7587):484-489 (2016).
Silver et al., "Mastering the game of Go without Human Knowledge," *Nature*, 550(7676):354, 42 pages, (2017).
Richard S. Sutton, "Introduction: The Challenge of Reinforcement Learning," in *Reinforcement Learning*, pp. 1-3, Springer (1992).
Sutton et al., "Reinforcement Learning: An Introduction," vol. 1, MIT press, Cambridge, 445 pages, (1998).
Torkzadeh et al., "Measuring Factors that Influence the Success of Internet Commerce," *Information Systems Research*, 13(2):187-204 (2002).
Van Brummelen, "Heavenly Mathematics: The Forgotten Art of Spherical Trigonometry," Princeton University Press, cover page, copyright and table of contents, 3 pages, 2012.
Verhoef et al., "From multi-channel retailing to omni-channel retailing: introduction to the special issue on multi-channel retailing," *Journal of Retailing*, 91(2):174-181 (2015).
Winands, "Monte-Carlo Tree Search," *Encyclopedia of Computer Graphics and Games*, pp. 1-6 (2015).
Xu, "Order Fullfillment in Online Retailing: What goes Where," PH.D. Thesis, Massachusetts Institute of Technology, 146 pages, (2005).
Zhu, "Semi-Supervised Learning Literature Survey," University of Wisconsin, last modified on Jul. 19, 2008, 60 pages.
"Poisson Distribution," Wikipedia, https://en.wikipedia.org/wiki/Poisson_distribution, visited Jul. 24, 2018, 16 pages.
Non-Final Office Action received in U.S. Appl. No. 16/046,863, dated May 25, 2021, 48 pages.
Melville et al., "Creating diversity in ensembles using artificial data," Information Fusion, vol. 6, Issue 1, 2005, pp. 99-111, ISSN 1566-2535, https://doi.org/10.1016/j.inffus.2004.04.001 (https://www.sciencedirect.com/science/article/pii/S156625350400034X) (Year 2005).
Final Office Action issued in U.S. Appl. No. 16/046,863, filed Nov. 10, 2021, 57 pages.
Lateh et al., "Handling a Small Dataset Problem in Prediction Model by Employ Artificial Data Generation Approach," ICCSCM IOP Publishing, IOP Conf. Series: Journal of Physics: Conf. Series 892 (year 2017), 11 pages.
Russell et al., "Artificial Intelligence: A Modern Approach," Third Edition, Prentice Hall Series in Artificial Intelligence, cover, copyright and table of contents, 10 pages (2011).
Non-Final Office Action received in U.S. Appl. No. 16/046,863, dated May 2, 2022, 38 pages.

* cited by examiner

100 →

Job: $O_n = \begin{pmatrix} p_{0,1} & p_{0,2} & \cdots & p_{0,n} \end{pmatrix}$ — 101

Availability: $I_{m,n} = \begin{pmatrix} p_{1,1} & p_{1,2} & \cdots & p_{1,n} \\ p_{2,1} & p_{2,2} & \cdots & p_{2,n} \\ \vdots & \vdots & \ddots & \vdots \\ p_{m,1} & p_{m,2} & \cdots & p_{m,n} \end{pmatrix}$ — 102

Consignment: $C_{m,n} = \begin{pmatrix} p_{1,1} & p_{1,2} & \cdots & p_{1,n} \\ p_{2,1} & p_{2,2} & \cdots & p_{2,n} \\ \vdots & \vdots & \ddots & \vdots \\ p_{m,1} & p_{m,2} & \cdots & p_{m,n} \end{pmatrix}$ — 103

Distance: $D_m = \begin{pmatrix} d_1 & d_2 & \cdots & d_m \end{pmatrix}$ — 104

Job: $O = \begin{pmatrix} 2 & 2 \end{pmatrix}$ — 106

Availability: $I = \begin{pmatrix} 20 & 20 \\ 20 & 20 \end{pmatrix}$ — 107

Distance: $D = \begin{pmatrix} 500 & 500 \end{pmatrix}$ — 108

Consignment: $C = \begin{pmatrix} 0 & 0 \\ 0 & 0 \end{pmatrix}$ — 109

➡ Job:   O = [ ( 1, 2 ), ( 2, 2 ) ]
➡ Availability, Distance:  I = [ ( 18, 18 ), ( 20, 20 ) ] ; E = [ 50, 100 ]
➡ Delivery:  D = [ ( 2, 2 ), ( 0, 0 ) ]

250 ⟶

➡ Job:   O = [ ( 1, 2 ), ( 2, 2 ) ]
➡ Availability, Distance:  I = [ ( 1-1, 1-1 ), ( 20-1, 20-1 ) ] ; E = [ 50, 100 ]
➡ Delivery:  D = [ ( 0-1, 0-1 ), ( 0-1, 0-1 ) ]

| Input Vector | Parameters | Function |
| --- | --- | --- |
| Vector 1 | [Min: 0, Max: 10] | Random |
| Vector 2 | [Values: "A", "B", "C"] | Even Distribution |
| Vector 3 | [Values/Weights: ("D", 0.2), ("E", 0.1), ("F", 0.1), ("G", 0.5)] | Weighted Selection |
| Vector 4 | | = (vector 1)$^2$ |

| Output Vector | Scoring Function |
| --- | --- |
| Vector A | $= -1(2^{x-1} - 2)$ |
| Vector B | $= \tanh(x-1) - 1$ |

FIG. 11D $$\text{Job:} \quad O_n = \begin{pmatrix} p_{0,1} & p_{0,2} & \cdots & p_{0,n} \end{pmatrix} \quad \text{— 1501}$$

$$\text{Availability:} \quad I_{m,n} = \begin{pmatrix} p_{1,1} & p_{1,2} & \cdots & p_{1,n} \\ p_{2,1} & p_{2,2} & \cdots & p_{2,n} \\ \vdots & \vdots & \ddots & \vdots \\ p_{m,1} & p_{m,2} & \cdots & p_{m,n} \end{pmatrix} \quad \text{— 1502}$$

$$\text{Consignment:} \quad C_{m,n} = \begin{pmatrix} p_{1,1} & p_{1,2} & \cdots & p_{1,n} \\ p_{2,1} & p_{2,2} & \cdots & p_{2,n} \\ \vdots & \vdots & \ddots & \vdots \\ p_{m,1} & p_{m,2} & \cdots & p_{m,n} \end{pmatrix} \quad \text{— 1503}$$

$$\text{Cost:} \quad D_m = \begin{pmatrix} d_1 & d_2 & \cdots & d_m \end{pmatrix} \quad \text{— 1504}$$

FIG. 15A-1

$$\text{Job:} \quad O_3 = \begin{pmatrix} 1 & 2 & 1 \end{pmatrix} \quad \text{— 1506}$$

$$\text{Availability:} \quad I_{3,3} = \begin{pmatrix} 100 & 50 & 100 \\ 120 & 100 & 50 \\ 80 & 0 & 0 \end{pmatrix} \quad \text{— 1507}$$

$$\text{Consignment:} \quad C_{3,3} = \begin{pmatrix} 0 & 0 & 0 \\ 0 & 0 & 0 \\ 0 & 0 & 0 \end{pmatrix} \quad \text{— 1508}$$

$$\text{Cost:} \quad D_3 = \begin{pmatrix} 50 & 250 & 500 \end{pmatrix} \quad \text{— 1509}$$

```
class Parameters():
    def __init__(self):

'Definition of the Sourcing Environment'
        self.max_resources = 2
        self.min_resources = 1
        self.max_sources = 2
        self.min_sources = 1
        self.max_resource_quantity = 2
        self.min_resource_quantity = 1
        self.max_source_cost = 500
        self.min_source_cost = 1
        self.max_source_availability = 100
        self.min_source_availability = 0
```

```
from data_generator import DataGenerator

'generate a training data set'
generator = DataGenerator (use_seed, environment_paramaters)
training_data = generator.generateDataSet (training_episodes, training_seed)
```

```
import numpy as np
from sourcing_request import ProvisioningRequest class DataGenerator():
    def __init__(self, use_seed, environment_parameters):
        # Flag in order to use a random seed for generation
        self.use_seed = use_seed
        self.max_products = environment_parameters.max_resources
        self.min_products = environment_parameters.min_resources
        self.max_sources = environment_parameters.max_sources
        self.min_sources = environment_parameters.min_sources
        '... initialization of all environment parameters'
```

```
' Generates a data set with n provisioning jobs'
def generateDataSet (self, num_orders, generator_seed):
    data_set = [ ]
    # use a specific seed for the generation
    if (self.use_seed == True):
        np.random.seed(generator_seed)
    # generate random data
    else:
        np.random.seed()
    for _ in range(num_orders):
        provisioning_request = ProvisioningRequest (self.max_resources, self.
       min_resources, self.max_resource_quantity, self.min_resource_quantity,
       self.max_sources, self.max_source_cost, self.min_source_cost,
       self.max_source_availability, self.min_source_availability)
        provisioning_request.generate_job()
        provisioning_request.generate_sources()
        data_set.append (provisioning_request)
    return data_set
```

```
'initialize the input vectors'
self.resource_quantities = [ ]
for _ in range (self.max_resource):
        self.resource_quantities.append (0.0)
self.costs = []
stock_vector_template = []
for _in range (self.max_resources):
        stock_vector_template.append (0.0)
self.availability_quantities = [ ]
for _ in range (self.max_sources):
        stock_vector_template_copy = copy.deepcopy (stock_vector_template)
        self.availability_quantities.append (stock_vector_template_copy)
delivery_vector_template = [ ]
for _ in range (self.max_resources):
        delivery_vector_template.append (0.0)
self.delivery = [ ]
for _in range (self.max_sources):
        delivery_vector_template_copy = copy.deepcopy(delivery_vector_template)
        self.delivery.append (delivery_vector_template_copy)
'Generate a job with n resources and m resource quantity/availability'
def generate_job (self):
        self.number_resources = np.random.randint (self.min_resource, self.max_resource)
        for i in range (self.number_resources):
                resource_quantity = np.random.randint (self.min_resource_quantity,self.max_resource_quantity)
                normalized_resource_quantity = normalize_resource_quantity (resource_quantity)
                self.resource_quantities [i] = normalized_resource_quantity
'Generate n sources with different resources available and costs to requestor'
def generate_sources (self):
        self.number_sources = self.max_sources
        for _ in range (self.number_sources):
                distance = np.random.randint (self.min_source_distance, self.max_source_distance)
                normalized_distance = normalize_distance (distance, self.max_source_distance)
                self.distances.append (normalized_distance)
        for i in range (self.number_sources):
                for j in range (self.max_resource):
                        availability_quantity = np.random.randint (self.min_source_availability, self.max_source_availability)
                        if (availability_quantity >=self.availability_complexity_limit):
                                availability_quantity = self.availability_complexity_limit
                        normalized_quantity = normalize_availability_quantity, (availability_quantity)
                        normalized_quantity = round(normalized_quantity, 1)
                                self.availability_quantities [i] [j] = normalized_quantity
```

FIG. 15G

DYNAMIC, AUTOMATED FULFILLMENT OF COMPUTER-BASED RESOURCE REQUEST PROVISIONING USING DEEP REINFORCEMENT LEARNING

FIELD

The present disclosure generally relates to provisioning optimizations, and applications or systems that provide custom provisioning determinations. Particular implementations relate to machine-learning systems to optimize provisioning determinations in real time.

BACKGROUND

Fulfillment of resource requests can be challenging in a variety of contexts, including satisfying requests for computing resources. A request to be filled, or provisioned, can be referred to as a job, but can be referred to by other terms, such as task, request, or order. Job provisioning often requires balancing a multitude of factors for a wide range of possible jobs, such as the nature of where the job originates and possible constraints, and the number, type, urgency, and other factors that may be required for the job, as well as a present state of a provisioning system (e.g., resources that are currently available, locations of such resources, other constraints on the provisioning system, such as other pending jobs, etc.). The problem quickly becomes impossible to solve by calculating the quality of a result for each possible combination (e.g. brute force), or linear optimization. The number of combinations for a job increases exponentially with the problem complexity (e.g. order, such as related to a number of components of a job, and factors involved in balancing job components or job provisioning requirements). While simple heuristics may be used to solve the problem, this generally shows poor quality results for complex jobs. Therefore, there is room for improvement.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A system and a process for provisioning a job is provided herein. One or more input vectors representing the job may be received. The one or more input vectors may include one or more requested resources. A set of actions based on the one or more input vectors may be determined. The one or more requested resources may be provisioned. The provisioning may include, for the one or more requested resources respectively, calculating one or more scores corresponding to the respective actions of the set of actions. The provisioning may further include, for the one or more requested resources respectively, selecting one or more actions of the set of actions for the respective one or more requested resources based on the corresponding one or more calculated scores. The one or more selected actions corresponding to the respective one or more requested resources may be aggregated. The aggregated selected actions for provisioning the one or more requested resources may be provided.

A system and process for training a dynamic provisioning agent is provided herein. A set of training data input vectors representing a job may be trained. The set of training data input vectors may have a job vector having one or more items. A set of sequential states based on the training data input vectors may be determined. A set of available actions based on the training data input vectors may be determined. A provisioning state based on the set of sequential states may be initialized. The one or more items of the job vector may be sequentially provisioned. The sequential provisioning may include selecting an action from the set of available actions, calculating a score for the action based on a scoring function, updating the machine-learning dynamic provisioning agent with the calculated score corresponding to the selected action and the provisioning state, or updating the provisioning state to a next state from the set of sequential states.

A deep-Q network system and process for job provisioning is provided herein. A machine-learning dynamic provisioning agent may be trained. The training may include the following. A set of training data input vectors representing a training job may be generated. The set of training data input vectors may have a training job vector having one or more items. A set of sequential states based on the training data input vectors may be determined. A set of available actions based on the training data input vectors may be determined. A provisioning state based on the set of sequential states may be initialized. The one or more items of the training job vector may be sequentially provisioned. The sequential provisioning may include selecting an action from the set of available actions, calculating a score for the action based on a scoring function, updating the machine-learning dynamic provisioning agent with the calculated score corresponding to the selected action and the provisioning state, and updating the provisioning state to a next state from the set of sequential states.

A production job may be provisioned via the trained machine-learning dynamic provisioning agent. The provisioning may include the following. An input vector representing the production job having one or more job components may be received. One or more additional data vectors representing additional production job data may be obtained. For the one or more job components respectively, one or more action values corresponding to one or more provisioning options may be calculated based on the one or more additional data vectors. For the one or more job components respectively, one or more provisioning options for the respective one or more job components may be selected based on the corresponding one or more action values. The one or more selected provisioning options corresponding to the respective one or more job components may be aggregated. The aggregated selected provisioning options may be provided.

The present disclosure also includes computing systems and tangible, non-transitory computer readable storage media configured to carry out, or including instructions for carrying out, an above-described method. As described herein, a variety of other features and advantages can be incorporated into the technologies as desired.

The foregoing and other objects, features, and advantages of the invention will become more apparent from the following detailed description, which proceeds with reference to the accompanying figures.

BRIEF DESCRIPTION OF THE DRAWINGS

FIG. 1A depicts an example set of input and output vectors for determining a provisioning decision for a job.

FIG. 1B depicts an example set of input and output vectors for a job.

FIG. 11D depicts example tables of a domain and data foundation for generating artificial training data.

FIG. 15A-1 depicts an example set of input and output vectors for training data to train a machine-learning system.

FIG. 15A-2 depicts an example set of generated input and output vectors of training data to train a machine-learning system.

FIG. 15C depicts example code for setting parameters for generating training data.

FIG. 15D depicts example code for a training data generator, and a call to the training data generator.

FIG. 15E depicts example code for defining a training data generator class.

FIG. 15F depicts example code for defining a process or method for generating the training data.

FIG. 15G depicts example code for implementing and executing a training data generator.

DETAILED DESCRIPTION

Figure 2A:
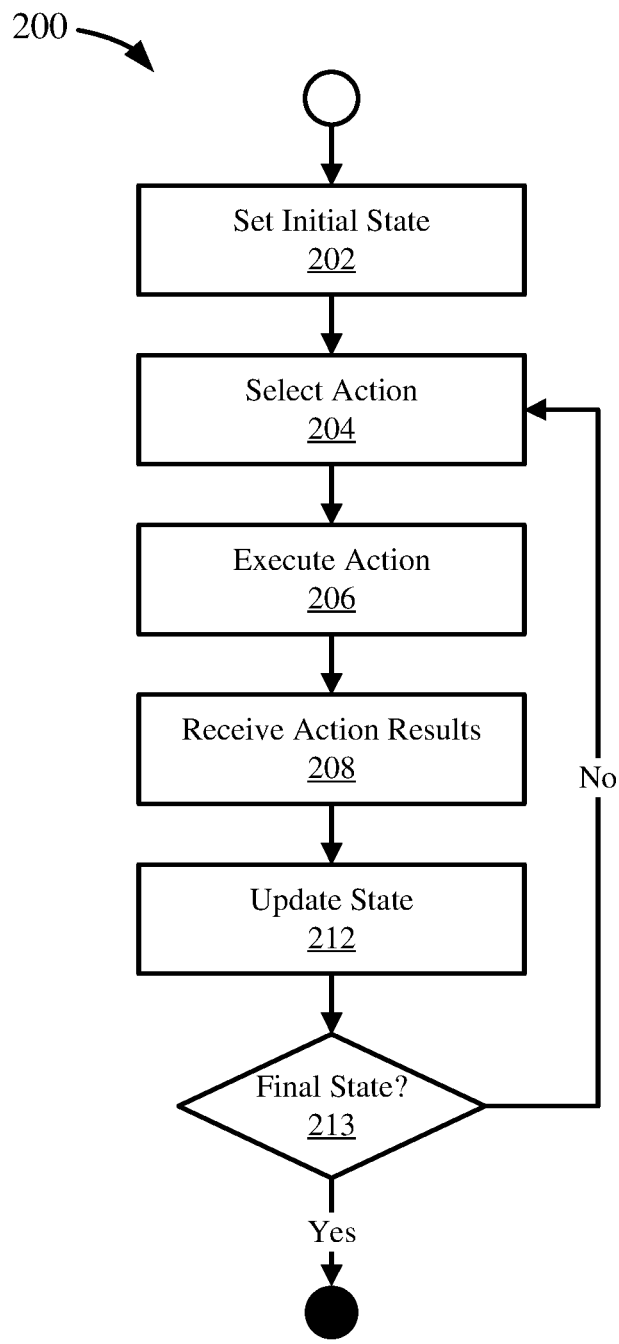
FIG. 2A is a flowchart illustrating a Markov decision process.

A variety of examples are provided herein to illustrate the disclosed technologies. The technologies from any example can be combined with the technologies described in any one or more of the other examples to achieve the scope and spirit of the disclosed technologies as embodied in the claims, beyond the explicit descriptions provided herein. Further, the components described within the examples herein may be combined or recombined as well, as understood by one skilled in the art, to achieve the scope and spirit of the claims.

Example 1—Dynamic Provisioning Overview

Provisioning a job efficiently is generally crucial for many situations. Provisioning can include provisioning of computing resources, such as free memory, processor time, and data needed for processing. Inefficient provisioning can increase computational costs, such as by incurring costs in obtaining a resource (e.g., longer network latency, longer fulfillment time) or by using computing resources less efficiently. In addition to computing costs or inefficiencies, suboptimal provisioning can negatively affect the experiences of end users. However, the disclosed provisioning techniques can be used in other contexts, such as in the automatic fulfillment of online orders. Generally, a job may be a processing job, but may also be a task, an activity, a request (e.g., a resource request), an item or component, such as an item or component in a processing queue (or other data structure) or message, or a collection of components or items, such as collection in a queue or message.

Efficient provisioning may require balancing a multitude of factors, or key performance indicators (KPIs), which may be different for different requestors. For example, one computing system may prioritize provisioning time, while another computing system may prioritize lowest resource use in carrying out a job. Examples of KPIs which may need to be optimized are provisioning or fulfillment time, distance (e.g., number of network hops, physical distance between computing resources, or, in analog world, applications, the distance between an item source to an item destination), provisioning costs (e.g., financial, time, or other costs in obtaining network access or, in the analog world, transporting items), internal costs (e.g., computing resource use for provisioning the job, such as sending and receiving network requests, costs involved in preparing instructions to be sent to other computing systems or to request or use resources, or, in the analog world, costs to prepare an order for shipment), delivery splits (e.g., when all resources requested cannot be obtained from the same source, resource availability at various locations (e.g., data centers, cloud computing locations, etc., or in the analog world, warehouses or other supply sources), resource capacity at various locations, and so on. Provisioning generally means to determine from which source which resource in what amount should be delivered from. The provisioning process can become very complicated very quickly, sometimes containing large numbers of requested resources (e.g. $100s$) with different quantities and other specifications. At the same time, there can be many different sources from which resources for this job could be sourced. With an evaluation function, the quality of a provisioning result can be determined (where which resource will be obtained from, and in what quantity), while considering several KPIs at once. Generally, the amount of combinations increases exponentially with the problem complexity.

As disclosed herein, a dynamic provisioning agent using machine-learning, and especially reinforcement learning, may quickly and efficiently source a job while optimizing multiple KPIs. Generally, a provisioning environment is provided in which the dynamic provisioning agent is trained with actual (e.g., from actual prior transactions involving job processing), generated data (e.g., artificially created data that was not obtained from actual job processing), or a combination thereof, to learn the provisioning task. The provisioning environment may include a function (e.g., a scoring function, which can be referred to as a cost function or a reward function) that evaluates the quality of a provisioning result. By optimizing this function, the dynamic provisioning agent learns to source the jobs while considering several KPIs at once.

To be able to use reinforcement learning, the provisioning process may be modeled as a Markov decision process. Additional rules may be provided which further direct the dynamic provisioning agent while provisioning. In one embodiment, an action and a state space may be provided, using a special form of reinforcement learning, Q-learning, which may use value iteration to determine the optimal policy. The optimal policy can provide an optimized action value function, which in turn can provide an optimized provisioning result when the dynamic provisioning agent is following this policy. Deep reinforcement learning and a neural network may be used for cases with a large state space. The neural network may approximate the state value inputs, which allows the dynamic provisioning agent to learn to provision more complex jobs. In some embodiments, a Monte Carlo tree search may further improve the decision process while provisioning a job.

Such a dynamic provisioning agent may be provided as a service running on a machine-learning GPU cluster. Thus, the dynamic provisioning agent may be called via an API (e.g. sending the required input data to the service will result in a valid provisioning result sent back). Depending on a given user's KPIs, the scoring function may be adjusted based on parameters and the machine-learning model will be trained to those KPIs.

Example 2—Dynamic Provisioning Agent Advantages

The machine-learning dynamic provisioning agent can provide many advantages that have not been previously available. The dynamic provisioning agent can optimize several KPIs at the same time, while also provisioning complex jobs (e.g. large jobs or more disparate jobs). The dynamic provisioning agent may follow predefined, customizable rules (e.g. it can be directed to always try to fulfill a job as far as possible). The dynamic provisioning agent may be flexible, allowing for changes to KPIs used, or their weighting parameters can be adjusted (e.g. to target a different specific performance goal or goals).

Generally, the quality of the determined provisioning results is higher than currently known methods. Moreover, the quality of the determined provisioning results can further improve over time with the collected data and retraining of the dynamic provisioning agent. Thus, the dynamic provisioning agent may actively adapt to changing demands over time. New goals can be adapted either by changing parameters or updating the evaluation functions of the dynamic provisioning agent, such as through function retraining, without the need for implementation of new building blocks or recoding.

More specifically, this means that generally a given user does not need to implement code for special use cases, or otherwise code the dynamic provisioning agent to a specific solution. This dynamic behavior can drastically reduce development time and the potential for error or bug introduction when implementing a new method or goal. The solution is not runtime critical—generally, the dynamic provisioning agent provides real-time provisioning determinations, even for a very complex or exotic job. The dynamic provisioning agent can be deployed as a cloud service and is completely scalable. Generally, no special, proprietary, or potentially protected data is required for training the machine-learning dynamic provisioning agent.

Example 3—Key Performance Indicators and Scoring

Generally, one or more KPIs may be used to measure the quality of single provisioning results, as well as the quality of an entire approach to provisioning. The number and type of specific KPIs used may vary depending on the preferred provisioning optimization for a given user of the dynamic provisioning agent. For example, a data system may have data collections located at less than ten data centers, and smaller data collections located at few hundred other locations, such as local machines on a local networks. In some cases, jobs may be provisioned only from data centers, and the resources of the local machines are not considered for the provisioning process. Furthermore, the source of this job, such as a database or network administrator, may want to minimize the number of provisioning splits, as well as the provisioning times. Additionally, the job requestor may want to balance the load on the data centers, or particular network components (i.e. the data centers should be used equally to provision the jobs).

According to an example that will be used for illustrative purposes, there are three KPIs that need to be optimized: provisioning splits ($v_1$), provisioning time ($v_2$), and data center resource availability (e.g., inventory/load balancing) ($v_3$). A weighted evaluation function may be used to optimize all of these KPIs at the same time. As the quality of a provisioning result can directly depend on these KPIs, this can be a suitable approach to measure the quality of a provisioning result.

Each KPI may be represented by a scoring function. Such a scoring function generally represents numerically how good a particular provisioning option is for the corresponding KPI. In this example, the function may be v(x), where x may be a different factor for each KPI. For example, the number of delivery splits may be represented by $v_1(x) = -1 \cdot (2^{x-1} - 2)$, where x is the number of sources. Thus, with an increasing number of sources, the scoring function for the delivery splits KPI will provide a negative provisioning score. The delivery time may be represented by $v_2(x) = 1 - (x/0.25)$, where x is the distance from the job requestor, or where the provisions or resources should be supplied, to the source. Thus, as the distance increases, the score decreases for the delivery time KPI. The resource availability may be represented by $v_3(x) = \tan h(x-1) - 1$, where x represents the resource quantity (e.g., remaining available memory, CPU cycles, etc.) after deducting the provisioned job components or item(s). Thus, this function generally provides a negative score when the amount of a particular job component is reduced to zero and provides a small reward when remaining available job components is higher than one.

A total score (which may also be referred to as a cost or reward) may be calculated for a given provisioning determination based on the separate KPI scores. Such a total score may be calculated by a weighted evaluation function of the KPI scores; such a calculation may be a weighted sum of the KPI scores, where a higher value indicates a better provisioning solution. Generally, optimizing the provisioning function includes determining the highest total score. In the example, the total scoring function may be $S = a_1 v_1 + a_2 v_2 + a_3 v_3$, where $a_1$, $a_2$, and $a_3$ are weighting coefficients for each of the KPIs. Through these weighting coefficients, the different KPIs may be given varying levels of importance (including adjusting values to be more directly comparable, including so that the KPIs can be equally weighted accounting for different calculation types or result ranges for a particular KPI).

Example 4—Input and Output Vectors

FIG. 1A depicts an example set of input and output vectors 100 for determining a provisioning decision for a job. Such vectors 100 may be the inputs and/or outputs of a dynamic provisioning agent, as disclosed herein. Three input vectors 101, 102, 104 and one output vector 103 may be defined for a system for determining product provisioning for jobs. A single set of these vectors 100 generally constitutes a single job. The job vector 101 may include quantities for the specific job components requested, with each location in the vector representing a specific or known job component (e.g., a particular database table in a database can be represented by a 1 at a particular index or tuple position, which a different table can be represented by a 1 at a different particular index or tuple position); in another embodiment, the vector may include identifiers for the one or more job components.

A job component availability vector 102 may include the quantities of each job component available at known sources (e.g. data centers). The distance vector 104 may include the distance of the component destination (e.g., location or source of a job request) to each of the known sources. A consignment vector 103 may contain the output from the machine-learning system, which may be the quantity of job components sourced from the known sources.

In some embodiments, all the input vectors 101, 102, 104 may be provided to the dynamic provisioning agent as input. In other embodiments, only a subset of the input vectors, such as the job vector 101, may be provided, and the remaining vectors may be obtained by the dynamic provisioning agent from other data sources. For example, a data source may specify particular vectors to be used for particular use case scenarios. Generally, the input vectors 101, 102, 104 may include any information necessary for calculating the various KPIs used in provisioning a job. In some embodiments, the dynamic provisioning agent may obtain some or all of the data necessary for calculating the applicable KPIs from one or more data sources (e.g. a job component availability database, etc.). In some embodiments, the output vector 103 may be provided as an input (e.g., as an argument that is passed by reference or value in an API or function call) for storing the provisioning results as they are generated; in such cases, the output vector 103 may be empty, or zero-filled. In other embodiments, the output vector 103 may not be provided as an input and only received as an output.

FIG. 1B depicts an example set of input and output vectors 105 for a job. For this example, the job vector 106 may have a requested quantity of two for the first job component, and two for the second job component. The job component availability vector 107 may have, for the first source, 20 units of the first job component and 20 units of the second job component; the next row represents the second source and so on (also with 20 units of each of the two job components). The distance vector 108 may have a distance from a provisioning location (e.g., where the job components are to be supplied) to the first source of 500 (e.g. a quantity related to a number of network hops or otherwise representing a network cost(s), or, in the case of analog world applications, kilometers), and 500 to the second source. The output consignment vector 109 may be set to all zero in this example, to represent no output values yet (e.g. act as a vector for holding the actual output).

Example 5—Markov Decision Process

The dynamic provisioning agent may be implemented as a Markov decision process, which takes as input the input vectors as shown in FIG. 1A and outputs a provisioning decision, which may be the consignment vector as shown in FIG. 1A.

Generally, a Markov decision process has a set of environment states, which represent selected states of the set of possible states of the decision process. The set of possible states may be much larger than the set of environment states (states representing selected actions). In some embodiments, a given state may contain all information related to the problem being decided in the Markov decision process, which may include the remaining available states or the current result(s). For job provisioning, generally each state represents a selection of a source for a requested job component. Thus, for the example above and the input vectors shown in FIG. 1B, there may be four states because there are four items being requested (two of the first job component and two of the second job component). This scenario may be represented as:

$$S = (S_1, S_2, S_3, S_4)$$

$S_1$: initial state, pick the first job component
$S_2$: second state, pick the second job component
$S_3$: third state, pick the third job component
$S_4$: terminal state, pick the last job component Further, a Markov decision process generally has a set of available actions, which may be selected by the process at any given state. For job provisioning, generally each action represents selecting a job component to be provisioned from a source. Thus, for the example above and the input vectors shown in FIG. 1B, there may be four available actions because there are two different job components to be provisioned and two different available sources. This scenario may be represented as:

$$A=(A_1, A_2, A_3, A_4)$$

$A_1$: pick job component 1 from source 1
$A_2$: pick job component 2 from source 1
$A_3$: pick job component 1 from source 2
$A_4$: pick job component 2 from source 2

FIG. 2A is a flowchart illustrating a Markov decision process 200. Such a decision process 200 may be implemented as a machine-learning process or system as described herein. The initial state ($S_1$) is set at 202. Setting an initial state may include receiving one or more input vectors for provisioning a job. Setting an initial state may further include accessing one or more data sources to obtain additional input vectors for provisioning a job.

An action is selected, such as from the set of available actions, at 204. In some embodiments, such as during training, the action may be selected randomly. In other embodiments, the action may be selected based on an action value or Q-value.

The action is executed at 206. Executing the action may include updating any input vectors to indicate changes based on the action, such as reducing available job components at a particular component source or reducing the job (e.g., the number of components left to be provisioned for the job). Executing the action may additionally or alternatively include updating the output (e.g. provisioning or consignment vector) to indicate what action was taken. For job provisioning, updating the output may include indicating which job component was consigned (sourced) from which source. Executing the action may include determining the next state based on taking the action.

Executing the action may also include calculating a score for taking the action based on a scoring function. Generally, the scoring function is the same as the scoring function for KPIs as described herein.

The action results are received at 208. Receiving the action results may include receiving the calculated score for the action, and the next state based on taking the action. The score may be maintained at 208, and may be used in part in selecting the next action.

The state is updated at 212. Updating the state may include replacing the current state with the new state received at 208 from executing the action at 206.

The process 200 analyzes the current state at 213. If the current state is not the final state, then the process 200 proceeds to select a next action based on its current state at 204. If the current state is the final state, the process 200 ends (e.g. the job has been fully provisioned).

Based in part on the example above, FIGS. 2B-E illustrate a Markov decision process flow using the decision process 200, input vectors Job, Job Component Availability, and distance, and output vector Provisioning (consignment). Through this example, a solid line from one state to another indicates the action selected for this example, and the dotted lines indicate the other actions that may have been selected, but were not. Thus, this example illustrates that alternative selections could be made and result in a valid outcome, but were not made for this example.

Figure 2B:
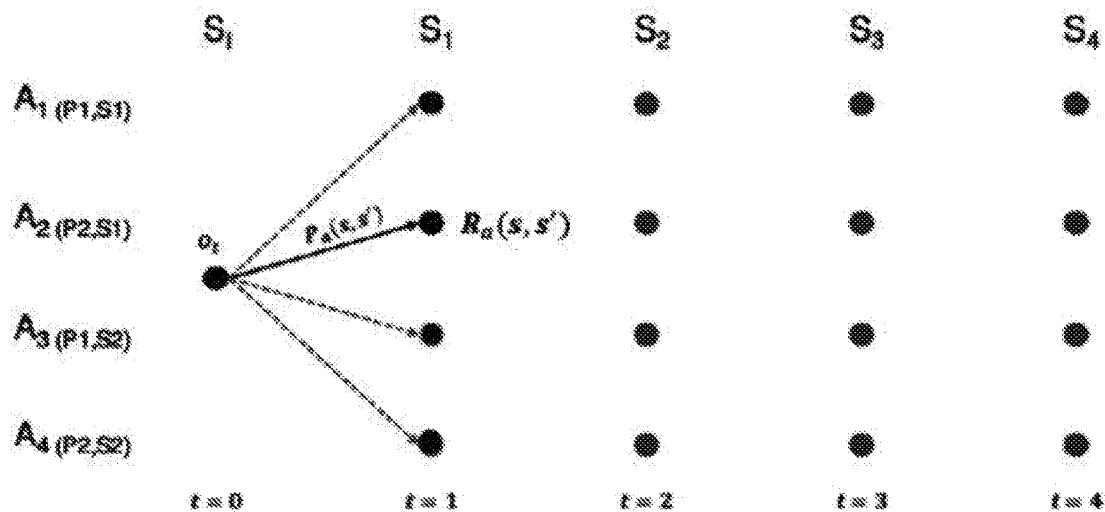
FIG. 2B illustrates an initial state of an example Markov decision process.

In FIG. 2B, each time (t) represents an iteration of the decision process. An initial state of the decision process, in which no item has been sourced yet, is represented as $t_0$. Each time (t) represents an iteration of the decision process. In this example, at each point in time the dynamic sourcing agent selects and performs a random action. Based on this action, the process (or environment) transitions to the next state. $P_a(s, s')$ represents the probability for a given action or transition.

Figure 2C:
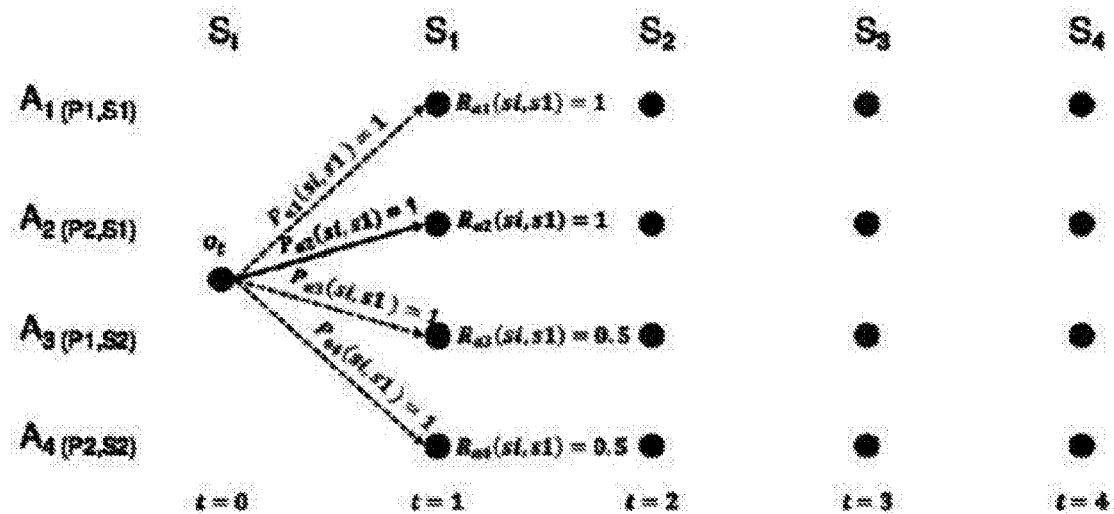
FIG. 2C illustrates a second state of the example Markov decision process.

FIG. 2C illustrates the second state of the decision process, in which one job component has been sourced. Action $A_2$ was selected, and the process transitioned to state $S_1$. Further, the vectors were updated to indicate which product was selected from which source.

The dynamic provisioning agent also received a score for the action performed, as represented by $R_a(s, s')$. The score may be calculated by the scoring function, as described herein. Based on the example KPIs above, the scoring function may be represented here as: $R_a = a_1 R_1(D_a) + a_2 R_2(E_a) + a_3 R_3(I_a)$. $R_a$ is the total provisioning score for the performed action, and $R_1$-$R_3$ are the scores for the particular KPIs. $D_a$, $E_a$, $I_a$ represent the input vector data as shown. Thus, at every step in time or iteration at which an action $a_t$ is performed for state $s_t$, the dynamic provisioning agent may calculate $r_{t+1} \rightarrow R_a(s_t, a_t, s_{t+1})$.

Figure 2D:
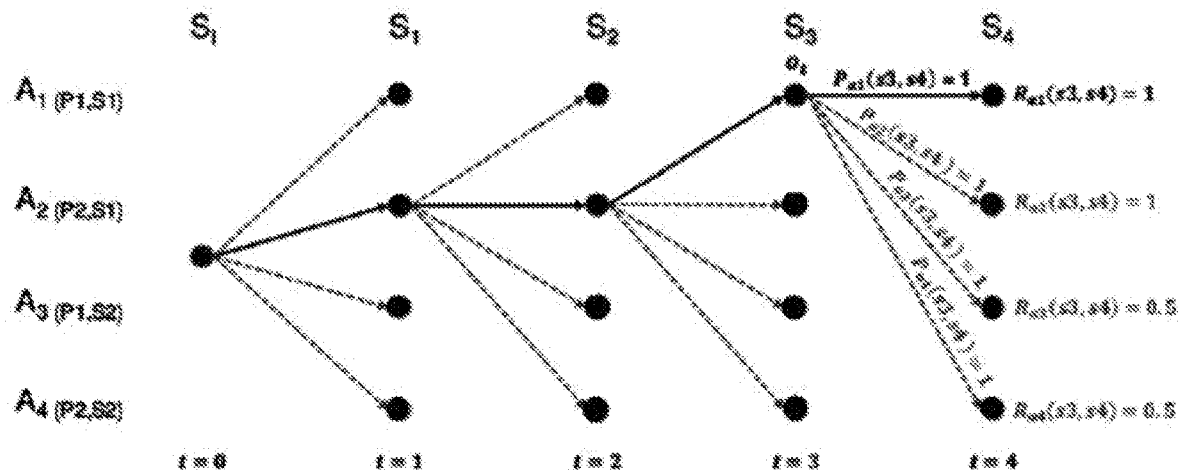
FIG. 2D illustrates a final state of the example Markov decision process.

This process continues until all components in the job are sourced. FIG. 2D illustrates the last step, or final state, of the process, in which all components have been sourced. As shown, all vectors have been correspondingly updated to reflect the provisioning actions taken.

Figure 2E:
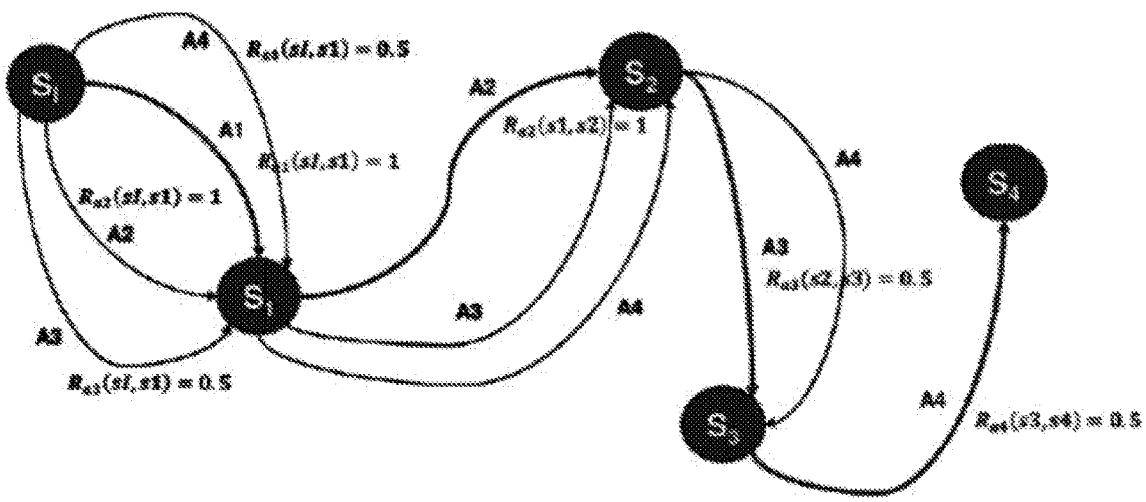
FIG. 2E illustrates the example Markov decision process in an environment with restrictions.

In some cases, as can be seen from the example in FIGS. 2B-D, there are often several valid, even if not optimal, provisioning options for a given environment and input vectors. In some cases, additional restrictions on action selection may be implemented to ensure valid provisioning actions are taken. FIG. 2E illustrates a Markov decision process (e.g. the process from FIGS. 2B-D) in an environment with restrictions. The Source component availability input vector has been adjusted to show only one component of both job component one and job component two available at source 1. Thus, a restriction that component availability may not drop below zero (e.g. you can't obtain a component from a source that has none) results in a different provisioning determination, as shown in FIG. 2E. Other example restrictions may include not provisioning more of a job component than requested for the job, a job is split between sources only when no other valid provisioning determination is available, or that the action chosen is always taken.

Example 6—Dynamic Provisioning Agent Training

A Markov decision process for job provisioning, as disclosed herein, may be implemented as a machine-learning process in a dynamic provisioning agent, which may be trained to perform job provisioning. Such training may include reinforcement learning, which may be implemented as Q-learning. Through this process, the dynamic provisioning agent learns to analyze the current state, and based on the current state, select an action.

Figure 3A:
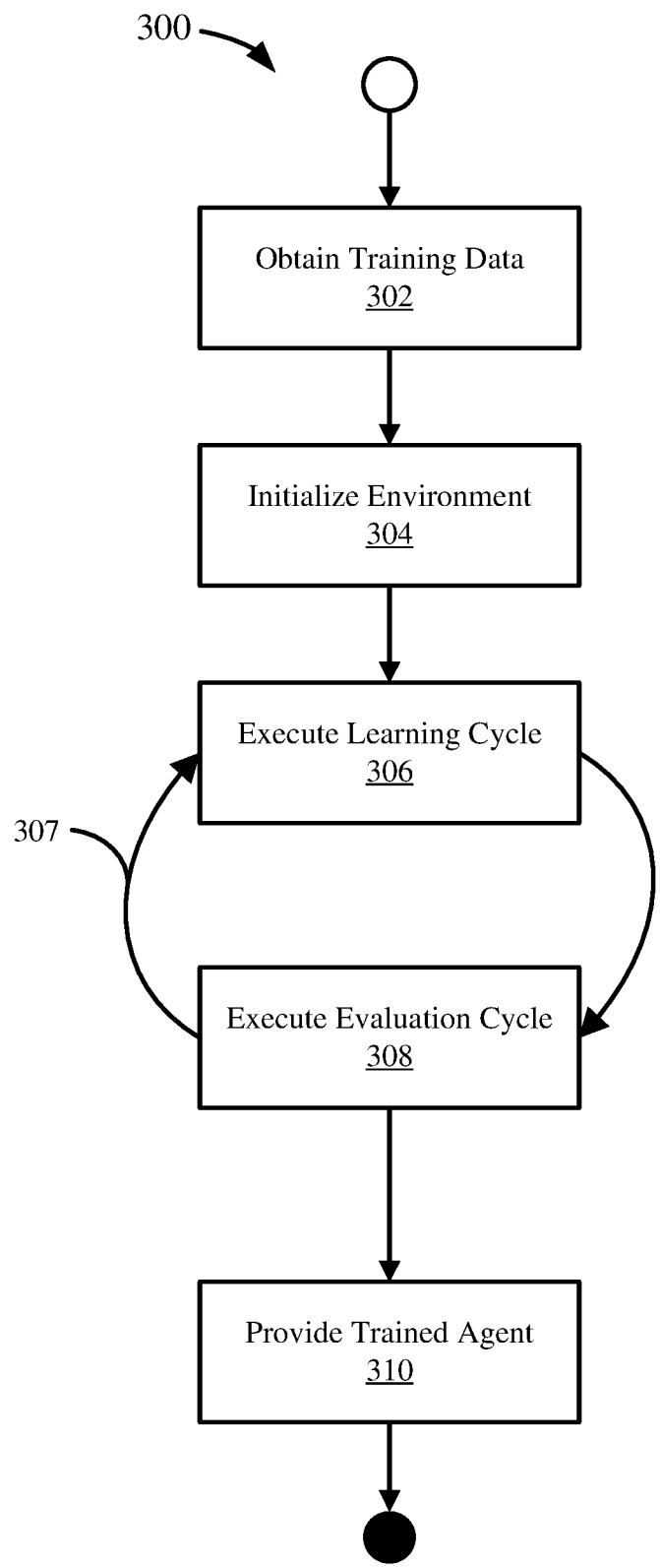
FIG. 3A is a flowchart illustrating a reinforcement learning training process.

FIG. 3A is a flowchart illustrating a reinforcement learning training process 300. Training data may be obtained at 302. The training data may be input vectors as disclosed herein, and generally may be multiple sets of input vectors, with each set representing a different training job (e.g. a single cycle or episode of training). However, in other aspects, the training data (or data to be analyzed using a trained machine-learning component) can be provided in a form other than vectors. The training data may be obtained from a database, which may have real-world transaction data (with any necessary information masked or removed), may be generated training data (e.g., "artificial" data that is not directly obtained from actual transactions). In other embodiments, the training data may be generated on-the-fly and provided at each training cycle. In yet further embodiments, a combination of pre-generated training data and on-the-fly training data may be used. When generated training data is used, the training data may be generated as described in Examples 15-23.

The training environment may be initialized at 304. Initializing the training environment may include setting any environment parameters, such as the KPI formulas, KPI weights, set of possible states, set of possible actions, setting the number of cycles to run, or putting the machine-learning system (e.g. dynamic provisioning agent) into a training state. Initializing the training environment may also include obtaining any additional input data generally required but not provided by the input vectors (e.g. data center availability, job component/resource availability).

Figure 3B:
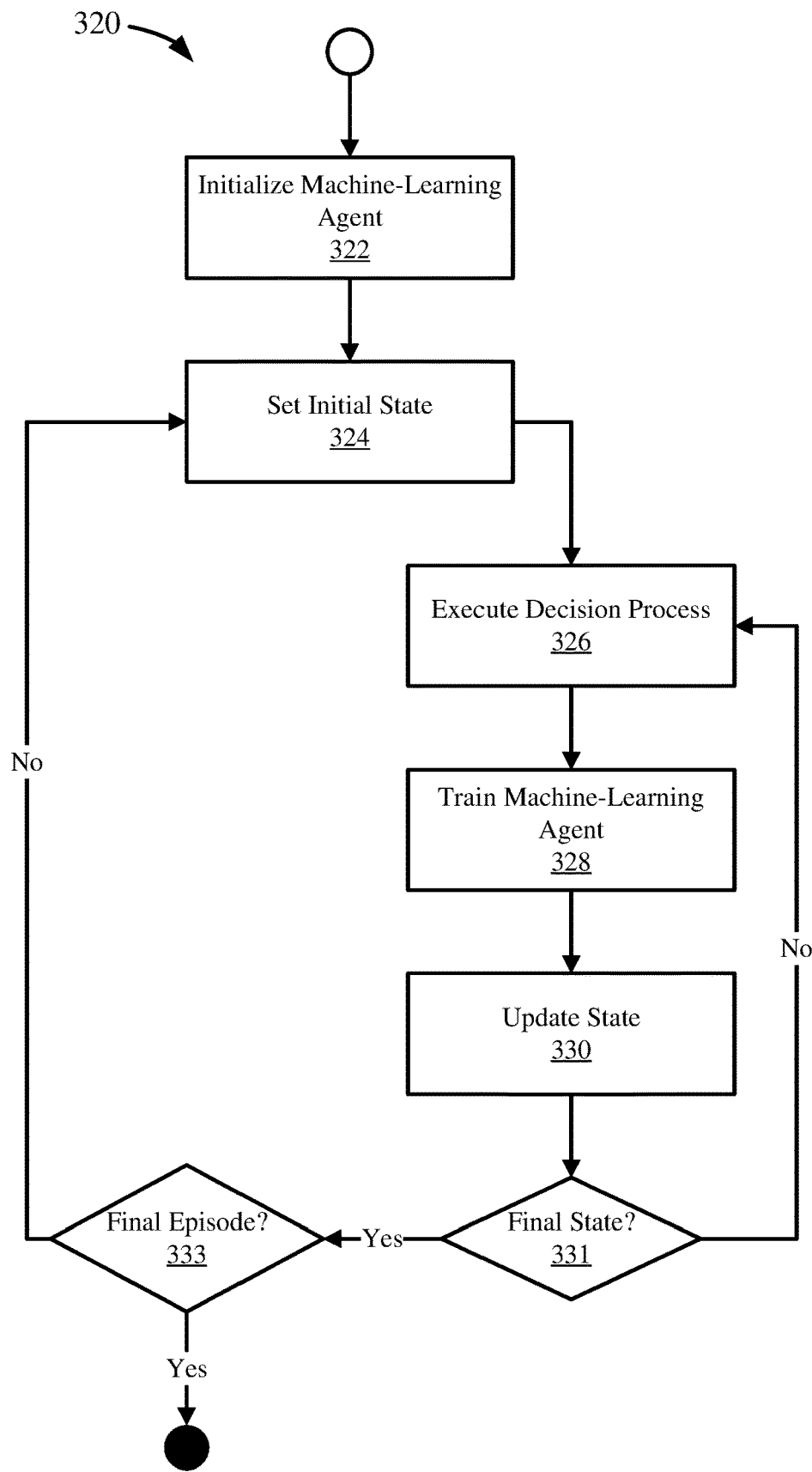
FIG. 3B is a flowchart illustrating a Q-learning training process.

The machine-learning cycle is executed at 306. The learning cycle is generally repeated for a given number of cycles, which may be an input parameter or the number of available sets of inputs in the training data. Executing the machine-learning cycle may include, for each cycle, obtaining the environment data, processing a single set of training data input vectors through the dynamic provisioning agent, saving the acquired knowledge, and analyzing a scoring function of the cycle (which may include making changes or adjustments to the machine-learning process based on this analysis). The learning cycle may include the training process 320 as shown in FIG. 3B. The learning cycle is completed after running for a given number of cycles.

The evaluation cycle is executed at 308. The evaluation cycle may be run for a given number of episodes, similar to the learning cycle at step 306. The evaluation cycle may include, for each cycle, obtaining the environment data, processing a single set of training data input vectors through the dynamic provisioning agent, and analyzing a scoring function of the cycle. Based on the results of the analysis across all cycles, the training process 300 may return 307 to the learning cycle and execute additional training data at 306. Executing additional training data at 308 may occur when the evaluation cycle at 308 determines that the dynamic provisioning agent has not been sufficiently trained; for example, the dynamic provisioning agent may not yet be optimized, or may not yet have achieved a threshold loss or score quality.

When the evaluation cycle at 308 successfully evaluates the dynamic provisioning agent, the process proceeds to provide the trained dynamic provisioning agent at 310. Providing the trained dynamic provisioning agent may include taking the dynamic provisioning agent out of the training state, or may include transferring the acquired knowledge to another dynamic provisioning agent (e.g. making a copy, or a partial copy). Providing the trained agent at 310 may include making the dynamic provisioning agent available in a production setting for provisioning jobs.

FIG. 3B is a flowchart illustrating a Q-learning training process 320. The machine-learning agent (e.g. the dynamic provisioning agent) may be initialized at 322. Initializing the machine-learning agent may include determining the set of available states and the set of available actions, which may be obtained from the training data, other environment data, the training agent, or randomly generated.

The initial state is set at 324. Setting the initial state may include obtaining the training data input vectors for a training job. Setting the initial state may also include clearing any state counter or other processing variables in the dynamic provisioning agent from any previous cycles. If training data is being generated on-the-fly, the training data may be generated (e.g., as in Examples 15-23) at this step as well (or just before this step).

The decision process is executed at 326. Executing the decision process may include performing steps at least analogous to steps 204 (Select Action), 206 (Execute Action), and 208 (Receive Action Results) as shown in FIG. 2A. Executing the decision process may further be accomplished by executing the training data through the dynamic provisioning agent's machine-learning process. Execution using the machine-learning process may include selecting actions at each state, which may be accomplished randomly through an ε greedy function, which may further be based on a policy or restriction set (e.g., constraints on how actions can be taken, including based on previously decided actions). Generally, executing the decision process includes calculating the score for each KPI based on the training data input vectors, and calculating the overall score based on the KPI scores. The next state may also be determined through the decision process.

The machine-learning process (e.g. the dynamic provisioning agent) is trained at 328. Training the machine-learning process may include updating the machine-learning algorithm based on the overall score and/or the separate KPI scores calculated at 326. In some embodiments, updating the machine-learning algorithm may include updating Q-values in a Q-matrix based on the calculated score(s). In other embodiments, updating the machine-learning algorithm may involve updating a neural network using back propagation or regression based on the calculated score(s); specifically, taking actions such as updating weight values and/or activation functions at one or more nodes in the neural network.

At 330, the current processing state is updated to the next state as returned by the executed decision process at 326. If the updated state is not the final state ("no" at 331), then the process 320 returns to step 326, and executes the decision process based on the updated state.

If the updated state is the final state for this training cycle ("yes" at 331), then the process 320 determines if there are further training cycles to be performed. If there are further training cycles for execution, such as further training data, ("no" at 333), then the process 320 returns to step 324 and prepares to execute the next set of training data input vectors. If there are no further cycles ("yes" at 333), then the training process 320 is complete.

Example 7—Dynamic Provisioning Architecture

Figure 4A:
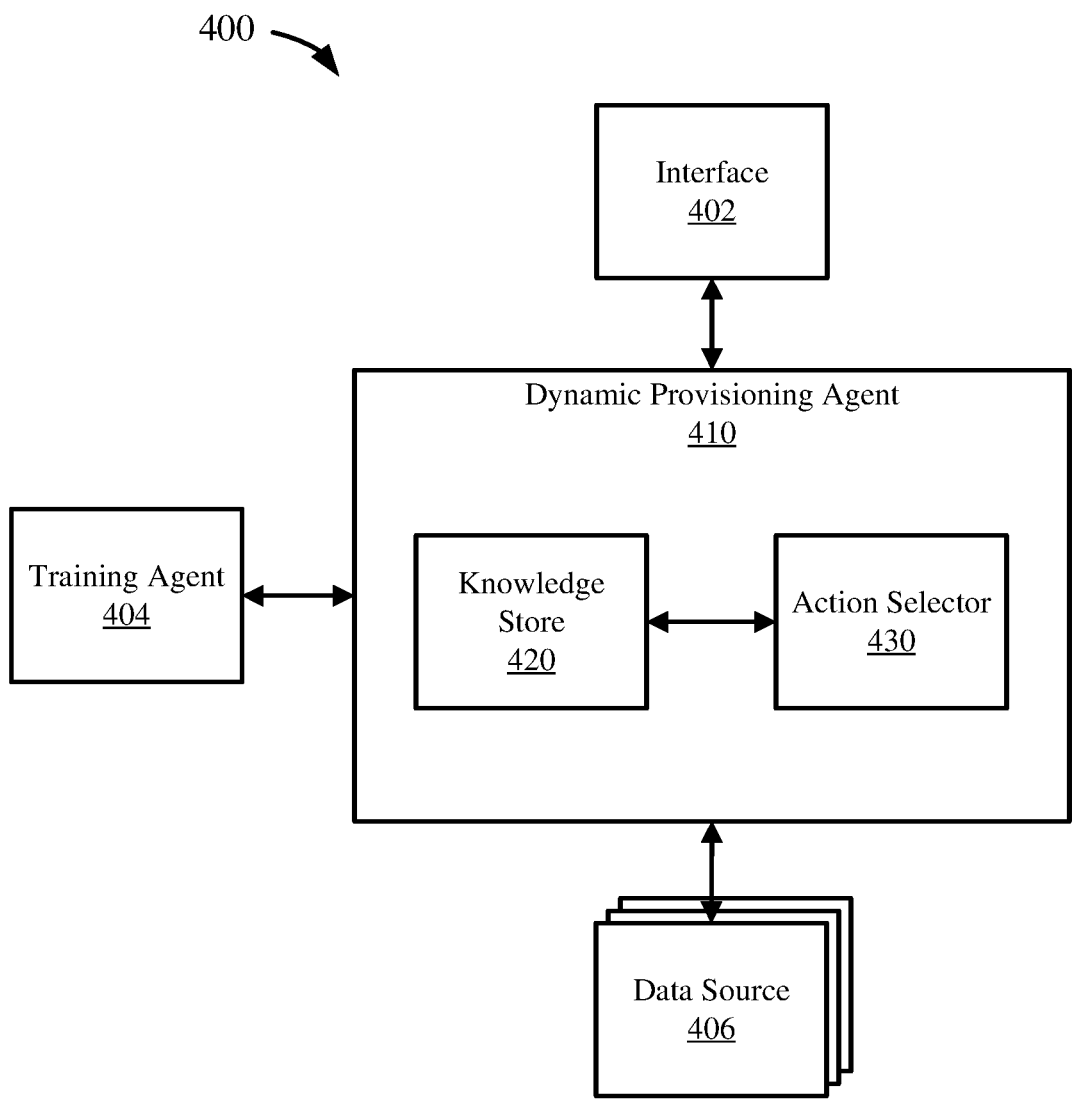
FIG. 4A is a schematic diagram depicting an architecture for dynamic job provisioning.

FIG. 4A is a schematic diagram depicting an architecture 400 for dynamic job provisioning. A dynamic provisioning agent 410 may provide provisioning for a given input job. The dynamic provisioning agent 410 may be a machine-learning process or system, or may be multiple machine-learning algorithms and other dynamic processes for generating provisioning for a job. The dynamic provisioning agent 410 may have a knowledge store 420 or an action selector 430. The knowledge store 420 and the action selector 430 may directly communicate or pass information between each other, or may communicate indirectly through the dynamic provisioning agent 410, including, in either case, using techniques such APIs, method calls, or inter-process communication.

The knowledge store 420 may include a machine-learning algorithm or data storage, such as a database table or file, or a combination thereof, which may store the knowledge of the dynamic provisioning agent 410 for generating provisioning (e.g., selecting a provisioning plan or options) for a job. The knowledge store 420 may include parameters, weight coefficients, formulas, or other values that may be used by the dynamic provisioning agent 410 or the action selector 430 for generating provisioning. For example, the knowledge store 420 may include a Q-learning algorithm or a neural network.

The action selector 430 may include a machine-learning algorithm or other dynamic process for determining a current state or a next state of provisioning decision, such as described herein. The action selector 430 may use information from the knowledge store 420 to determine a next step or state for a provisioning decision. For example, the action selector 430 may include a Monte Carlo Tree Search.

The dynamic provisioning agent 410 may have an interface 402. The interface 402 may be a programmatic interface, such as an API for the dynamic provisioning agent 410 detailing specific input arguments and argument types. The interface 402 may additionally or alternatively be a user interface for the dynamic provisioning agent 410.

A user interface 402 may allow a user to enter data, such as data defining a job (e.g., specifying one or more job components and a quantity for each of the job components), for the dynamic provisioning agent 410, or allow a user to select data entered elsewhere (e.g. previously entered or entered from a different interface, such as a website) for processing through the dynamic provisioning agent, or a combination thereof. The user interface 402 may allow a user to enter complete information (e.g. all input vectors) required by the dynamic provisioning agent 410, such as a job and data center (or other source information) information. The user interface may alternatively or additionally allow a user to enter partial information, such as only a job; in such cases, the interface 402 may obtain the remainder of the necessary input vectors, such as sourcing (e.g., job component location) information, and provide the total information (e.g. all input vectors) to the dynamic provisioning agent 410, whereas in other embodiments the dynamic provisioning agent may accept partial information and obtain any additional information, such as sourcing information, from other data sources, such as data sources 406.

The dynamic provisioning agent 410 may be trained through a training agent 404. The training agent 404 may communicate directly with the dynamic provisioning agent 410 for training one or more of the composite machine-learning systems within the dynamic provisioning agent 410. The training agent 404 may put the dynamic provisioning agent 410 in a training state, and then may provide one or more training scenarios to the dynamic provisioning agent, or to a specific machine-learning system within the dynamic provisioning agent, as described herein. The training agent 404 may have an interface, either or both of an API or a user interface, for allowing a user to perform training of the dynamic provisioning agent 410.

The dynamic provisioning agent 410 may access one or more data sources 406 for obtaining additional information necessary for provisioning an input job. Such data sources 406 may be files or database, and may be locally-hosted in the same system or in the same network, or remotely-hosted. For example, the dynamic provisioning agent 410 may access a data source 406 for obtaining availability data based on receipt of a provisioning request with only job component request input vectors.

Figure 4B:
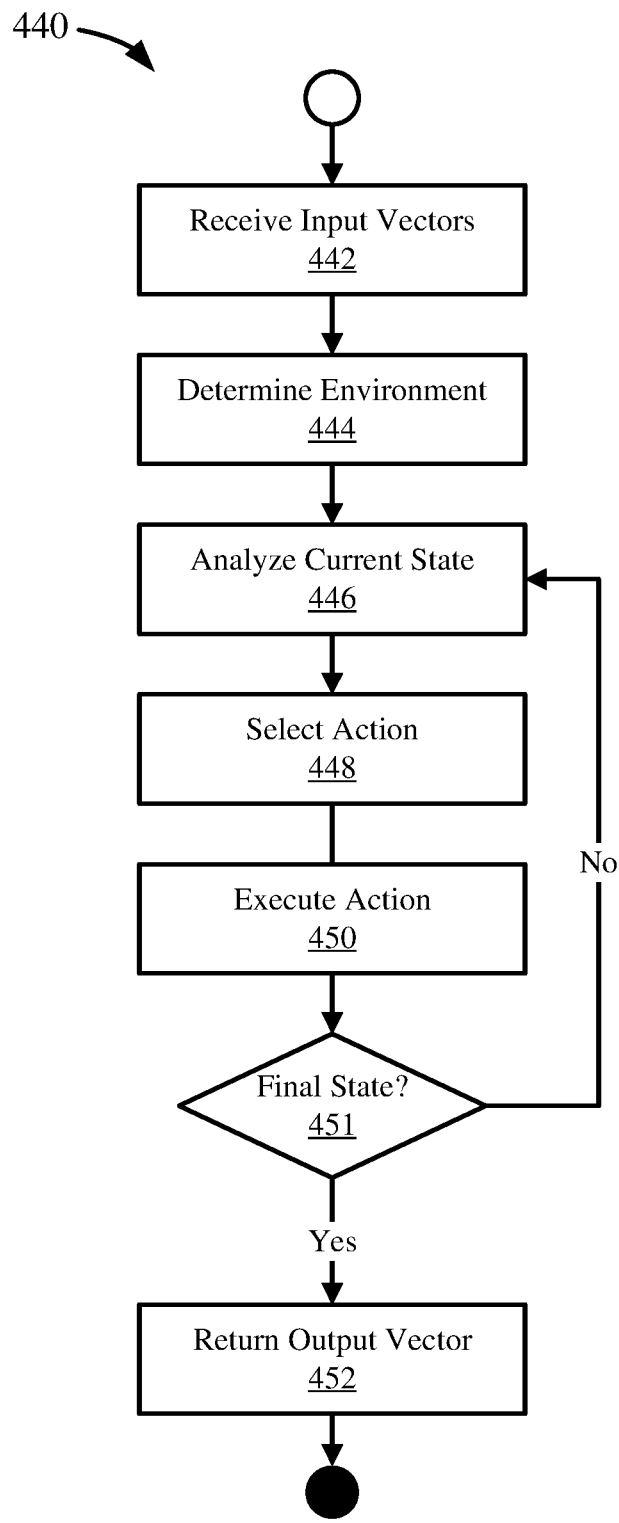
FIG. 4B is a flowchart illustrating a process for provisioning by a dynamic provisioning agent.

FIG. 4B is a flowchart illustrating a process 440 for provisioning by the dynamic provisioning agent 410. The dynamic provisioning agent receives one or more input vectors at 442. Generally, receiving one or more input vectors will include at least a job input vector, but may also include other vectors that have relevant provisioning information, such as a vector for available sources or available quantities of job components, as described herein.

The environment is determined at 444. Determining the environment may include determining the set of states available (e.g. total number of job components to be provisioned), or determining the set of available actions, or both. Determining the environment may also include obtaining any other necessary data that was not provided as an input vector, such as available sources and the type and quantity of job components available at a respective source. The current state may be set as well, generally to the initial state.

The current state is analyzed at 446. Analyzing the current state may include providing the current state and input vectors, and other data vectors, to the knowledge store 420 for analysis. The analysis may provide action values for the available actions at the current state, and may further provide predicted action values for the actions at future states.

An action is selected at 448. Selecting an action may be accomplished by the action selector 430, which may receive the action values and their corresponding states and actions from the knowledge store 420. The action selector 430 may select the action with the best score (which may be the highest or the lowest action value, depending on how the scoring is scaled). In some embodiments, the selected action value may be the best action value at that state. In other embodiments, the selected action value may be the best action based on the final total score of the action values; this generally results in a more efficient or better final score for the final provisioning determination (e.g., as will be further described, even though a particular decision may be the most efficient at a particular stage, the effect of making that decision may constrain later decisions in a way that produces a less optimal result than taking a more costly action at the particular stage).

The selected action is executed at 450. Executing the selected action may include updating the output vector(s) with the provisioning determination from that action (e.g. job component 1 from source 2). Executing the selected action may also include updating the other vectors to indicate the action taken (e.g. removing job component 1 from the job, deducting the product of item 1 from source 2's quantity of available job components, etc.); such updates may be reflected, at least initially, in local variables or memory, and the updates can later be recorded in other data sources (e.g., remote data sources or persistence storage) once the provisioning is complete. The current state may be updated to the next state based on the action taken.

If the updated state is not the final state ("no" at 451), then the updated state is analyzed at 446. The process continues iteratively until the final state is reached, which generally means the entire job is sourced or is deemed to be unsourceable (e.g. a job component is not available or the input is self-contradictory).

If the updated state is the final state ("yes" at 451), then the output vector (e.g. consignment or delivery vector) is provided at 452. Providing the output vectors may include the complete provisioning information for the input job, such as how many of which job components are to be obtained from which inventories. For a fully trained dynamic provisioning agent, the provisioning determination may be optimized or nearly-optimized for the requisite KPIs on which the agent was trained.

Providing the output vectors may additionally or alternatively include automatically allocating or requesting the job component items as determined in the output vector. For example, the dynamic provisioning agent may be integrated with a resource allocation application or system. Thus, if computation resources (e.g. compute servers or cores) were requested in the job, the determined job component items (e.g. specific compute servers or cores) may be allocated to the job automatically at 452. In other embodiments, the job component items consigned and provided in an output vector may be automatically requested at 452; this may include formatting and sending a request for the components, such as according to an API. In other embodiments, one or more tables or queues (or other data stores) may be updated based on the output vectors at 452, such as a job queue or a resource allocation table or registry.

Example 8—Knowledge Store Q-Learning Agent

Figures 5A, 5B:
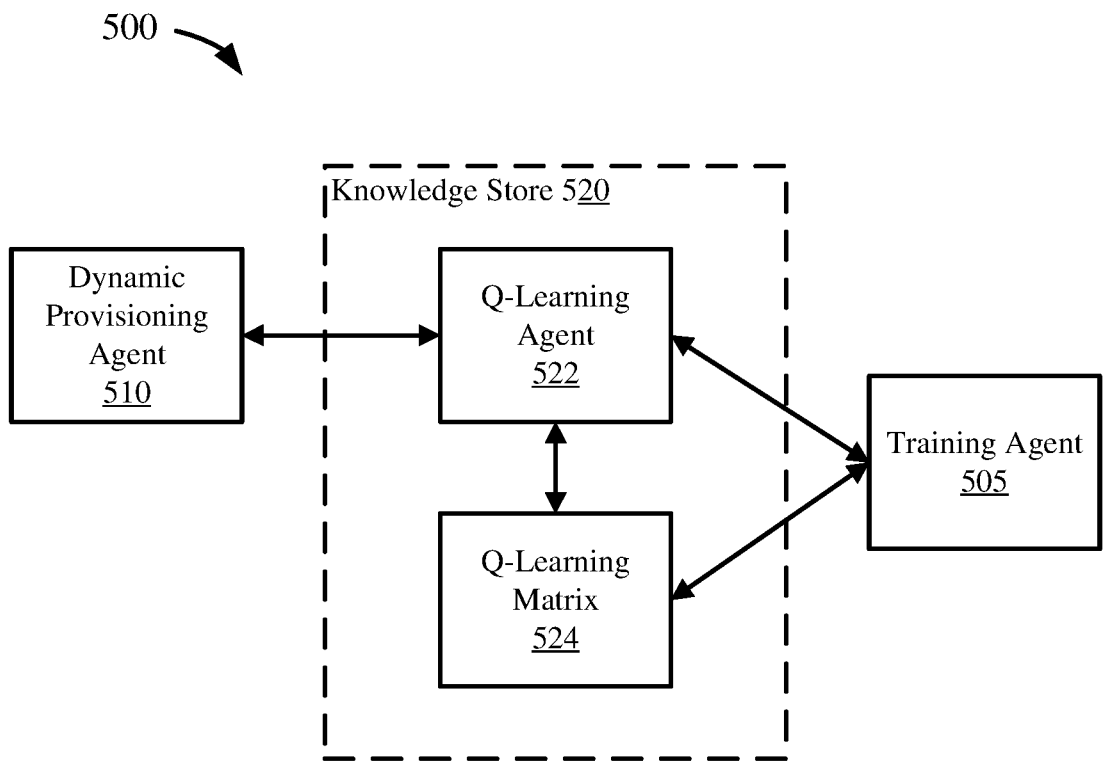
FIG. 5A is a schematic diagram depicting an architecture for a knowledge store using Q-learning.
FIG. 5B depicts a Q-learning matrix for storing Q-values for a dynamic provisioning agent.

FIG. 5A is a schematic diagram depicting an architecture 500 for a knowledge 520 store using Q-learning. The knowledge store 520 may be the knowledge store 420 as shown in FIG. 4A. The knowledge store 520 may have a Q-learning agent 522 and a Q-learning matrix 524.

The Q-learning agent 522 may be a machine-learning algorithm or system, which may generally be implemented as a Q-learning algorithm or system. The Q-learning agent 522 may access a Q-learning matrix 524 for storing or otherwise maintaining the Q-values used in the Q-learning algorithm. The Q-learning agent 522 may be called or otherwise accessed by a dynamic provisioning agent 510 (which can be at least generally analogous to the dynamic sourcing agent 410 of FIG. 4A). Generally, the Q-learning agent 522, in conjunction with the Q-learning matrix 524, may store and provide the provisioning knowledge acquired through training and use of the dynamic provisioning agent 510, for determining provisioning for a given set of provisioning input vectors (e.g. jobs, data center or other job component sources, etc.).

A training agent 505 (which can be at least generally analogous to the training agent 404) may access the Q-learning agent 522 or the Q-learning matrix 524, or both, for training. The training agent 505 may put the Q-learning agent 522 and/or Q-learning matrix 524 into a training state, which generally is different from a production or testing state, for processing multiple sets or episodes of input vectors for training. Training generally increases the knowledge of the Q-learning agent 522 for determining provisioning solutions, and thus improves the provisioning determinations provided by the Q-learning agent. With sufficient training, generally, the Q-learning agent 522 learns to optimize the provisioning for job input vectors and a given set of KPIs.

Example 9—Q-Learning Matrix

FIG. 5B depicts a Q-learning matrix 530 for storing Q-values or action values for a dynamic provisioning agent 510, as shown in FIG. 5A. The Q-values or action values may be scores, such as calculated for KPIs, or based in part on such KPI scores. Generally, a Q-learning matrix 530 may have a Q-value for each possible action 531, 533 at each possible state 537, 539 of the provisioning decision process. Thus, at state 1 537 (e.g. the initial state of the provisioning decision process), the Q-learning matrix 530 may have a Q-value 1/1 532 for Action 1 531, and have corresponding Q-values for all other Actions at state 1 up to Q-value 1/m 534 for Action m 533. Similarly, each state will have separate Q-values for each Action, up to the final possible state; the final State n 539 may have a Q-value n/1 536 for Action 1 531, and have corresponding Q-values for all other Actions at state n up to Q-value n/m 538 for Action m 533. That is, an action may have a first value at a first state, and that same action may have a second, different, value when taken at a second state.

The Q-value may be a parameter for selecting its corresponding action at that state through the Q-learning provisioning process; generally, such a Q-value may be a numeric value representing the value of that action (e.g., for use in determining a score for a sourcing action, KPI, or overall job provisioning scenario). In some embodiments, the Q-value may be a weight coefficient for selecting that action compared to other actions. In other embodiments, the Q-value may be a score value (e.g., a value component of a score) that is returned when its corresponding action is selected.

The Q-learning matrix 530 may be stored in a database, such as in a database table, or in a delimited file, a value registry, or in other data storage. A Q-learning matrix 530 may be stored in a table for a system with four actions 531, 533 and four states 537, 539, as appears below. The Q-values (or action values) 532, 534, 536, 538 are the numeric values listed, which may be the best results generated by a scoring function for each action at each state (generally, the best results are the larger numeric value, but other scoring scales may be used). In some embodiments, the Q-values 532, 534, 536, 538 may be the result of a function of the scoring result, which may incorporate the current value in stored in the Q-matrix 530. The Q-values 532, 534, 536, 538 may be retrieved outside training for use as a weight or other value in selecting an appropriate action, as described herein.

|         | Action 1 | Action 2 | Action 3 | Action 4 |
|---------|----------|----------|----------|----------|
| State 1 | 0        | 0.5      | 1        | 0        |
| State 2 | 0        | 2        | 0        | 0.25     |
| State 3 | 0        | 0        | 1        | 1        |
| State 4 | 0        | 1.5      | 2        | 0        |

Example 10—Knowledge Store Neural Network

Figure 6A:
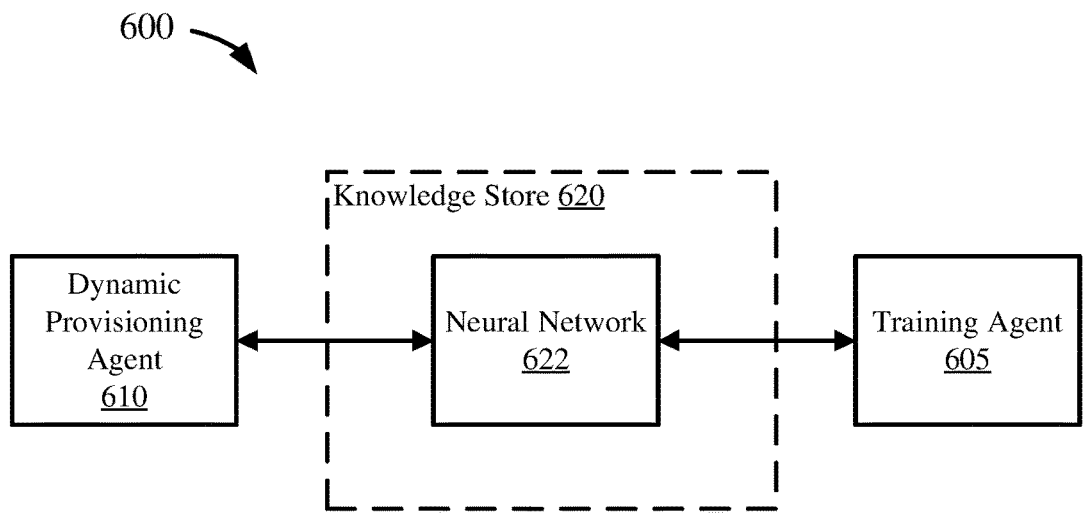
FIG. 6A is a schematic diagram depicting an architecture for a knowledge store using a neural network.

FIG. 6A is a schematic diagram depicting an architecture 600 for a knowledge store 620 using a neural network 622. The knowledge store 620 may be the knowledge store 420 as shown in FIG. 4A. The knowledge store 620 may include a neural network 622.

The neural network 622 may include a machine-learning algorithm or system, as further described herein. The neural network 622 may be called or otherwise accessed by a dynamic provisioning agent 610 (which can be at least generally analogous to the dynamic provisioning agent 410 of FIG. 4A). Generally, the neural network 622 may store and provide the provisioning knowledge acquired through training and use of the dynamic provisioning agent 610, for determining provisioning for a given set of provisioning input vectors (e.g. jobs, data centers or other job component sources, etc.). The neural network 622 itself may store action values or Q-values as part of the parameters used in execution.

The training agent 605 may access the neural network 622 for training. The training agent 605 may put the neural network 622 into a training state, which generally is different from a production or testing state, for processing multiple sets or episodes of input vectors for training. Training generally increases the knowledge of the neural network 622 for determining provisioning solutions, and thus improves the provisioning determinations provided by the neural network. With sufficient training, generally the neural network learns to optimize the provisioning for job input vectors and a given set of KPIs.

Figure 6B:
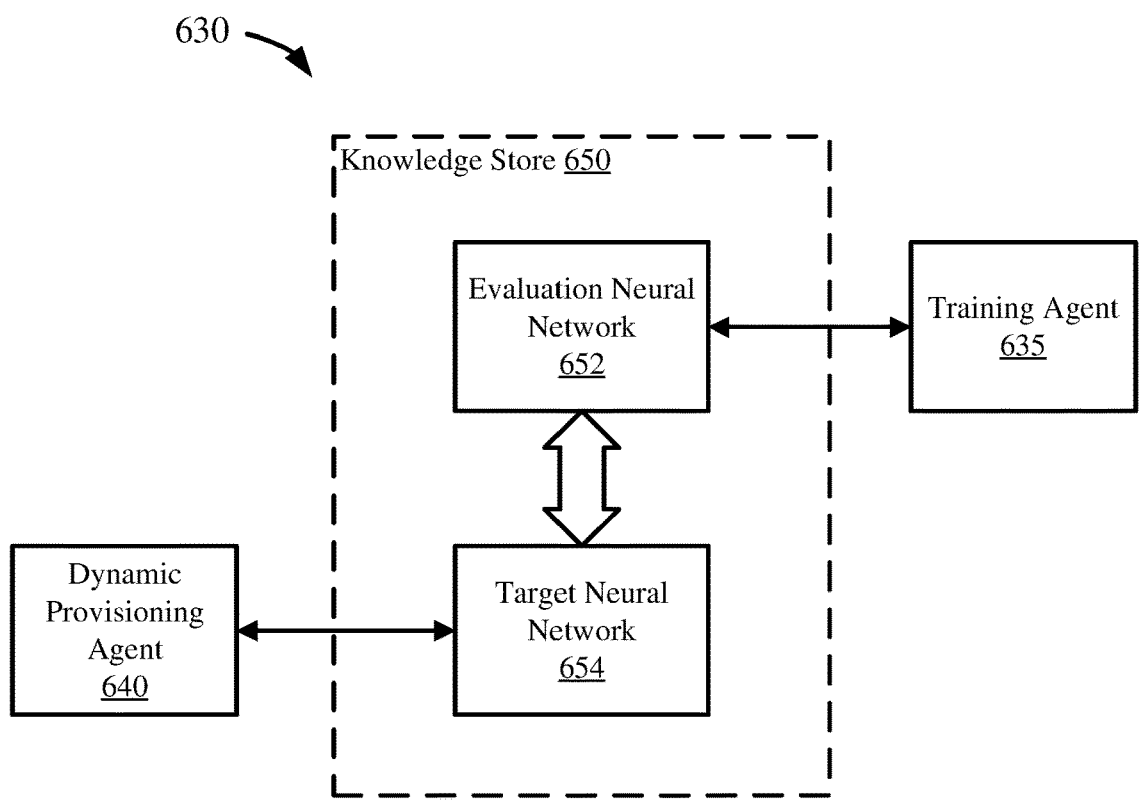
FIG. 6B is a schematic diagram depicting an architecture for a knowledge store using two neural networks.

FIG. 6B is a schematic diagram depicting an architecture 630 for a knowledge store 650 using two neural networks 652, 654. The neural network 652 may be an evaluation neural network 652, while the neural network 654 may be a target neural network 654. Generally, the neural networks 652, 654 are similar to the neural network 622 shown in FIG. 6A. However, generally the evaluation neural network 652 is trained by the training agent 635, computing parameters and optimizing the functions for generating provisioning decisions. Thereafter, the target neural network 654 is synchronized with the evaluation neural network 652, which may include updating the parameters and other function values in the target neural network with those from the evaluation neural network. Such synchronizations may be performed at the direction of a user, such as a system administrator, or at predetermined intervals, such as after a specific number of training episodes or at a given time interval (e.g. once a day, once a week, etc.).

Generally, the target neural network 654 is accessed by the dynamic provisioning agent 640 for use in generating provisioning decisions. Using dual neural networks 652, 654 may increase the rate of learning of the neural networks, making the training process more efficient, or increase the degree of complexity of provisioning problems solvable by a neural network.

Example 11—Neural Network Architecture

Figure 6C:
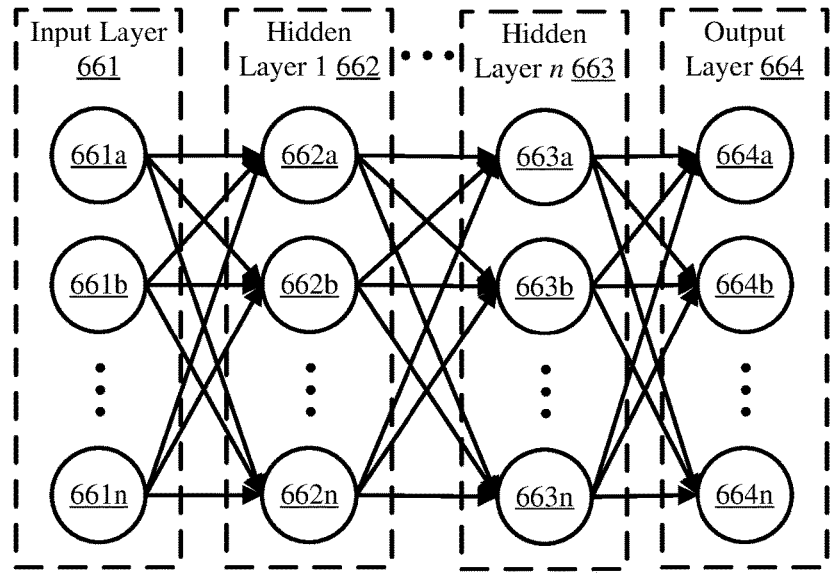
FIG. 6C depicts an architecture for a neural network.

FIG. 6C depicts an architecture 660 for a neural network. Such an architecture 660 may be a multilayer perceptron neural network. The neural network 660 may have an input layer 661, one or more hidden layers 662, 663, and an output layer 664. Each layer may have one or more nodes or perceptrons; generally, the number of nodes at each layer is the same across the layers. Thus, the input layer 661 may have input nodes 661a, 661b, through 661n. Similarly, hidden layer 1 662 may have nodes 662a, 662b, though 662n, and so on through hidden layer n 663, which may have nodes 663a, 663b, through 663n. The output layer 664 may have nodes 664a, 664b, through 664n. Generally, each node may have one or more parameters, weights, coefficients, or other values, and one or more functions for the various inputs to that node of the neural network 660.

The input layer 661 generally accepts the input vectors to the neural network 660 and begins the neural network processing. In some embodiments, the input layer 661 does not process the input vectors, other than any preprocessing necessary for the input vectors to be usable by the neural network 660. In other embodiments, the input layer 661 may begin processing the input vectors using the functions and parameters at each node, similar to the hidden layers 662, 663.

The output of each layer is generally the output of the various nodes at that layer. Further, each node at each layer generally accepts as input the output of each node at the preceding layer. Thus, the output of input node 661a may be an input to each node in hidden layer 1 662, and so on for all the nodes in each successive layer. The output layer 664 may contain the final output values for the neural network 660 in aggregate across its nodes 664a, 664b, through 664n. In this way, the neural network 660 may be used to process input vectors through its various layers 661, 662, 663, 664, their respective nodes 661a-n, 662a-n, 663a-n, 664a-n, and their respective parameters and functions. In some embodiments, the layers 661, 662, 663, 664 may have varying numbers of nodes, while in other embodiments the layers may have the same number of nodes.

Figure 6D:
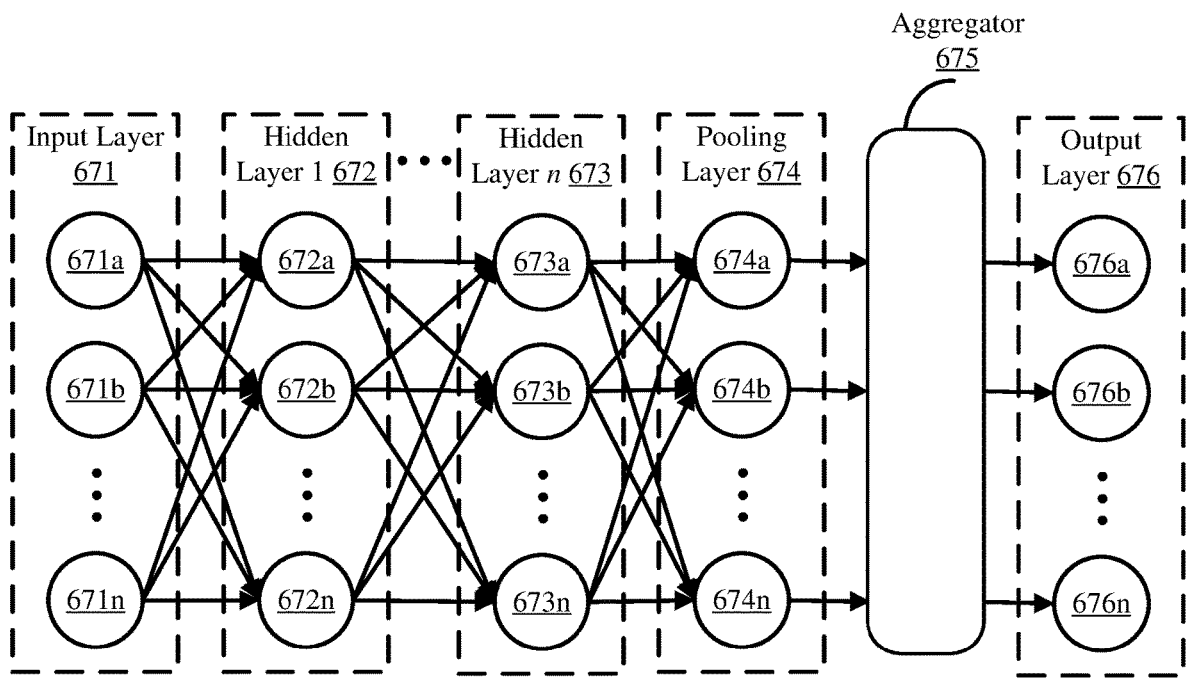
FIG. 6D depicts an expanded architecture for a neural network.

FIG. 6D depicts an expanded architecture 670 for a neural network. Such an architecture 670 may be a multilayer perceptron neural network. The neural network 670 may have an input layer 671, one or more hidden layers 672, 673, a pooling layer 674, an aggregator 675, and an output layer 676. Each layer may have one or more nodes or perceptrons; generally, the number of nodes at each layer is the same across the layers. Thus, the input layer 671 may have input nodes 671a, 671b, through 671n. Similarly, hidden layer 1 672 may have nodes 672a, 672b, though 672n, and so on through hidden layer n 673, which may have nodes 673a, 673b, through 673n. The pooling layer 674 may have nodes 674a, 674b, through 674n. The output layer 676 may have nodes 676a, 676b, through 676n. Generally, each node may have one or more parameters, weights, coefficients, or other values, and one or more functions for the various inputs to that node of the neural network 670.

The input layer 671 generally accepts the input vectors to the neural network 670 and begins the neural network processing. In some embodiments, the input layer 671 does not process the input vectors, other than any preprocessing necessary for the input vectors to be usable by the neural network 670. In other embodiments, the input layer 671 may begin processing the input vectors using the functions and parameters at each node, similar to the hidden layers 672, 673.

The output of each layer is generally the output of the various nodes at that layer. Further, each node at each layer generally accepts as input the output of each node at the preceding layer. Thus, the output of input node 671a may be an input to each node in hidden layer 1 672, and so on for all the nodes in each successive layer.

The pooling layer 674 may aggregate the neural network 670 processing data for further analysis or processing in an aggregator or normalization function 675. Thus, in some embodiments, the number of nodes at the pooling layer 674 may be different from the number of nodes at other layers. The pooling layer 674 may also perform preprocessing of the neural network data before providing the data to the aggregator 675.

The aggregator 675 may be an algorithm or other function for manipulating the neural network data before providing the data as output. Such a function may normalize or otherwise prepare the neural network output for use by another system, such as a calling system (e.g. the dynamic provisioning agent or action selector as described herein). For example, the aggregator may be the softmax function.

The output layer 676 may contain the final output values for the neural network 670 in aggregate across its nodes 676a, 676b, through 676n. The output layer 676 may receive its output data from the aggregator 675, and so may have a different number of nodes than the previous layers. In this way, the neural network 670 may be used to process input vectors through its various layers 671, 672, 673, 674, 676, their respective nodes 671a-n, 672a-n, 673a-n, 674a-n, and their respective parameters and functions, with further aggregation or other normalization at 675, and outputting via the various nodes 676*a-n* in layer 676. In some embodiments, the layers 671, 672, 673, 674, 676 may have varying numbers of nodes, while in other embodiments the layers may have the same number of nodes.

Example 12—Action Selector

The action selector 430, as shown in FIG. 4A, may determine the next state of the dynamic provisioning agent 410 in a provisioning process. Generally, the state of the process may include partial provisioning decisions made (e.g. the provisioning of one job component of an overall job). Generally, the action selector 430 is used during evaluation of the dynamic provisioning agent, and may not always be used during production. In such embodiments, the action selector 430 may help train the knowledge store 420 for optimizing the provisioning function. In one embodiment, the action selector 430 may be implemented as a modified Monte Carlo tree search.

Figure 7A:
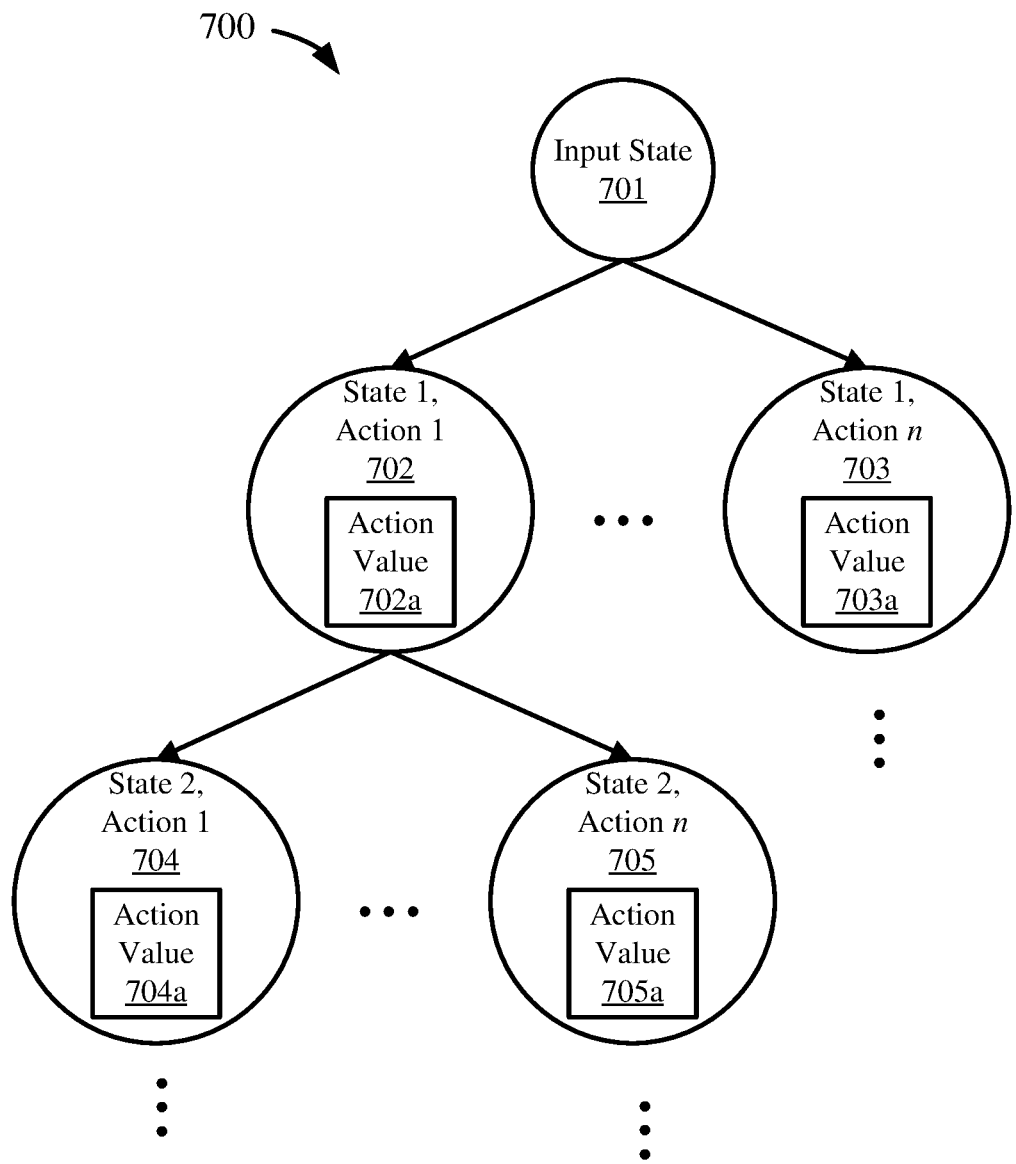
FIG. 7A is a diagram illustrating a provisioning tree for a Monte Carlo tree search.

FIG. 7A is a diagram illustrating a provisioning tree 700 for a Monte Carlo tree search. The provisioning tree 700 may have a root node 701, which may hold the input state of the search. The input state node 701 may be the input vectors to the action selector, or the current provisioning process state. The root node 701 may have one or more subnodes 702-703, which may represent the next possible states (e.g. actions). Further, each subnode 702-703 may have an action value or Q-value associated with that particular state-action combination; the action values may generally be received from the knowledge store as input to the action selector. Thus, each node may represent $Q_t(s_t, a_t)$=action value.

Thus, the next level of the tree 700 may have the subnode 702, for state 1, action 1, with an action value 702*a*, through the subnode 703 for, state 1, action n, with an action value 703*a*. Similarly, state 1, action 1 subnode 702 may have a further subnode state 2, action 1 704, with an action value 704*a*, through a further subnode state 2, action n 705, with an action value 705*a*. Each subnode 702-703, 704-705 may then have a similar next level of subnodes for each $Q_t(s_t, a_t)$ combination, until all combinations of the state and actions have a corresponding node. Generally, each action is available $a_t$ each state.

Figure 7B:
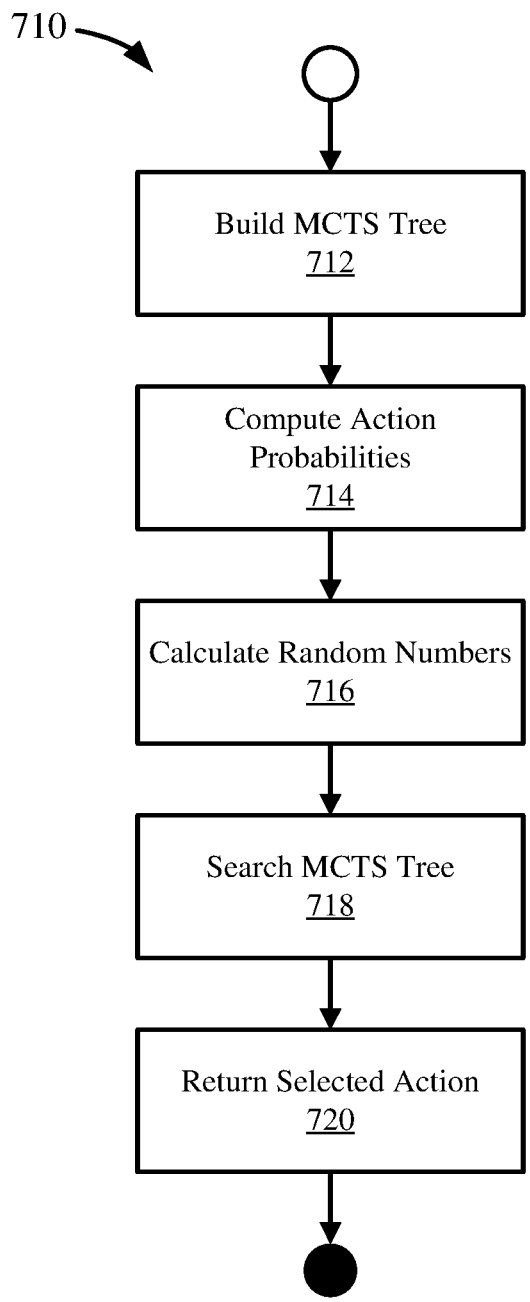
FIG. 7B is a flowchart illustrating a modified Monte Carlo tree search process.

FIG. 7B is a flowchart illustrating a modified Monte Carlo tree search process 710. Generally, the process 710 may search over the provisioning tree 700, as shown in FIG. 7A. Generally, using a Monte Carlo tree search allows the dynamic provisioning agent to select the optimized action for the entire job provisioning rather than the optimized action $a_t$ a given state, which may not be the optimized action for provisioning the job as a whole. This means the Monte Carlo tree search allows the dynamic provisioning agent to analyze the problem as a whole. While a UCT or UCB1 function may be used for the selection and rollout of the Monte Carlo tree search, the full extent of these versions is not typically necessary, so a modified version as disclosed herein can be more efficient. However, if desired, more complex functions, including UCT and UCB1 can be used, including in their entireties.

The provisioning tree may be built at 712. The provisioning tree may be the provisioning tree 700, as shown in FIG. 7A. Generally, the provisioning tree is built based on the current state information as provided by the knowledge store in the dynamic provisioning agent. Building the provisioning tree 700 using current state information can mean that generally the provisioning tree is not built in total for the entire job (initial state to final state), but instead may be built for the current state through the final state. That is, building the provisioning tree 700 does not consider earlier actions taken, including whether a lower score (e.g., more efficient) final state could be achieved by changing previously selected actions.

Action selection probabilities may be computed at 714. Computing selection probabilities may include computing a probability for each action (e.g. node) based on that action's Q-value or action value. Generally, the total probability for all the actions at a given level of the tree may sum to 1 (e.g. an action will be selected).

One or more random numbers may be calculated at 716. Generally, the random number may be a double number in the range of [0, 1], however, other data types may be used for the number, or the number can be selected using a different range. Such a number may be used in searching the provisioning tree 700.

The provisioning tree is searched $a_t$ 718. This search may include checking the probability limits of each action, as generated at step 714, based on the random number(s) generated at step 716. The searching may then select an action based on this probability check.

The search process 710 may repeat steps 716 and 718 for multiple iterations (up to thousands of iterations) and maintain the selected action that results in the best provisioning result, which may be represented as the best total score. The final selected action, which results in the best overall provisioning score, may be returned to the dynamic provisioning agent $a_t$ 720.

Example 13—Dynamic Provisioning Agent Environments

Figure 8A:
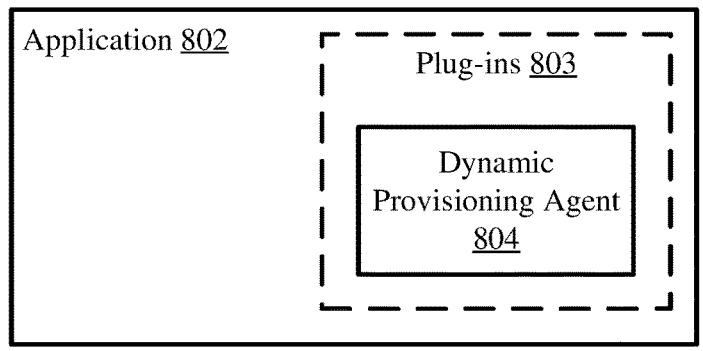
FIG. 8A is a schematic diagram depicting an application environment for a dynamic provisioning agent.

FIG. 8A is a schematic diagram depicting an application environment for a dynamic provisioning agent 804. An application 802, such as a software application running in a computing environment, may have one or more plug-ins 803 (or add-ins or other software extensions to programs) that add functionality to, or otherwise enhance, the application. The dynamic provisioning agent 804 may be integrated with the application 802, for example, as a plug-in. The dynamic provisioning agent 804 may add functionality to the application 802 for provisioning jobs. For example, the application 802 may be a launchpad or portal, such as SAP Fiori™ (SAP, SE, Walldorf, Germany), and the dynamic provisioning agent may be integrated with the launchpad or portal, which provides access to the dynamic provisioning agent to one or more users of the application.

Figure 8B:
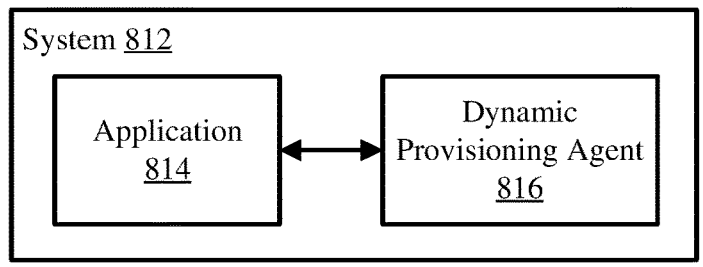
FIG. 8B is a schematic diagram depicting a system environment for a dynamic provisioning agent.

FIG. 8B is a schematic diagram depicting a system environment for a dynamic provisioning agent 816. The dynamic provisioning agent 816 may be integrated with a computer system 812. The computer system 812 may include an operating system, or otherwise be a software platform, and the dynamic provisioning agent 816 may be an application or service running in the operating system or platform, or the dynamic provisioning agent may be integrated within the operating system or platform as a service or functionality provided through the operating system or platform. The system 812 may be a server or other networked computer or file system. Additionally or alternatively, the dynamic provisioning agent 816 may communicate with and provide dynamic job provisioning, as described herein, to one or more applications, such as application 814, in the system 812.

Figure 8C:
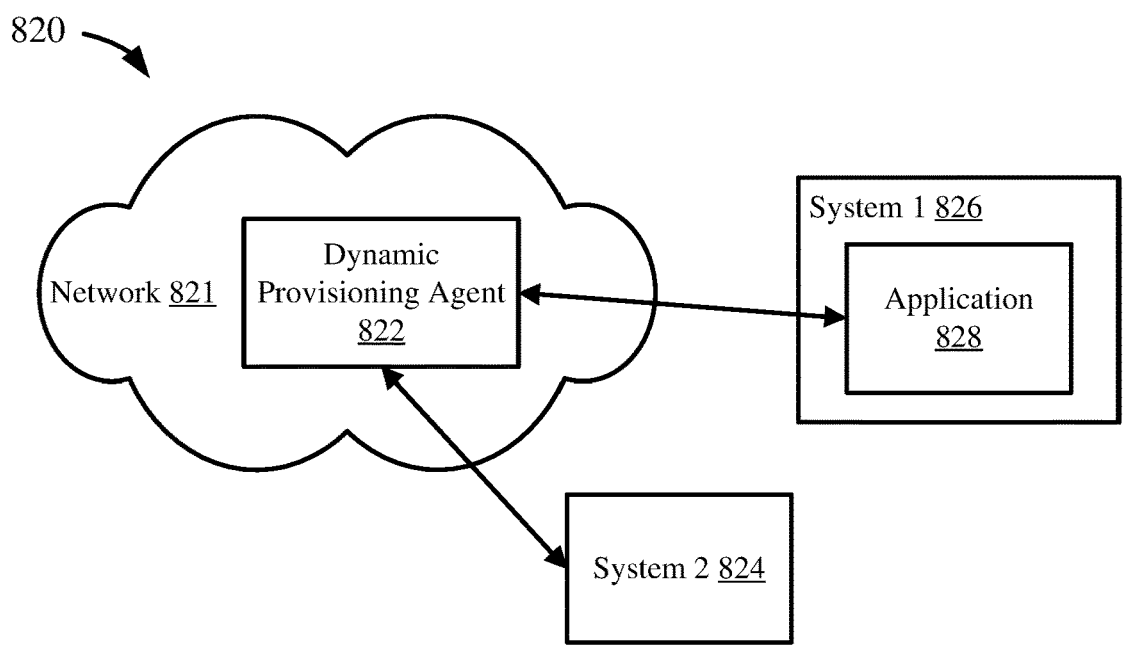
FIG. 8C is a schematic diagram depicting a network environment for a dynamic provisioning agent.

FIG. 8C is a schematic diagram depicting a network environment 820 for a dynamic provisioning agent 822. The dynamic provisioning agent 822 may be available on a network 821, or integrated with a system (such as from FIG. 8B) on a network. Such a network 821 may be a cloud network or a local network. The dynamic provisioning agent 822 may be available as a service to other systems on the network 821 or that have access to the network (e.g., may be on-demand software or SaaS). For example, system 2 824 may be part of, or have access to, the network 821, and so can utilize provisioning functionality from the dynamic provisioning agent 822. Additionally, system 1 826, which may be part of or have access to the network 821, may have one or more applications, such as application 828, that may utilize provisioning functionality from the dynamic provisioning agent 822.

In these ways, the dynamic provisioning agent 804, 816, 822 may be integrated into an application, a system, or a network, to provide dynamic provisioning functionality as described herein.

Example 14—Further Dynamic Provisioning Processes

Figure 9A:
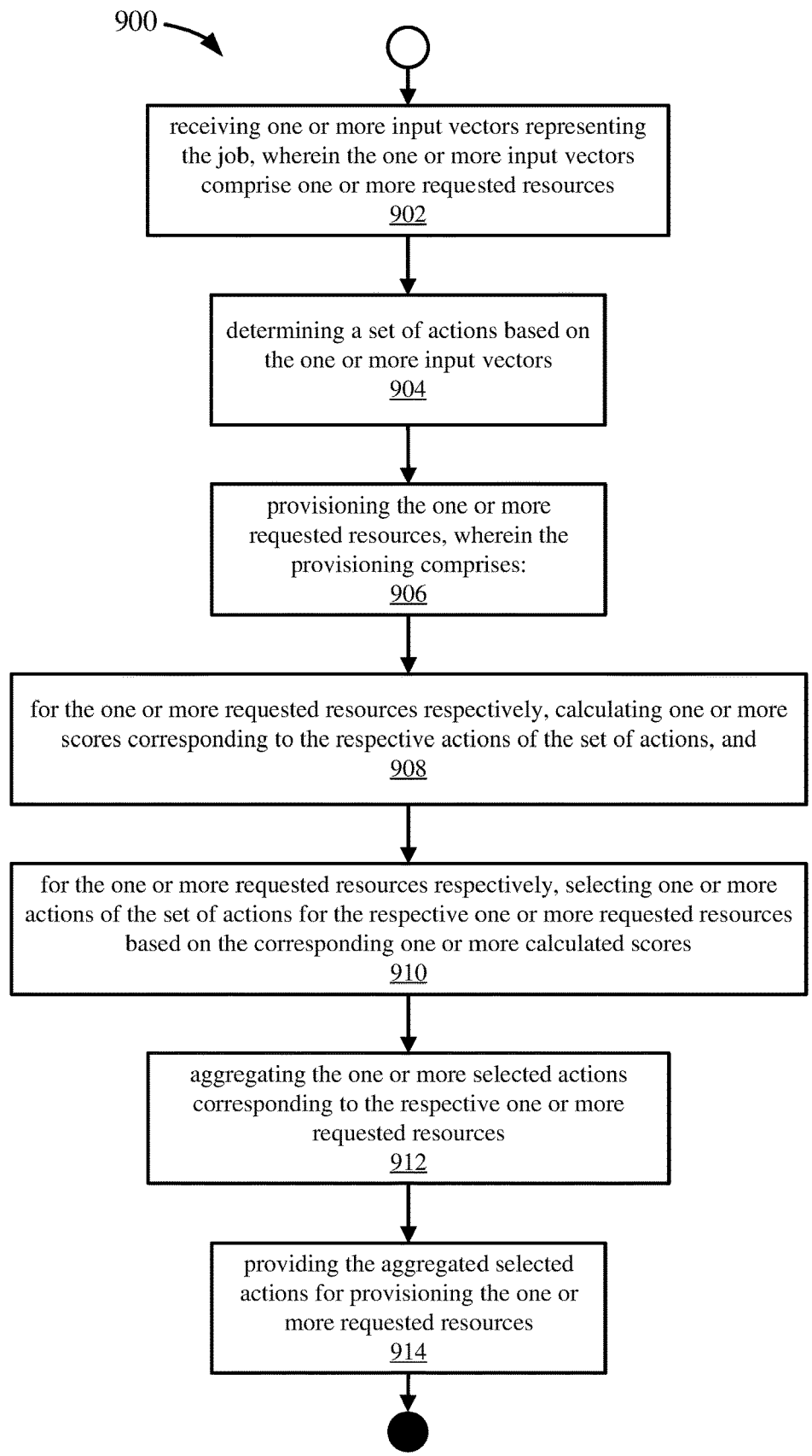
FIG. 9A is a flowchart illustrating a process for dynamic job provisioning.

FIG. 9A is a flowchart illustrating a process 900 for dynamic job provisioning. One or more input vectors representing the job may be received at 902. The one or more input vectors may include one or more requested resources. A set of actions based on the one or more input vectors may be determined at 904. The one or more requested resources may be provisioned at 906. The provisioning may include, for the one or more requested resources respectively, calculating one or more scores corresponding to the respective actions of the set of actions at 908. The provisioning may further include, for the one or more requested resources respectively, selecting one or more actions of the set of actions for the respective one or more requested resources based on the corresponding one or more calculated scores at 910. The one or more selected actions corresponding to the respective one or more requested resources may be aggregated at 912. The aggregated selected actions for provisioning the one or more requested resources may be provided at 914.

Figure 9B:
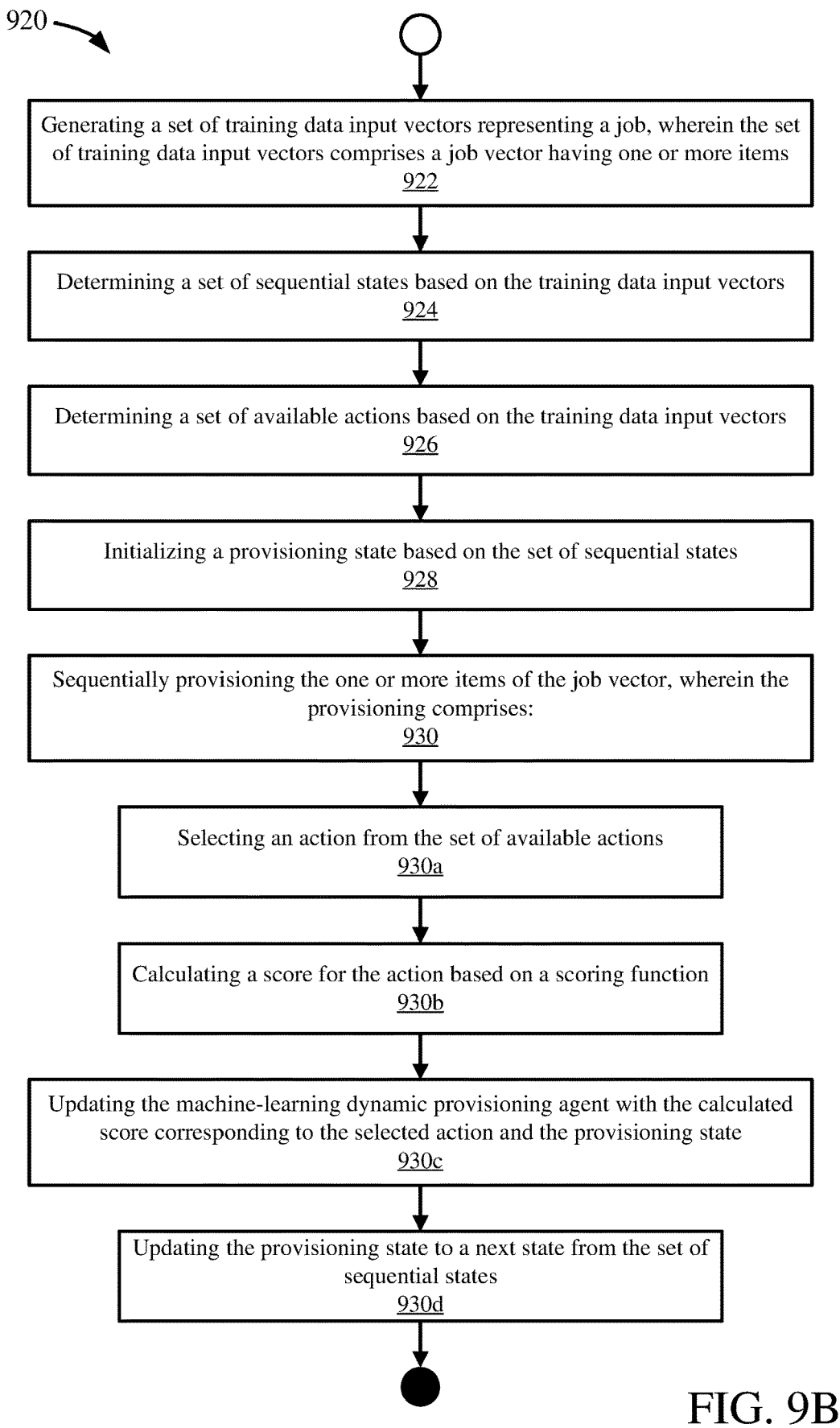
FIG. 9B is a flowchart illustrating a process for training a dynamic provisioning agent.

FIG. 9B is a flowchart illustrating a process 920 for training a dynamic provisioning agent. A set of training data input vectors representing a job may be trained at 922. The set of training data input vectors may have a job vector having one or more items. A set of sequential states based on the training data input vectors may be determined at 924. A set of available actions based on the training data input vectors may be determined at 926. A provisioning state based on the set of sequential states may be initialized at 928. The one or more items of the job vector may be sequentially provisioned at 930. The sequential provisioning may include selecting an action from the set of available actions at 930$a$, calculating a score for the action based on a scoring function at 930$b$, updating the machine-learning dynamic provisioning agent with the calculated score corresponding to the selected action and the provisioning state at 930$c$, and updating the provisioning state to a next state from the set of sequential states at 930$d$.

Figure 9C:
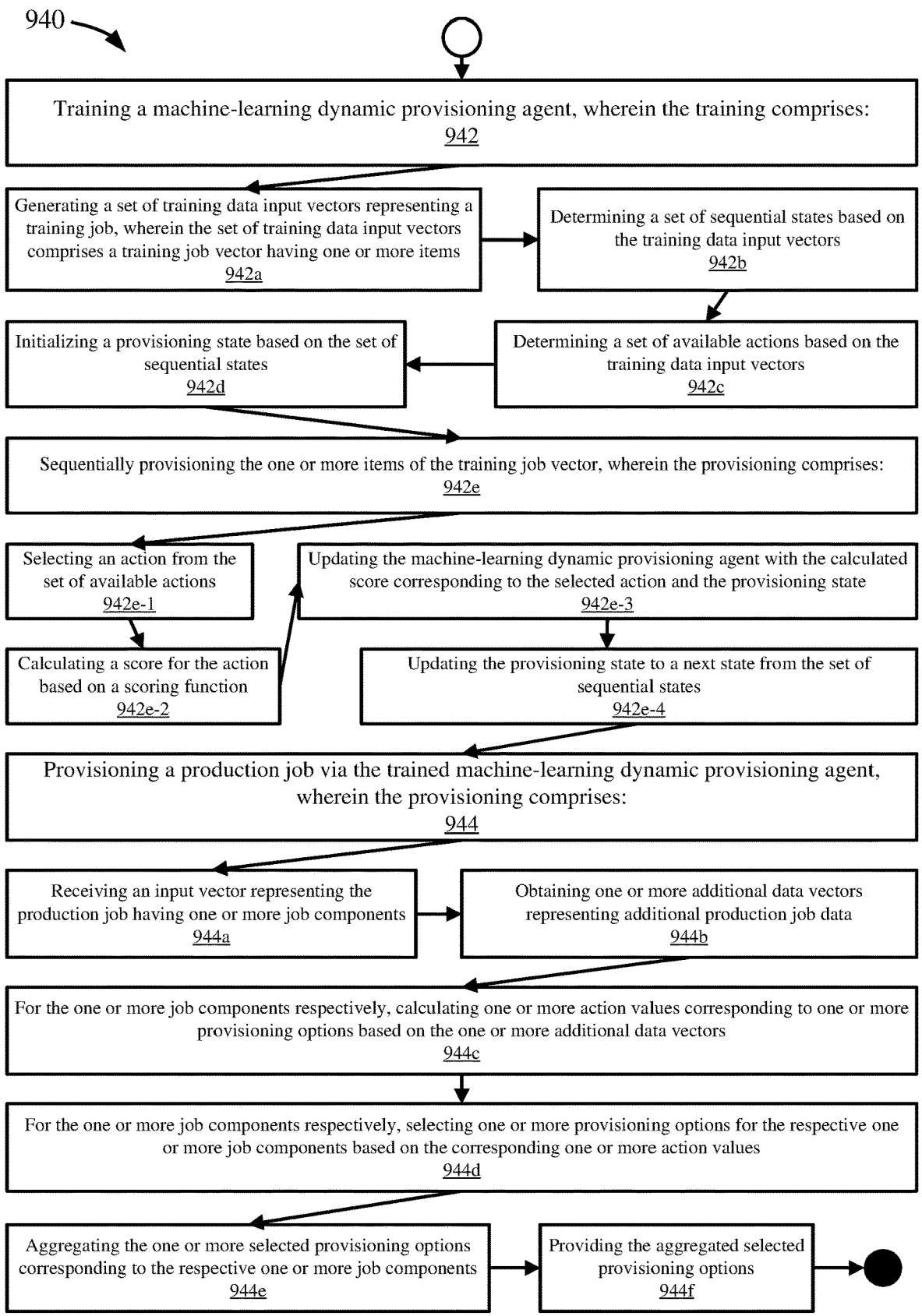
FIG. 9C is a flowchart illustrating a process for training and provisioning through a deep-Q network.

FIG. 9C is a flowchart illustrating a process 940 for training and provisioning a job through a deep-Q network. A machine-learning dynamic provisioning agent may be trained at 942. The training may include the following. A set of training data input vectors representing a training job may be generated at 942$a$. The set of training data input vectors may have a training job vector having one or more items. A set of sequential states based on the training data input vectors may be determined at 942$b$. A set of available actions based on the training data input vectors may be determined at 942$c$. A provisioning state based on the set of sequential states may be initialized at 942$d$. The one or more items of the training job vector may be sequentially provisioned at 942$e$. The sequential provisioning may include selecting an action from the set of available actions at 942$e$-1, calculating a score for the action based on a scoring function at 942$e$-2, updating the machine-learning dynamic provisioning agent with the calculated score corresponding to the selected action and the provisioning state at 942$e$-3, and updating the provisioning state to a next state from the set of sequential states at 942$e$-4.

A production job may be provisioned at 944 via the trained machine-learning dynamic provisioning agent. The provisioning may include the following. An input vector representing the production job having one or more job components may be received at 944$a$. One or more additional data vectors representing additional production job data may be obtained at 944$b$. For the one or more job components respectively, one or more action values corresponding to one or more provisioning options may be calculated based on the one or more additional data vectors at 944$c$. For the one or more job components respectively, one or more provisioning options for the respective one or more job components may be selected based on the corresponding one or more action values at 944$d$. The one or more selected provisioning options corresponding to the respective one or more job components may be aggregated at 944$e$. The aggregated selected provisioning options may be provided at 944$f$.

Example 15—Artificial Training Data Generator Overview

Generally, developing a reliable and effective machine-learning process requires training the machine-learning algorithm, which generally requires training data appropriate for the problem being solved by the trained algorithm. Often, a massive amount of data is needed to effectively train a machine-learning algorithm. Generally, real-world or "production" data is used in training. However, production data is not always available, or not available in sufficiently large amounts. In such cases, it may take significant time before a machine-learning component can be independently used. That is, a process can be manually implemented, and the results used as training data. Once enough training data has been acquired, the machine-learning component can be used instead of manual processing. Or, a machine-learning component can be used that has been trained with less than a desired amount of data, and the results may simply be suboptimal until the machine-learning component undergoes further training.

In some cases, even if it is available, production data cannot be safely used, or at least without further processing. For instance, production data may include personally identifying information for an individual, or other information protected by law, or trade secrets or otherwise which should not be shared. In some cases, legal agreements, or the lack of a contractual or other legal agreement, may prohibit the use or transfer of production data (or even previously provided development testing data). Data masking or other techniques may not always be sufficient or cost-effective to make production data useable for machine-learning training. Even if data is available, and can be made useable for training, significant effort may be required to restructure or reformat the data to make it useable for training.

In some cases, such as for outcome-based machine-learning training (e.g. reinforcement learning), production data may be available as input to the algorithm, but no determined outcome is available for training the algorithm. This type of production data may have output saved for the given inputs, but no indication (or labelling) if the output is desirable or not (effective or otherwise correct). Such data that lacks the inclusion of labelled outputs is generally not useful for training machine-learning algorithms that target particular outputs or results, but may be useful for algorithms that identify information or traits of the input data. In some cases, it is not possible to determine the output results for given inputs, or to determine if the output results are desirable (or otherwise apply a labelling, categorization, or classification). In other cases, doing so would be far more difficult or time- or resource-consuming than generating new training data.

Generating artificial training data according to the present disclosure may remedy or avoid any or all of these problems. As used herein, "artificial training data" refers to data that is in whole or part created for training purposes and is not entirely, directly based on normal operation of processing which is to be analyzed using a trained machine-learning component. In at least some cases, artificial training data does not directly include any information from such normal processing. As will be described, artificial training data can be generated using the same types of data, including constraints on such data, which can be based on such normal processing. For example, if normal processing results in possible data values between 0 and 10, artificial training data can be similarly constrained to have values between 0 and 10. In other cases, artificial training data need not be constrained, or need not have the same constrains as data that would be produced using normal processing which will later be analyzed using the trained machine-learning component.

In many cases, the architecture and programs used to generate training data can also be re-used for training other machine-learning algorithms that are related to, but different from, the initial target algorithm, which may further save costs and increase efficiency, both in time to train an algorithm and by increasing effectiveness of the training. Further, generated training data may be pre-generated training data that can be accessed for use in training a, a later date, or may be generated in real-time, or on-the-fly, during training. Generated training data may be realistic, such as when pre-generated, or it may minimally match the necessary inputs of the machine-learning algorithm but otherwise not be realistic, or have a varying level of realism (e.g. quality). Generally, a high-level of realism is not necessary in the generated training data for the training data to effectively and efficiently train a machine-learning algorithm.

Surprisingly, it has been found that, at least in some cases, artificial training data can be more effective at training a machine-learning component than using "real" training data. In some implementations, such effectiveness can result from training data that does not include patterns that exactly replicate real training data, and may include data that is not constrained in the same way as data produced in normal operation of a system to be analyzed using the machine-learning component. Thus, disclosed technologies can provide improvements in computer technology, including (1) better data privacy and security by using artificial data instead of data that be may associated with individuals; (2) data that can be generated with less processing, such as processing that would be required to anonymize or mask data; (3) improved machine-learning accuracy by providing more extensive training data; (4) having a machine-learning component be available in a shorter time frame; and (5) improved machine-learning accuracy by using non-realistic, artificial training data.

Example 16—Machine-Learning and Training Data

Machine-learning algorithms or systems (e.g. artificial intelligence) as described herein may be any machine-learning algorithm that can be trained to provide improved results or results targeted to a particular purpose or outcome. Types of machine-learning include supervised learning, unsupervised learning, neural networks, classification, regression, clustering, dimensionality reduction, reinforcement learning, and Bayesian networks.

Training data, as described herein, refers to the input data used to train a machine-learning algorithm so that the machine-learning algorithm can be used to analyze "unknown" data, such as data generated or obtained in a production environment. The inputs for a single execution of the algorithm (e.g. a single value for each input) may be a training data set. Generally, training a machine-learning algorithm includes multiple training data sets, usually run in succession through the algorithm. For some types of machine-learning, such as reinforcement learning, a desired or expected output is also part of the training data set. The expected output may be compared with output from the algorithm when the training data inputs are used, and the algorithm may be updated based on the difference between the expected and actual outputs. Generally, each processing of a set of training data through the machine-learning algorithm is known as an episode or cycle.

Example 17—Training Data Generator System Architecture

Figure 10:
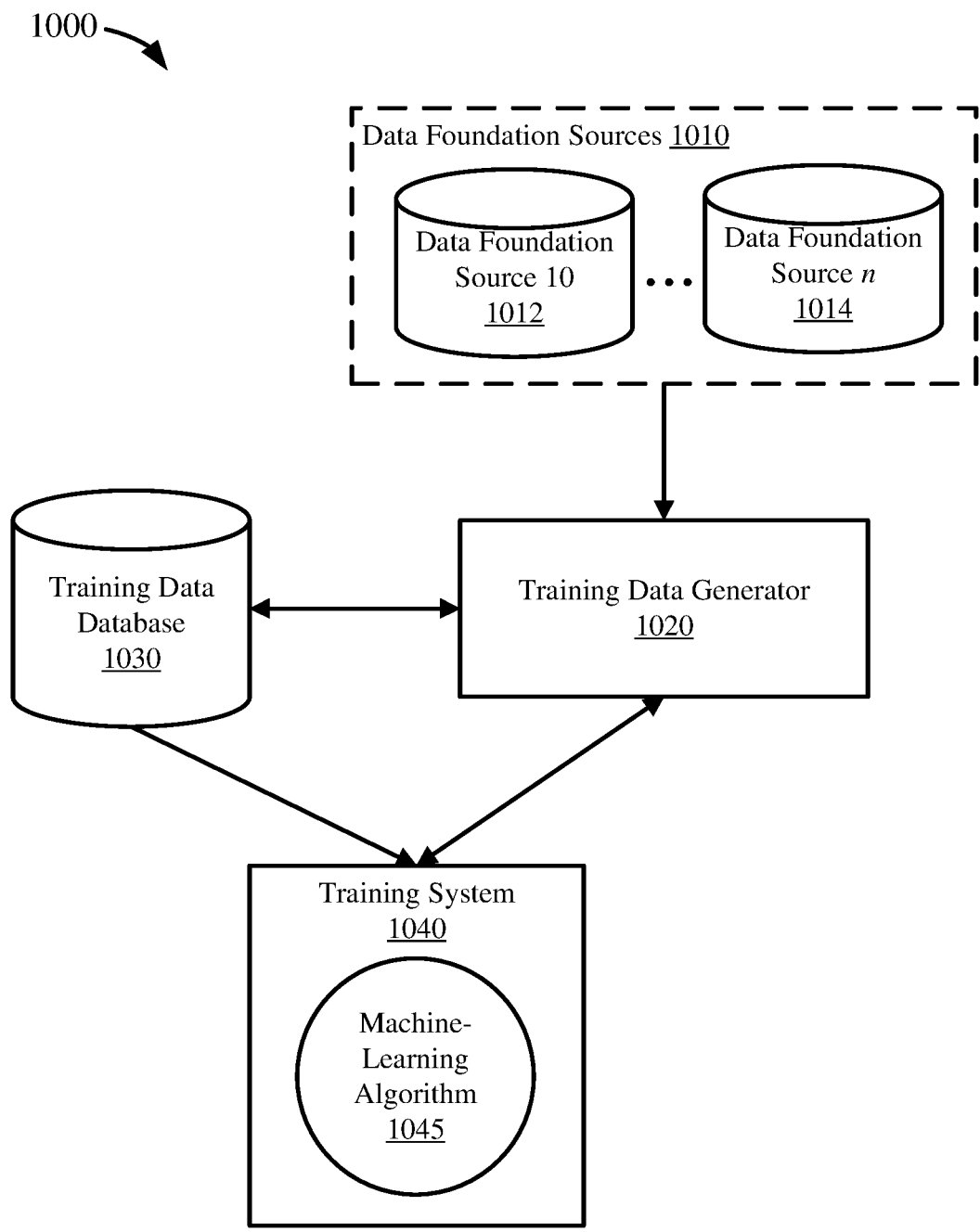
FIG. 10 is a schematic diagram depicting an architecture of a training data generator system.

FIG. 10 is a schematic diagram depicting an architecture 1000 of a training data generator system. A training data generator 1020 may generate artificial training data for training a machine-learning algorithm 1045, as described herein. The training data generator 1020 may access a training data database 1030. The training data generator 1020 may retrieve data from, or store data in, the training data database 1030. The training data generator 1020 may also access a training system 1040. In some embodiments, the training data generator 1020 and the training system 1040 may be fully or partially integrated together. In some embodiments, the training data generator 1020 may be composed of several programs, designed to interact or otherwise be compatible with each other, or be composed of several microservices similarly integrated.

The training data database 1030 may be a database or database management system housing training data for training a machine-learning algorithm. Generally, the database 1030 may store multiple sets of training data for training a given machine-learning algorithm. In some embodiments, the database 1030 may store many different groups of training data, each group for training a separate or different machine-learning algorithm for a separate or different purpose (or on a different group of data); each group generally will have multiple sets of data.

One or more training systems 1040 may access the training data database 1030, such as to retrieve training data for use in training the machine-learning algorithm 1045. In some embodiments, the database 1030 may be a file storing the training data, such as in a value-delimited format, which may be provided to the training system 1040 directly (e.g.

the file name provided as input to the training system, then read into memory for the training system, or otherwise accessed programmatically). In other embodiments, the training data database 1030 may be a database system available on a network, such as through a developed database interface, stored procedures, or direct queries, which can be received from the training system 1040.

The training system 1040 may train the machine-learning algorithm 1045 using training data as described herein. Training data, as used through the remainder of the present disclosure should be understood to refer to training data that includes at least some proportion of artificial training data. In some scenarios, all of the training data can be artificial training data. In other scenarios, some of the training data can be artificial training data and other training data can be real training data. Or, data for a particular training data set can include both artificial and real values.

Generally, the training system 1040 obtains training data from either the training data database 1030, from the training data generator 1020, or a combination of both. The training system 1040 feeds the training data to the machine-learning algorithm 1045 by providing the training inputs to the algorithm and executing the algorithm. In some cases, the output from the algorithm 1045 is compared against the expected or desired output for the given training data set, as obtained from the training data, and the algorithm is then updated based on the differences between the current output and expected output.

The training data generator 1020 may access one or more data foundation sources 1010, such as data foundation source 1 1012 through data foundation source n 1014. The training data generator 1020 may use data obtained from the data foundation sources 1010 to generate one or more fields or input vectors of the generated training data.

For example, an address field may be an input vector for a machine-learning algorithm. The training data generator 1020 may access an available post office database, which may be data foundation source 1 1012, to obtain valid addresses for use as the address input vector during training. Another input vector field may be a resource available for use or sale, such as maintained in an internal database of all available computing resources, which may be another data foundation source 1010. Such internal database may be accessed by the training data generator 1020 for obtaining valid resources available as input to the machine-learning algorithm.

In other scenarios, the training data generator 1020 may access one or more data foundation sources 1010 to determine parameters for generating the training data. For example, the training data generator may access a census database to determine the population distribution across various states. This population distribution data may be used to generate a similar distribution of addresses for an address input vector. Thus, the data foundation sources 1010 may be used to increase the realism of the training data, or otherwise provide statistical measures for generating training data. However, as described above, in some scenarios, it may be desirable to decrease the realism of the training data, as that can result in a trained machine-learning component that provides improved results compared to a machine-learning component trained with real data (or, at least, when the same amounts of training data are used for both cases).

Data foundation sources 1010 may be external data sources, or may be internal data sources that are immediately available to the training data generator 1020 (e.g. on the same network or behind the same firewall). Example data foundation sources are Hybris Commerce™, SAP for Retail, SAP CAR™, or SAP CARAB™, all from SAP, SE (Walldorf, Germany), specific to an example for a machine-learning order sourcing system. Other examples may be U.S. Census Bureau reports or the MAXMIND™ Free World Cities Database. Further examples may include internal databases such as warehouse inventories or locations, or registers or computer resources, availability, or usage.

Once trained, the machine-learning algorithm 1045 may be used to analyze production data, or real-world inputs, and provide the substantive or production results for use by a user or other computer system. Generally, the quality of these production results may depend on the effectiveness of the training process, which may include the quality of the training data used. In this way, the generated artificial training data may improve the quality of the production results the machine-learning algorithm 1045 provides in production by improving the training of the machine-learning algorithm.

Example 18—Pre-Generating Training Data

Figure 11A:
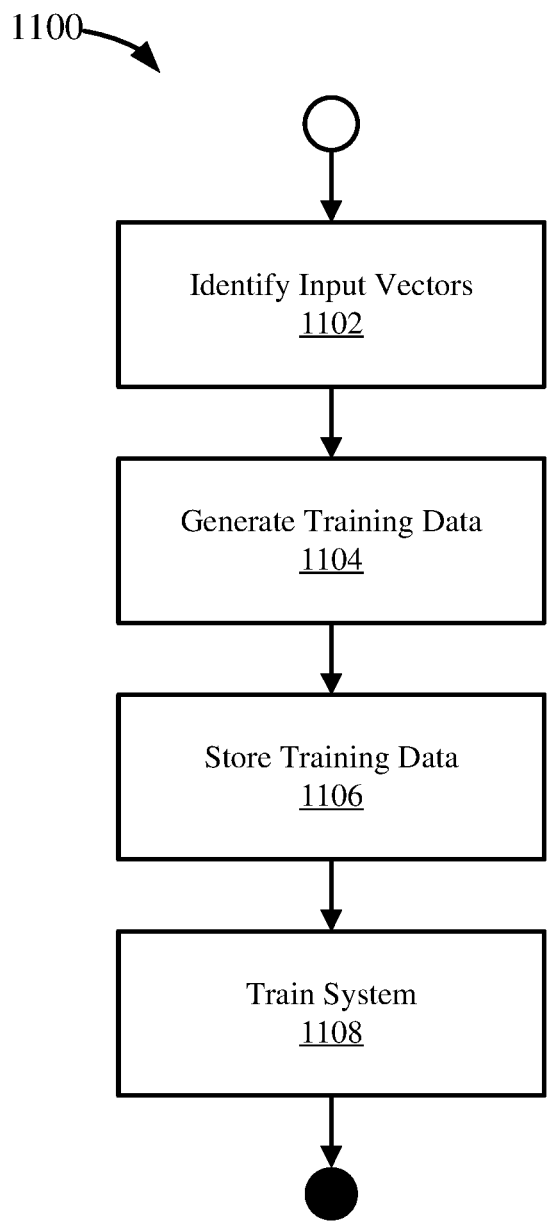
FIG. 11A is a flowchart illustrating a process for pre-generating training data.

FIG. 11A is a flowchart illustrating a process 1100 for pre-generating training data. Input vectors are identified at 1102. Generally, the input vectors are the input variables of the machine-learning algorithm which the training, using the generated artificial training data, is intended to train. An input vector may be a simple variable or a complex variable, or an input vector may include one or more simple variables, one or more complex variables, or a combination thereof, including within a vector format or within another data structure or data collection (e.g., an instance of an abstract or complex data type, a collection of objects, such as an array, or a data structure, such as a tree, heap, queue, list, stack, etc.). The simple variables typically have one or more of a single value or a primitive data type (e.g., float, int, character array). Complex variables typically have multiple values and/or composite or abstract data types. Either simple variables or complex variables can be associated with a data structure. In some scenarios, the input vectors may be interrelated, or otherwise have relationships with one or more other input vectors. Generally, the input vectors may be the definitions of the data that will be generated as the training data. The input vectors may define, directly or indirectly, the generated training data.

For example, an input vector may be a simple integer-type variable (type INT). Thus, one field of the training data may correspond to this input vector, and similarly be an integer-type variable. As another example, an input vector may be a complex data structure (or a composite or abstract data type) with three simple variables of types STRING, INT, and LONGINT. Thus, one field of the training data may correspond to this input vector and similarly be a complex data structure with the specified three simple variables. Alternatively, the training data may have three simple variables corresponding to those in the complex data structure input variable, but not have the actual data structure.

Identifying input vectors may include analyzing the object code or source code of the target machine-learning system (e.g. the machine-learning algorithm to be trained) to determine or identify the input arguments to the target system. Thus, identifying the input vectors at 1102 may include receiving one or more files containing the object code or source code for the target system, or receiving a file location or namespace for the target system, and accessing the files at the location or namespace. Data from a file, or other data source, can be analyzed to determine what input vectors or arguments are used by the target system, which can in turn be used to define the input vector or arguments for which artificial training data will be created. In this way, disclosed technologies can support automatic creating of artificial training data for an arbitrary machine-learning system or use case scenario.

Additionally or alternatively, identifying the input vectors may include determining or retrieving the input vectors from a data model for the target machine-learning system. This determining or retrieving may include accessing one or more files or data structures (e.g. a database) with the data model information for the target system and reading the input vector or input argument data. In some embodiments, the input vectors may be provided through a user interface, which may allow a user to provide one or more input vectors with an associated type, structure, length, or other attributes necessary to define the input vectors and generate data that matches the input vector. In other embodiments, the input vector definitions may be provided in a file, such as a registry file or delimited value file, and thus identifying the input vectors may include reading or accessing this file.

Training data may be generated at 1104. Generating training data may include generating one or more sets of data, where each set of data has a value for each input vector identified at 1102. In some scenarios, each set of data may have sufficient values to provide a value for the identified input vectors, but the values in the set of training data may not correspond one-for-one to the input vectors. For example, some training data may be generated that allows an input vector to be calculated at the time of use, such as generating a date-of-birth field for the training data and calculating an age based on the date-of-birth training data for the input vector.

The training data may be generated at 1104 using various parameters, definitions, or restrictions, on the values of the input vectors, or may be generated based on statistical models or distributions for the values of the input vectors, either individually or in groups. Generating training data at 1104 generally includes generating training data objects and training data scenarios, as described in process 1130 shown in FIG. 11C.

Generally, a fixed number of data sets of the generated training data are generated a, a given time. An input number may be provided that determines the number of training data sets to be generated. For example, 100,000 data sets of training data may be requested, and so training data for the identified input vectors may be generated for 100,000 sets (or 100,000 times); if there are, for example, 10 input vectors, then values for the 10 input vectors will be generated 100,000 times. Generally, values for the training data may be generated by set, rather than by input vector. However, in some embodiments, the training data may be generated by variable (or input vector) rather than by set.

Each set of generated training data may be generated randomly or semi-randomly, within any constraints of the parameters, domain, data foundation, and so on. Generally, such randomized sets of training data are sufficient to train a machine-learning algorithm for a given task. In some cases, more exotic data samples may be useful to expand the range of possible inputs that the machine-learning algorithm can effectively process once trained. A Poisson distribution (a discrete probability distribution) may be used in generating training data. The Poisson distribution generally expresses the probability of a given number of values occurring in a fixed interval. Thus, the distribution of values generated can be controlled by using a Poisson distribution and setting the number of times a given value is expected to be generated over a given number of iterations (where the number of iterations may be the number of sets of training data to be generated).

Further, generating the training data may also include generating expected results or output data for the generated set of input data. Expected output data may be part of its respective set of training data. For a set of data, the output data may be one or more fields, depending on the desired results from the machine-learning algorithm. In some embodiments, generating the training data may be accomplished by first generating output results for a given set, and then generating the input variables based on the generated output results (e.g. reverse engineering the inputs).

The generated training data is stored at 1106. The training data may be stored in a database, such as the training data database 1030 shown in FIG. 10. The training data may alternatively or additionally be stored in a file or other data storage system. In some embodiments, the training data is stored after all the training data has been generated. In other embodiments, the training data is stored as it is generated; generally, this will consume less local memory during generation of the training data. For example, once a set of training data is generated, it may be stored before or while the next set of training data is generated.

The machine-learning algorithm or system is trained at 1108. Training the machine-learning algorithm may include accessing the training data stored at 1106 and feeding it into the machine-learning algorithm. This may be accomplished by the training system 1040 as shown in FIG. 10. Generally, training the algorithm includes providing a single set of training data inputs to the machine-learning algorithm, running the algorithm with the generated training data inputs, obtaining the results of the algorithm from processing the inputs, comparing the results to expected results (e.g. the generated expected results for the given training data set), and updating the algorithm based on the differences between the output and the expected results. This process may be repeated for all available generated training data sets as part of training the machine-learning algorithm. Training may continue until the differences between the output from the algorithm and the expected results are below a certain threshold, below a threshold for a given number of training cycles, or for a given number of training cycles or episodes.

Figure 11B:
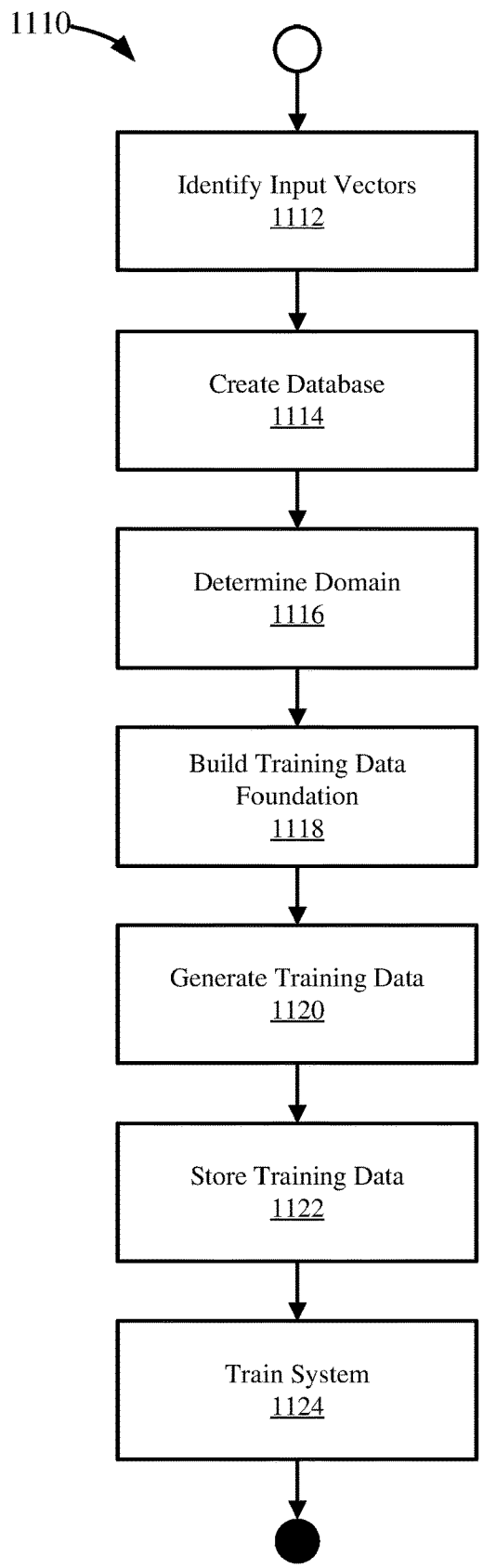
FIG. 11B is a flowchart illustrating a detailed process for pre-generating training data.

FIG. 11B is a flowchart illustrating a detailed process 1110 for pre-generating training data. Input vectors are identified at 1112. Identifying input vectors at 1112 may be similar to step 1102 as shown in FIG. 11A. The input vectors may be the input variables of the machine-learning algorithm, as described herein.

A database for storing the generated training data is created or accessed at 1114. The database may serve as a central storage unit for all generated training data and data sets, and further may provide a simplified interface or access to the generated training data. Such a database may be the training data database 1030 shown in FIG. 10. The database may allow generated training data to be re-used in the future, further refined to improve training results, or altered or adapted for training different algorithms or training to a different purpose or goal.

Creating the database at 1114 (or a altering a previously created database) may include defining multiple fields, multiple tables, or other database objects, and defining interrelationships between the tables, fields, or the other database objects. Creating the database at 1114 may further include developing an interface for the database, such as through stored procedures. Generally, creating the database at 1114 includes using the identified input vectors from step 1112 to determine or define the requisite database objects and relationships between the objects, which may correlate to the input vectors in whole or in part. For example, a given input vector may have a table created for storing generated training data for that input vector. As another example, a given input vector may be decomposed into multiple tables for storing the generated training data for the given input vector. In a yet further example, a table can have records, where each record represents a set of training data, and each field defines or identifies one or more values for one or more input vectors that are included in the set.

Using a database as described herein may allow the generation of training data to be accomplished at different times based on the different data fields generated. For example, training data for a given input vector may be generated at one time and stored in a given table in a database created at 1114 for the training data. Later, training data for a different input vector may be generated and stored in another table in the database. In this way, pre-generating training data may be further divided or segmented to allow more flexibility or more efficient use of computing resources (e.g. scheduling training data generation during low-use times on network servers, or generating training data for new input vectors without regenerating training data for input vectors previously generated). Such segmentation of training data generation may be further accomplished according to process 1130 shown in FIG. 11C. Thus, creating a training data database may provide increased flexibility and efficiency in generating training data.

The domain or environment for the generated training data is determined at 1116. Determining a domain or environment may include defining parameters for the input vectors being generated as the training data. The parameters can define the domain with respect to a particular task to which the trained machine-learning algorithm will be put, and then further translating that definition to the specific input vectors and training data. That is, even for the same input vectors, the parameters for the input vectors can vary depending on specific use cases. Determining a domain or environment may additionally or alternatively include defining one or more functions for evaluating or scoring results generated by the training data when processed through the target machine-learning system, or determining parameters for generating expected outcome results in addition to generating the input training data.

Generally, defining the domain or environment should result in a restricted, or well-defined environment for the training data, which ultimately leads to a well-trained or adapted machine-learning algorithm for the particular task to which it is put. The environment may include defining values or ranges for the various input vectors of the training data, or weights for the various input vectors, or a hierarchy of the input vectors. Defining the environment may also include adding or removing particular input vectors, or incorporating several input vectors together (such as through a representational model). Data defining the domain may be stored in local variables or data structures, a file, or the database created at 1114, or may be used to modify or limit the database.

By defining the domain for the generated training data, the training data will more effectively train a machine-learning algorithm for a given task, rather than training the machine-learning algorithm for a generic solution. In many scenarios, a machine-learning algorithm trained for a specific task or domain may be preferable to a generic machine-learning solution, because it will provide better output results than a generic solution, which may be trying to balance or select between countervailing interests. Defining the domain of the generated training data focuses the generated training data so that it in fact trains a machine-learning algorithm to the particular domain or task, rather than any broad collection of input vectors.

For example, a machine-learning algorithm may be trained to provide product sourcing for a retail order. However, the expectations for fulfilling a retail order may be very different for different retail industries. In the fashion industry, for example, orders may generally have an average of five items, and it generally does not matter which items are ordered, only whether the items are in stock or not. However, in the grocery industry, orders may contain 1000+ items, and different items may need to be shipped or packaged differently, such as fresh produce, frozen items, or boxed/canned items. Thus, the domain for a machine-learning order-sourcing algorithm for a fashion retailer may focus on cost to ship and customer satisfaction, whereas an order-sourcing algorithm for a grocer may focus on minimizing delivery splits, organizing packaging, or ensuring delivery within a particular time.

As another example, a machine-learning algorithm may be trained to provide resource provisioning for computer resource allocation requests. Again, the expectations for fulfilling resource provisioning requests may vary for different industries or different computing arenas. In network routing, for example, network latency may be a key priority in determining which resources to provision for analyzing and routing data packets. However, in batch processing, network latency may not be a consideration or may be a minimal consideration. Memory quantity or core availability may be more important factors in provisioning computing resources for batch processing. Thus, the domain for network resource provisioning may focus on availability (uptime) and latency, whereas the domain for batch processing may focus on computing power and cache memory available.

A training data foundation may be built or structured at 1118. The training data foundation may be a knowledge base or statistical foundation for the training data to be generated. This data foundation may be used to ensure that the generated training data is realistic training data, and so avoid noise, or sufficiently unrealistic training data that the data inaccurately trains a machine-learning algorithm when used. However, as described above, in some cases it has been found, surprisingly, that unrealistic training data may actually be more effective for training than realistic data. Or, the degree of realism may not matter or have much impact, which can simplify the process of generating artificial training data, as fewer "rules" for generating the data need be considered or defined. In some cases, a training data foundation may make the generation of training data simpler or less time or resource intensive.

The data foundation may be built from varying sources of data, such as the data foundation sources 1010 shown in FIG. 10. The training data foundation may be sets of data which may be used to generate the training data, or may be statistical models or distributions of data which may be used in generating the training data. In some scenarios, the statistical models or distributions of data may be derived from one or more data sets being used to build the training data foundation. The degree of realism of the training data may be adjusted based on the use of data foundation sources and the degree or extent to which the training data foundation is built. In some embodiments, the training data foundation may be constructed, or modified, based on the domain determined at 1116. That is, the domain may allow values to be removed from the training data foundation, or used in filtering values retrieved from the training data foundation. In some embodiments, the data foundation may define, at least in part, the parameters for the generated training data, such as from the domain determined at 1116.

For example, continuing the resource provisioning example, training data may be generated for resource addresses, for which an IP address may be sufficient address information. A list of IP addresses may be obtained from a data source, such as a registry of local or accessible network locations. This list may be part of the data foundation for generating the training data. For cases generating less realistic training data, the selection of addresses, for generated jobs, from the data foundation list may be random, or evenly distributed, or so on. For cases generating more realistic data, usage distribution data may be obtained for each address, and the addresses selected for jobs based on their percentage of the overall usage, such that more used addresses have more jobs and less used addresses have fewer jobs.

The data foundation may be set, at least in part, through a user interface. Such a user interface may allow data sources to be selected or input (e.g. web address), or associated with one or more input vectors or parameters.

Training data may be generated at 1120. Generating training data at 1120 may be similar to step 1104 as shown in FIG. 11A. Generating training data may include generating one or more sets of data, where each set of data has a value for each input vector identified at 1112. In some scenarios, each set of data may have sufficient values to provide a value for the identified input vectors, but the values in the set of training data may not correspond one-for-one to the input vectors. The training data may be generated using various parameters, definitions, or restrictions, on the values of the input vectors, or may be generated based on statistical models or distributions for the values of the input vectors, either individually or in groups. The parameters or statistical models (or other input vector definitions) may be determined or derived from the domain, determined at 1116, or from the training data foundation, built at 1118. Generating training data at 1120 generally includes generating training data objects and training data scenarios, as described in process 1130 shown in FIG. 11C. Generally, a fixed number of training data sets (or training data objects and training data scenarios) of the generated training data are generated at a given time, as described herein.

The generated training data is stored at 1122. Storing the training data at 1122 may be similar to step 1106 as shown in FIG. 11A. The training data may be stored in the database created at step 1114, which may be the training data database 1030 shown in FIG. 10. The training data may alternatively or additionally be stored in a file or other data storage system. In some embodiments, the training data is stored after all the training data has been generated. In other embodiments, the training data is stored as it is generated; generally, this will consume less local memory during generation of the training data. For example, once a set of training data is generated, it may be stored before or while the next set of training data is generated.

The machine-learning algorithm or system is trained at 1124. Training the machine-learning system at 1124 may be similar to step 1108 as shown in FIG. 11A. Training the machine-learning algorithm may include accessing the stored generated training data and feeding it into the machine-learning algorithm, as described herein.

Figure 11C:
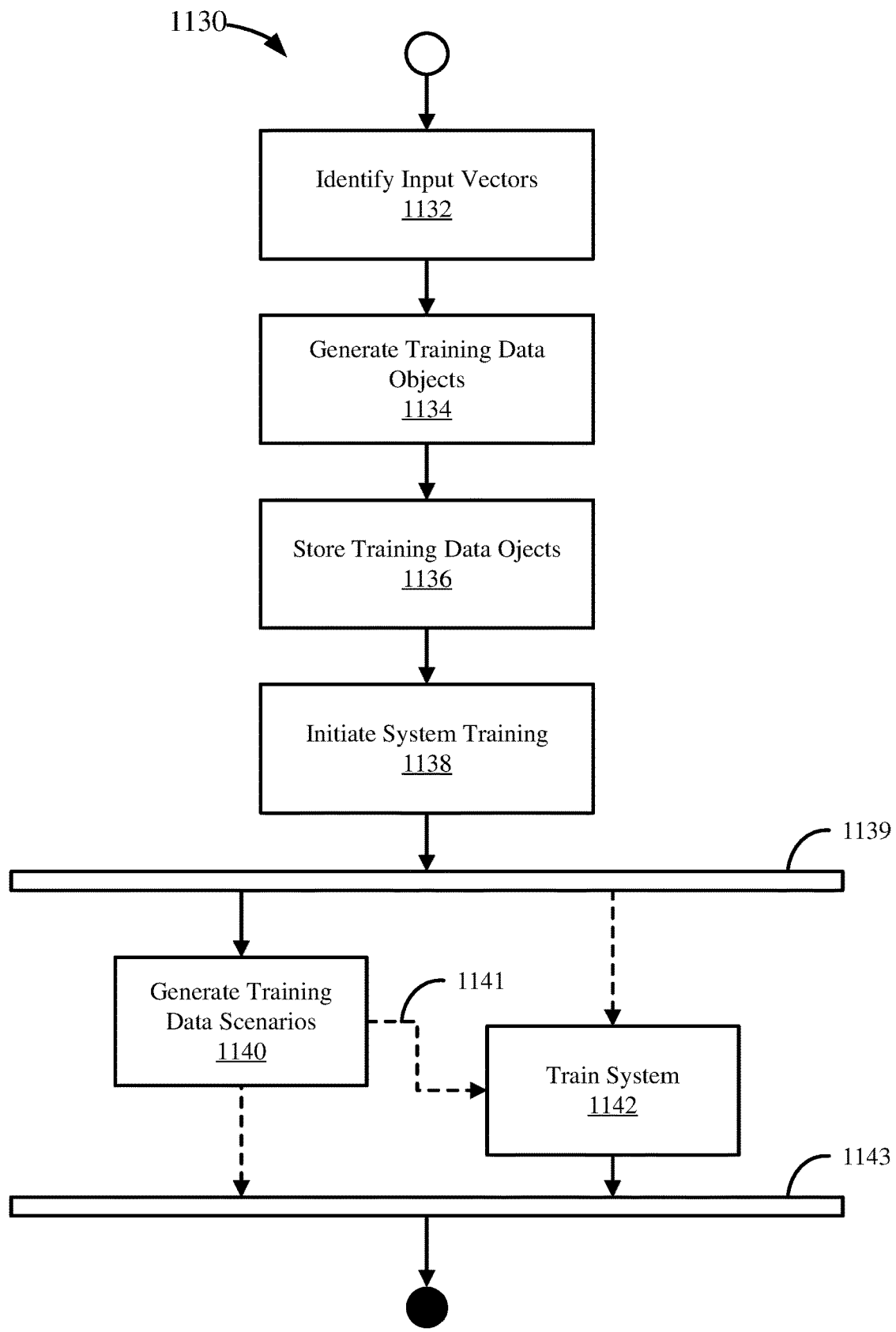
FIG. 11C is a flowchart illustrating a split process for pre-generating training data.

FIG. 11C is a flowchart illustrating a split process 1130 for pre-generating training data. Input vectors are identified at 1132. Identifying input vectors at 1132 may be similar to steps 1102 and 1112 as shown in FIGS. 2A and 2B. The input vectors may be the input variables of the machine-learning algorithm, as described herein.

Training data objects may be generated at 1134. Generating training data objects at 1134 may be similar, in part, to steps 1104 and 1120 as shown in FIGS. 2A and 2B. However, generating the training data objects generally does not include generating full sets of training data (e.g. the training data scenarios or sets of input vectors). For example, a machine-learning algorithm for resource provisioning may take as an input a resource request job, which may include input vectors of a requestor address, multiple resources, and resource availability or locations. Generating training data objects at 1134 generally includes generating one or more requestor addresses, one or more resources, and one or more resource locations or availability, with the relevant information (e.g. fields or attributes) for each. However, the actual resource request jobs (e.g. a particular requestor address associated with a particular one or more requested sources) is not yet generated; such jobs may generally be training data scenarios, each of which would be a training data set. In this way, the training data objects are pre-generated before training, but not all the particular input vector sets.

In some embodiments, generating training data objects at 1134 may include creating a database, determining a domain, or building a training data foundation, as in steps 1114, 1116, and 1118 shown in FIG. 11B.

Generating training data objects may include generating one or more values for one or more input vectors identified at 1132. In some scenarios, each set of data may have sufficient values to provide a value for the identified input vectors, but the values in the set of training data may not correspond one-for-one to the input vectors. The training data objects may be generated using various parameters, definitions, or restrictions, on the values of the input vectors, or may be generated based on statistical models or distributes for the values of the input vectors, either individually or in groups. The parameters or statistical models (or other input vector definitions) may be determined or derived from the domain or from the training data foundation.

The generated training data objects are stored at 1136. Storing the training data objects at 1136 may be similar to steps 1106 and 1122 as shown in FIGS. 2A and 2B. The training data objects may be stored in a database, which may be a database created at step 1134, which may further be the training data database 1030 shown in FIG. 10.

Training the machine-learning system is initiated at 1138. Training initiation may include setting the target machine-learning algorithm into a state to receive inputs, process the inputs to generate outputs, then be updated or refined based on the generated output. Once the system training is initiated at 1138, the training process may be parallelized at 1139.

Training data scenarios are generated at 1140. Generally, the training data scenarios are generated based on the training data objects, as generated at 1134. Generating training data scenarios may include retrieving one or more training data objects from storage and arranging them as a set of input vectors for the machine learning algorithm. This may further include generating one or more additional input vectors or other input values that are not the previously generated training data objects, or are based on one or more of the previously generated training data objects. Extending the previous resource provisioning example for the training data objects, the training data scenarios generated at 1140 may be resource request jobs composed from the previously generated requestor addresses and available resources, and further include the available resource locations. For example, when generating a training data scenario such as for the resource provisioning example, a database storing training data objects for requestors, resources, and locations may be accessed to generate a training resource provisioning job. A requestor (e.g. a previously generated training data object) may be selected in generating in the job (e.g. training data scenario), which may include selecting a row of a requestor table; other input vectors may be similarly selected, such as by obtaining one or more previously generated resources from a resources table and so on. In this way, the training data objects previously generated may be used to generate a training data scenario, which may generally be a complete training data set or complete set of input vectors. Generating the training data scenarios may further include generating the expected outputs for the given training data scenario.

As a given training set or scenario is generated at 1140, it is then provided 1141 to train the machine-learning system at 1142. Training the machine-learning system at 1142 may be similar to step 1108 and 1124 as shown in FIG. 11A and FIG. 11B. Training the machine-learning algorithm may include accessing the stored generated training data and feeding it into the machine-learning algorithm. For example, a training data scenario may reference one or more training data objects stored at 1136; such training data objects may have been retrieved as part of generating the training data scenario, or may need to be retrieved to complete the input vectors for training the system. Supplying the generated training data to the machine-learning algorithm may be accomplished by the training system 1040 as shown in FIG. 10, which may include receiving the generated training data scenario from 1140 or accessing training data objects stored at 1136, or both. Generally, training the algorithm includes providing a single set of training data inputs to the machine-learning algorithm (e.g. the training data scenarios generated at 1140 based on the previously generated training data objects at 1134), running the algorithm with the generated training data inputs, obtaining the results of the algorithm processing the inputs, comparing the results to expected results (e.g. the generated expected results for the given training data set), and updating the algorithm based on the differences between the output and the expected results. This process may be repeated for all generated training data scenarios as part of training the machine-learning algorithm. Training may continue until the differences between the output from the algorithm and the expected results are below a certain threshold, below a threshold for a given number of training cycles, or for a given number of training cycles or episodes (e.g. a given number of training data scenarios may be generated). Once the requisite number of training data scenarios are generated 1140 and used to train the system 1142, the parallelization is closed at 1143.

In another embodiment, the process 1130 may be implemented without the parallelization at 1139 to 1143. In one such scenario, the training data scenarios may be generated iteratively at 1140 and used to train the system at 1142; more specifically, a training data scenario may be generated at 1140, then passed 1141 for use in training the system at 1142, then this is repeated for a desired number of iterations or episodes. In another scenario, the desired number of training data scenarios may be generated at 1140, then the scenarios passed 1141 to be used to train the system at 1142 (e.g. the steps performed sequentially).

FIG. 11D depicts example tables 1150, 1160 of a domain and data foundation for generating artificial training data. The tables 1150, 1160 may be generated during steps 1116 and 1118 of process 1110 as shown in FIG. 11B. Table 1150 may provide parameters 1153 or functions 1155, or both, for input vectors 1151. Generally, an input vector 1151 may have one or more parameters 1153 for generating values for the training data for that input vector. Further, an input vector 1151 may have an associated function 1155 for generating the training data values. In some cases, a vector may not have any parameters 1153, such as for Vector 4. In some cases, a function 1155 may relate to another input vector 1151, such as Vector 4 being calculated based on Vector 1.

Table 1160 may provide a scoring function 1163 for an output vector 1161. Such functions 1163 may be based on the value of the denoted output vector, as generated by the target machine-learning system. The scoring functions 1163 may be used to train the target machine learning system, and may further help optimize the output of the machine-learning system.

Tables 1150, 1160 may be stored in a database, a file, local data structures, or other storage for use in processing during training data generation, as described herein. Further, the vectors 1151, 1161, the parameters 1153 and functions 1155, 1163, may be input and received through a user interface.

Example 19—On-The-Fly Training Data Generator System Architecture

Figure 12:
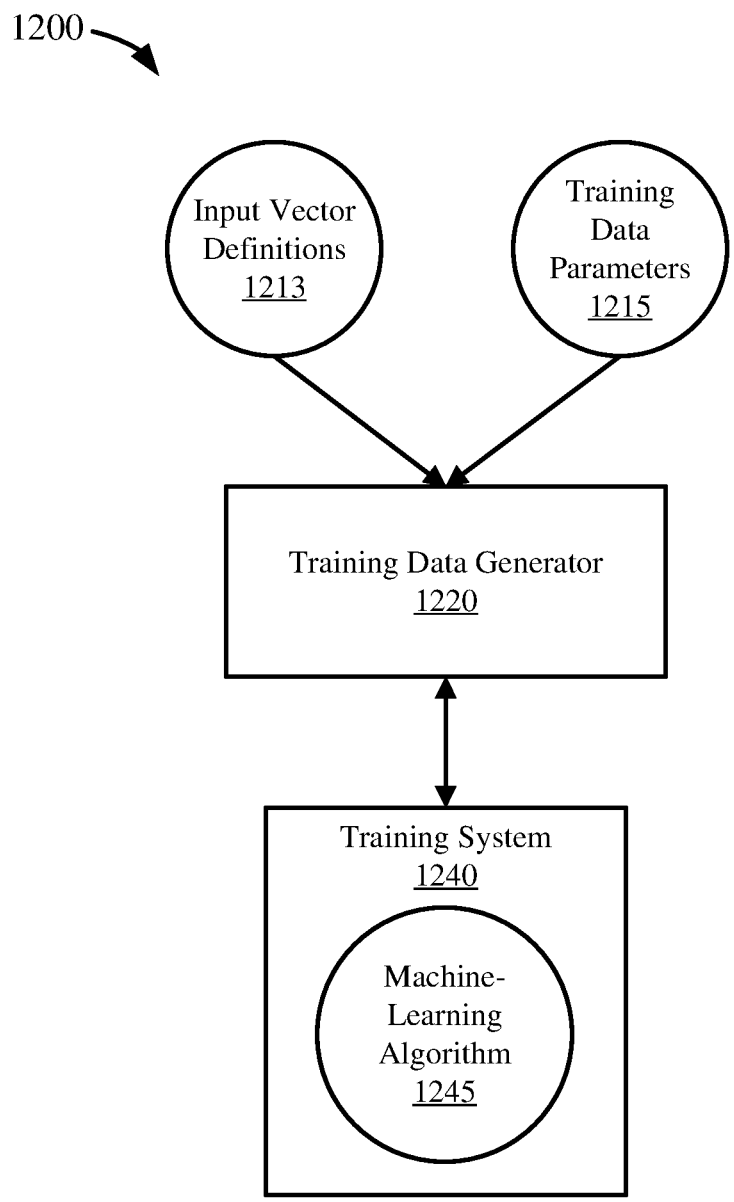
FIG. 12 is a schematic diagram depicting an architecture for an on-the-fly training data generator system.

FIG. 12 is a schematic diagram depicting an architecture 1200 for an on-the-fly training data generator system. A training data generator 1220 may be similar to the training data generator 1020 as shown in FIG. 10. The training data generator 1220 may generate artificial training data for training a machine-learning algorithm 1245, as described herein. The training data generator 1220 may receive or obtain input vector definitions 1213 or training data parameters 1215, or both. The input vector definitions 1213 or the training data parameters 1215 may be received or obtained by the training data generator 1220 as input arguments passed to the training data generator, or may be retrieved from storage, such as a file or database, by the training data generator.

Generally, the input vector definitions 1213 may be the definitions of the input variables of the machine-learning algorithm 1245 which the training data is intended to train, as described herein.

Generally, the training data parameters 1215 may be the parameters for the values or the parameters for generating the values of the input vectors as described in the input vector definitions 1213. Such training data parameters 1215 may define or restrict the possible values of the input vectors, or may define relationships between the input vectors. The training data parameters 1215 may include a data model or statistical model for generating a given input vector. For example, a given input vector may have a parameter set to indicate valid values between 1 and 10, and a generation model set to be random generation of the value. Another example input vector may have a parameter set to indicate valid values that are resource ID numbers in a database, and another parameter is set to indicate that the values are generated based on a statistical distribution of usage of those resources.

The training data generator 1220 may access a training system 1240; for example, the training data generator may call the training system to perform training of the machine learning algorithm 1245 using training data it generated. In other embodiments, the training system 1240 may access the training data generator 1220; for example, the training system may call the training data generator, requesting training data for use in training the machine learning algorithm 1245. In some embodiments, the training data generator 1220 and the training system 1240 may be fully or partially integrated together. In some embodiments, the training data generator 1220 may be composed of several programs, designed to interact or otherwise be compatible with each other, or be composed of several microservices similarly integrated.

The training system 1240 can train a machine-learning algorithm 1245 using training data as described herein. The training system 1240 may be similar to the training system 1040 as shown in FIG. 10. Generally, the training system 1240 obtains training data from the training data generator 1220. The training system 1240 feeds the training data to the machine-learning algorithm 1245 by providing the training inputs to the algorithm and executing the algorithm. In some cases, the output from the algorithm 1245 is compared against the expected or desired output for the given training data set, as obtained from the training data, and the algorithm is then updated based on the differences between the current output and expected output.

Example 20—Generating Training Data On-The-Fly

Figure 13A:
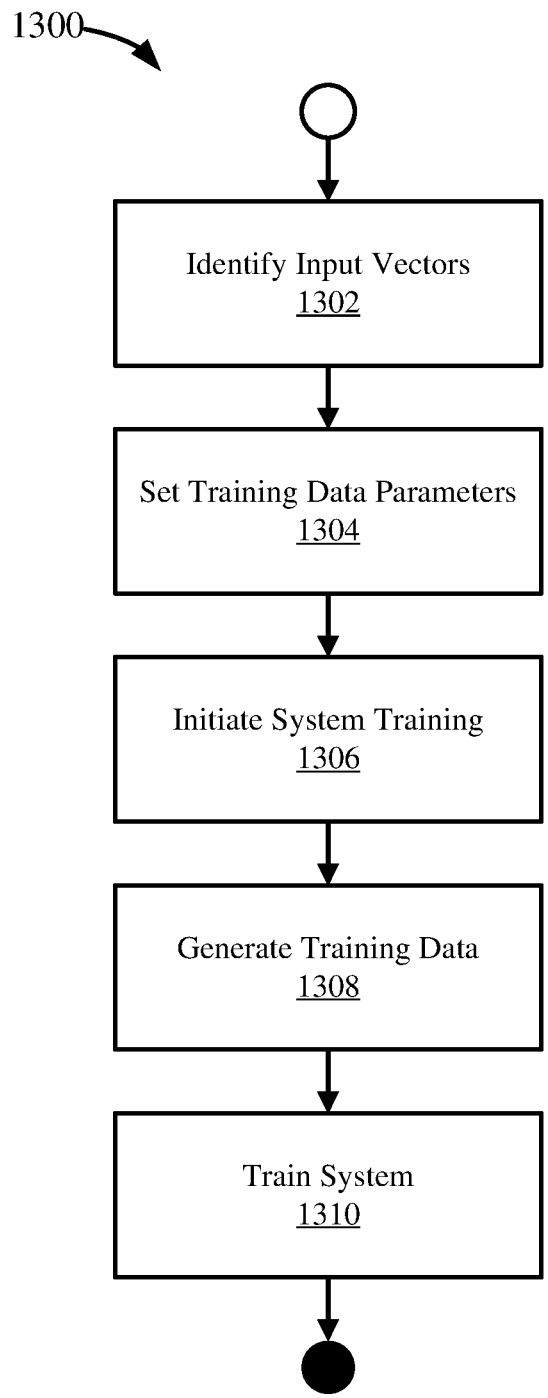
FIG. 13A is a flowchart illustrating a process for generating training data on-the-fly.

FIG. 13A is a flowchart illustrating a process 1300 for generating training data on-the-fly. Input vectors are identified at 1302. Identifying input vectors at 1302 may be similar to steps 1102, 1112, and 1132 as shown in FIGS. 2A-C. Generally, the input vectors are the input variables of the machine-learning algorithm, as described herein.

Training data parameters may be set at 1304. Setting training data parameters may include setting parameters for the identified input vectors. Such parameters may define or restrict the possible values of the input vectors, or may define relationships between the input vectors. Setting the training data parameters may include setting or defining a data model or statistical model for generating a given input vector, as described herein. Such parameters and functions may be similar to those shown in FIG. 11D.

Setting training data parameters may include determining a domain or environment for the generated training data, similar to step 1116 as shown in FIG. 11B. This can be considered to be defining the domain for the task to which the trained machine-learning algorithm will be put, and then further translating that definition to the specific input vectors and training data, as described herein.

Setting training data parameters may include building a training data foundation for the generated training data, similar to step 1118 as shown in FIG. 11B. The training data foundation may be a knowledge base or statistic foundation for the training data to be generated, as described herein.

Training the machine-learning system is initiated at 1306. This may include setting the target machine-learning algorithm into a state to receive inputs, process the inputs to generate outputs, then be updated or refined based on the generated output.

Training data may be generated at 1308. Generating training data at 1308 may be similar to step 1104, 1120, 1134, and 1140 as shown in FIGS. 2A-C. The training data may be generated using various parameters, definitions, or restrictions, on the values of the input vectors, or may be generated based on statistical models or distributes for the values of the input vectors, either individually or in groups, as described herein. The parameters or statistical models (or other input vector definitions) may be obtained, determined, or derived from the training parameters set at 1304.

The machine-learning algorithm or system is trained at 1310. Training the machine-learning system at 1310 may be similar to steps 1108, 1124, and 1142 as shown in FIGS. 2A-C. Generally, training the algorithm includes providing a single set of training data inputs to the machine-learning algorithm, running the algorithm with the generated training data inputs, obtaining the results of the algorithm processing the inputs, analyzing the results (such as comparing the results to expected results), and updating the algorithm based on the results, as described herein. In some embodiments, the algorithm may not be updated, but instead data values may be stored for use in the machine-learning algorithm (e.g. the results, or a portion of the results, may be stored and used later, as, for example, weights).

In one embodiment, the training data may be generated iteratively at 1308 and used to train the system at 1310 as each set of training data is generated. For example, a training data set of input vectors (and corresponding expected output, if used) may be generated at 1308, and immediately passed for use in training the system at 1310; then this is repeated for a desired number of iterations or episodes.

Figure 13B:
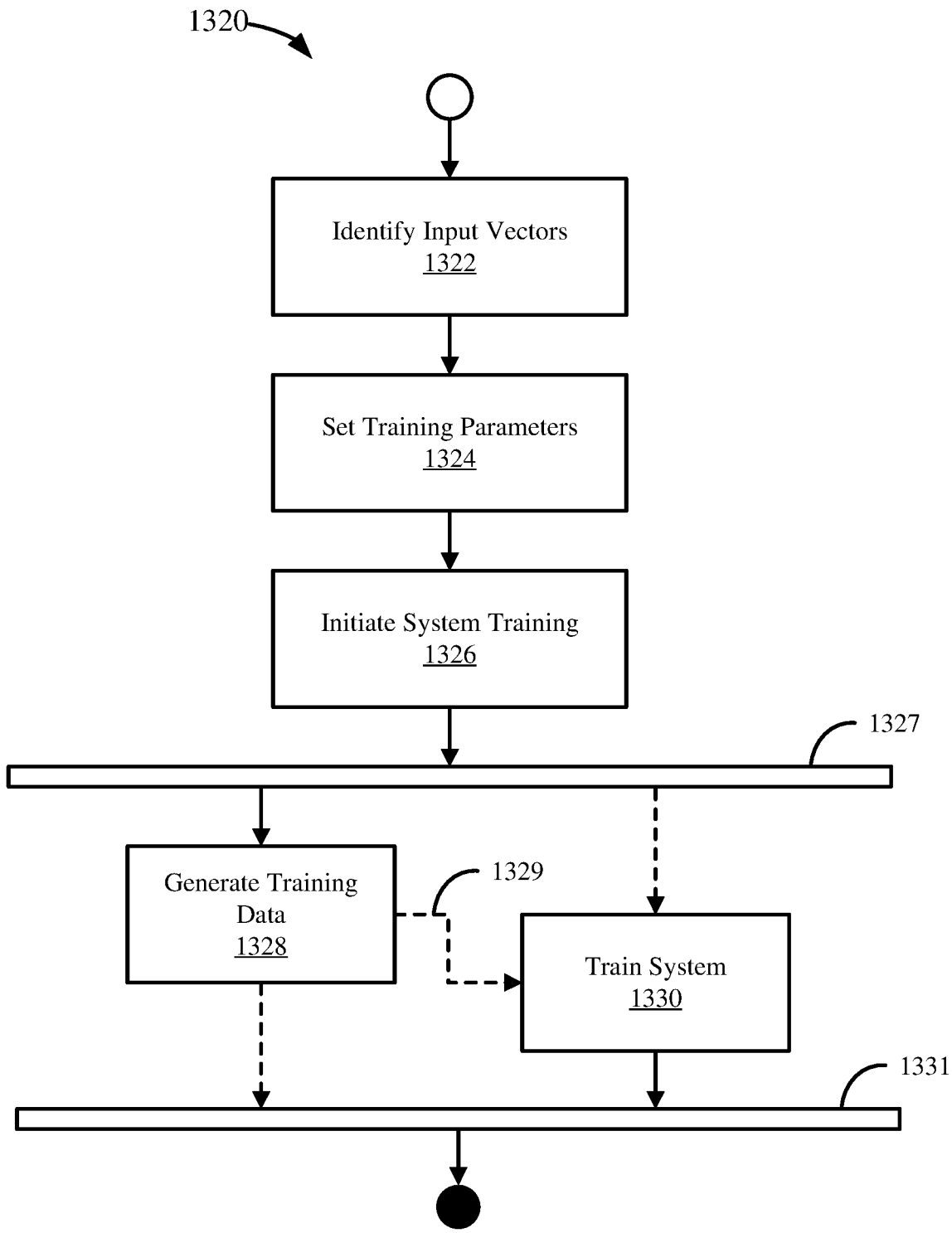
FIG. 13B is a flowchart illustrating a parallelized process for generating training data on-the-fly.

FIG. 13B is a flowchart illustrating a parallelized process 1320 for generating training data on-the-fly. Input vectors are identified at 1322. Identifying input vectors at 1322 may be similar to step 1302 as shown in FIG. 13A. Generally, the input vectors are the input variables of the machine-learning algorithm which the training data is intended to train, as described herein.

Training data parameters may be set at 1324. Setting training data parameters at 1324 may be similar to step 1304 as shown in FIG. 13A. Setting training data parameters may include setting parameters for the identified input vectors, as described herein.

Setting training data parameters may include determining a domain or environment for the generated training data, similar to step 1116 as shown in FIG. 11B. This can be considered to be defining the domain for the task to which the trained machine-learning algorithm will be put, and then further translating that definition to the specific input vectors and training data. Generally, defining the domain or environment should result in a restricted, or well-defined environment for the training data, which ultimately leads to a well-trained or adapted machine-learning algorithm for the particular task to which it is put. This may include defining values or ranges for the various input vectors of the training data, or weights for the various input vectors, or a hierarchy of the input vectors. This may also include adding or removing particular input vectors, or incorporating several input vectors together (such as through a representational model). Data defining the domain may be stored in local variables or data structures, a file, or the database created at 1114, or may be used to modify or limit the database.

Setting training data parameters may include building a training data foundation for the generated training data, similar to step 1118 as shown in FIG. 11B. The training data foundation may be a knowledge base or statistic foundation for the training data to be generated. This data foundation may be used to ensure that the generated training data is realistic training data, and so avoid noise, or sufficiently unrealistic training data that the data inaccurately trains a machine-learning algorithm when used. The data foundation may be built from varying sources of data, such as the data foundation sources 1010 shown in FIG. 10. The training data foundation may be sets of data which may be used to generate the training data, or may be statistical models or distributions of data which may be used in generating the training data. In some scenarios, the statistical models or distributions of data may be derived from one or more data sets being used to build the training data foundation. The degree of realism of the training data may be adjusted based on the use of data foundation sources and the degree or extent to which the training data foundation is built. In some embodiments, the training data foundation may be built based on the determined domain.

Training the machine-learning system is initiated at 1326, similar to step 1306 as shown in FIG. 13A. This may include setting the target machine-learning algorithm into a state to receive inputs, process the inputs to generate outputs, then be updated or refined based on the generated output. Once the system training is initiated at 1326, the training process may be parallelized at 1327.

Training data may be generated at 1328. Generating training data at 1328 may be similar to step 1308 as shown in FIG. 13A. Generating training data may include generating one or more sets of data, where each set of data has a value for each input vector identified at 1322, as described herein.

As a given training set or scenario is generated at 1328, it is then provided 1329 to train the machine-learning system at 1330. The machine-learning algorithm or system is trained at 1330. Training the machine-learning system at 1330 may be similar to step 1310 as shown in FIG. 13A. Generally, training the algorithm includes providing a single set of training data inputs to the machine-learning algorithm, running the algorithm with the generated training data inputs, obtaining the results of the algorithm processing the inputs, analyzing the results (such as comparing the results to expected results), and updating the algorithm based on the results, as described herein. In other embodiments, the algorithm may not be updated, but results, or a portion of the results, stored for use by the algorithm the next time it is executed. This process may be repeated for all generated training data scenarios as part of training the machine-learning algorithm. Training may continue until the output from the algorithm meets a certain threshold, meets a threshold for a given number of training cycles, or has processed for a given number of training cycles or episodes (e.g. a given number of training data scenarios may be generated). For example, meeting a threshold may include comparing the differences between output values and expected values to the threshold, or determining when output values for similar inputs converge within a threshold variance, or so on. Once the requisite number of training data sets are generated 1328 and used to train the system 1330, the parallelization is closed at 1331.

Example 21—Training Data Generator Environments

Figure 14A:
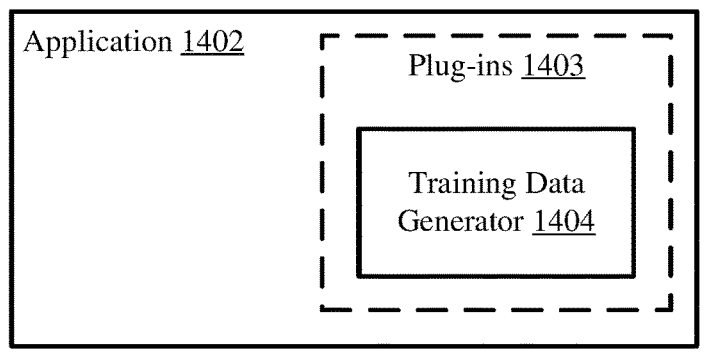
FIG. 14A is a schematic diagram depicting an application environment for a training data generator.

FIG. 14A is a schematic diagram depicting an application environment for a training data generator 1404, which may provide artificial training data as described herein. An application 1402, such as a software application running in a computing environment, may have one or more plug-ins 1403 (or add-ins or other software extensions to programs) that add functionality to, or otherwise enhance, the application. The training data generator 1404 may be integrated with the application 1402; for example, the training data generator may be integrated as a plug-in. The training data generator 1404 may add functionality to the application 1402 for generating artificial training data, which may be used for training a machine-learning algorithm. For example, the application 1402 may be may be a training or test system for a machine-learning algorithm, and the training data generator may be integrated with the training system to provide or generate artificial training data.

Figure 14B:
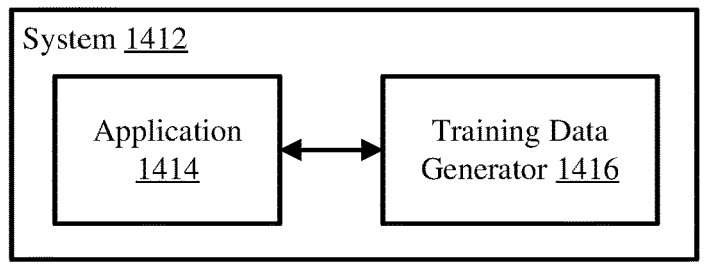
FIG. 14B is a schematic diagram depicting a system environment for a training data generator.

FIG. 14B is a schematic diagram depicting a system environment for a training data generator 1416, which may provide artificial training data as described herein. The training data generator 1416 may be integrated with a computer system 1412. The computer system 1412 may include an operating system, or otherwise be a software platform, and the training data generator 1416 may be an application or service running in the operating system or platform, or the training data generator may be integrated within the operating system or platform as a service or functionality provided through the operating system or platform. The system 1412 may be a server or other networked computer or file system. Additionally or alternatively, the training data generator 1416 may communicate with and provide or generate artificial training data, as described herein, to one or more applications 1414, such as a training or testing application, in the system 1412.

Figure 14C:
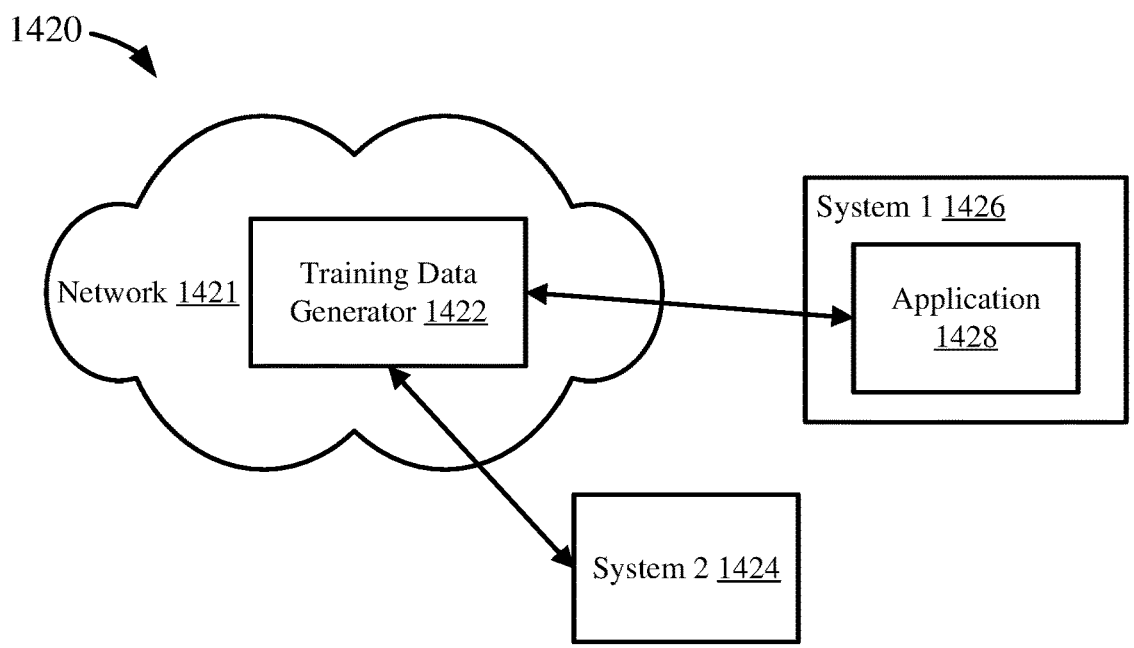
FIG. 14C is a schematic diagram depicting a network environment for a training data generator.

FIG. 14C is a schematic diagram depicting a network environment 1420 for a training data generator 1422, which may provide artificial training data as described herein. The training data generator 1422 may be available on a network 1421, or integrated with a system (such as from FIG. 14B) on a network. Such a network 1421 may be a cloud network or a local network. The training data generator 1422 may be available as a service to other systems on the network 1421 or that have access to the network (e.g., may be on-demand software or SaaS). For example, system 2 1424 may be part of, or have access to, the network 1421, and so can utilize training data generation functionality from the training data generator 1422. Additionally, system 1 1426, which may be part of or have access to the network 1421, may have one or more applications, such as application 1428, that may utilize training data generation functionality from the training data generator 1422.

In these ways, the training data generator 1404, 1416, 1422 may be integrated into an application, a system, or a network, to provide artificial training data generation as described herein.

Example 22—Resource Provisioning Example

FIG. 15A-1 depicts an example set of input and output vectors 1500 for training data to train a machine-learning system for computing resource provisioning. Three input vectors 1501, 1502, 1504 and one output vector 1503 may be defined for a system for determining resource provisioning for resource request jobs. A single set of these vectors 1500 generally constitutes a single job. The job vector 1501 may include quantities for the resources requested, with each location in the vector representing a specific or known resource; in another embodiment, the vector may include identifiers for the one or more resources requested.

The availability vector 1502 may include the quantities of each resource available at known sources (e.g. servers or warehouses). The cost vector 1504 may include the cost of obtaining the resource from each of the known sources (or, as another example, distance of a purchasing customer to each of the known warehouse sources). The consignment vector 1503 may contain the output from the machine-learning system, which may be the quantity of resources provisioned from the known sources. In some embodiments, the output vector 1503 may be used to store the expected output from the training process; in other embodiments, the output vector may be used to store the actual output.

FIG. 15A-2 depicts an example set of generated input and output vectors 1505 of training data to train a machine-learning system for computing resource provisioning. For this example set of training data, the job vector 1506 may have a request quantity of one for the first resource requested, two for the second resource, and one for the third resource. The availability vector 1507 may have, for the first source or location, 100 units of the first resource, 50 units of the second resource, and 100 units of the third resource; the next row represents the second source or location and so on. The cost vector 1509 may have a cost from the requestor to the first source of 50 (e.g. latency or network hops, or kilometers), 250 to the second source, and 500 to the third source. The output consignment vector 1508 may be set to all zero in this example, to represent no expected output (e.g. act as a vector for holding the actual output); in another example, the consignment vector may have other values, such as 1, 2, 1 across the top row, which may represent the quantity of requested resources to be provided from the first source.

Figure 15B:
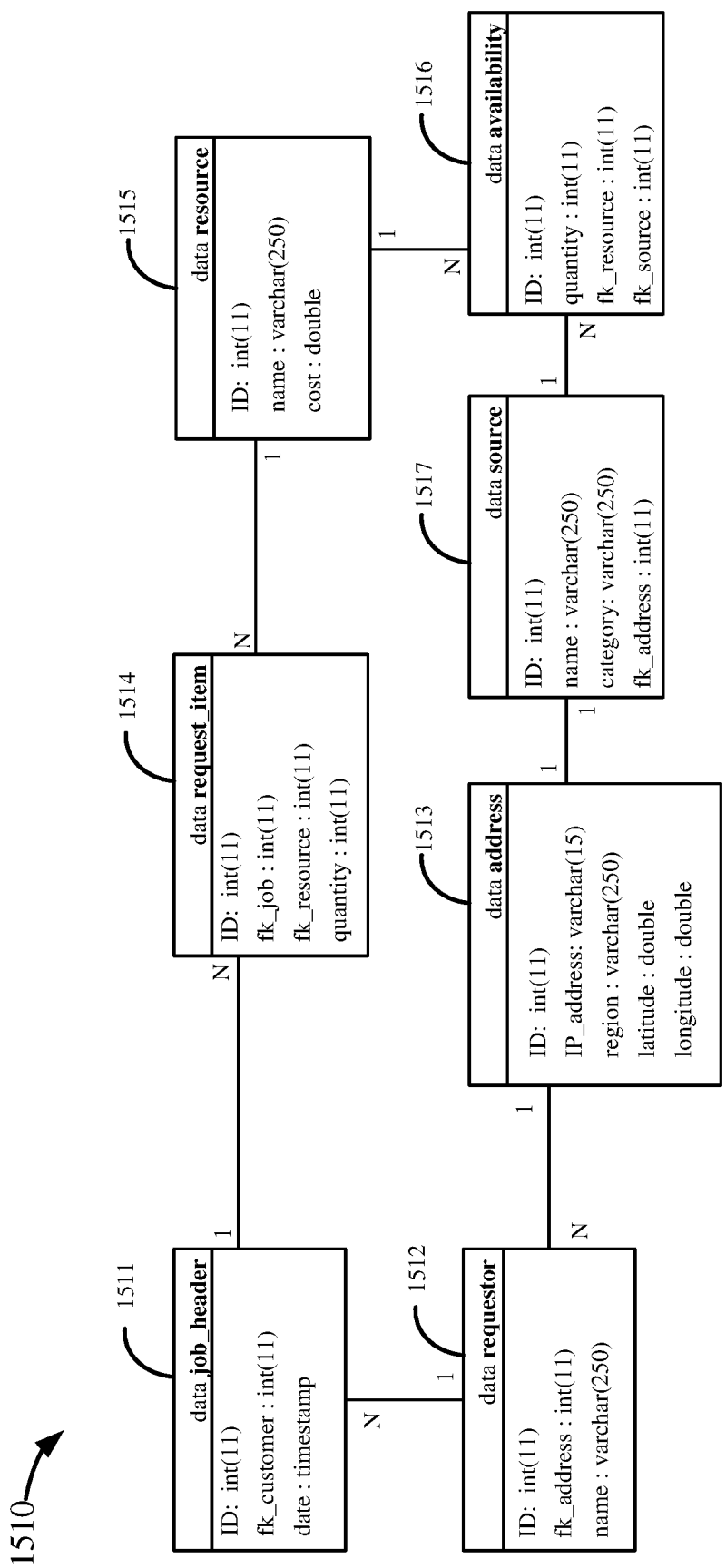
FIG. 15B depicts an example entity-relationship diagram for a database for storing generated artificial training data.

FIG. 15B depicts an example entity-relationship (ER) diagram 1510 for a database for storing generated artificial training data for a resource provisioning machine-learning algorithm. A database based on the example ER diagram 1510 may be created as at step 1114 and used as part of process 1110, as shown in FIG. 11B and described herein. Such a database may store artificial training data based on the ER diagram 1510. Further, such a database may have separate tables for storing separate generated training data objects, which may be data for a given input vector, and for storing training data scenarios, which may be a collection (e.g. a vector) of various training data objects for all input vectors (e.g. one cycle of training/testing).

For example, a database for artificial resource provisioning training data may store, such as in a table, one or more generated jobs 1511. Such jobs may be training data scenarios, and each job may be a job input vector (e.g. each row represents one job, which represents a single job vector which may be input to the machine-learning system).

The job 1511 may be related to a requestor 1512, thus, the database may store information for one or more generated requestors, such as in a table. A requestor may be an input vector, or may relate to an input vector, or both. In general, such a requestor may be a training data object, for use in generating or executing one or more training data scenarios (e.g. jobs). The requestor 1512 may each have an address 1513, which may be stored in a separate table.

The job 1511 may relate to one or more requested items or resources 1514, which may be stored in a table. Such items may be part of the job input vector, and so part of a given training data scenario. The requested items 1514 may relate to resources (e.g. that are available for allocation or purchase) 1515, which may be stored in a table. The resources may relate to the job input vector, and may be generated training data objects from which given training data scenarios are built. The resources 1515 may also have an availability 1516, which may relate to a source for the resource(s) 1517. The source (e.g. server or warehouse) 1517 may have an address 1513, similar to a requestor 1512. The availability 1516 may be a training data object that relates to the availability input vector, in conjunction with the source 1517 training data objects. Thus, several training data objects may be used to form an input vector for a particular training data scenario (e.g. set of input vectors for a single, complete cycle or episode).

FIG. 15C depicts example code 1520 for setting parameters for generating training data. The code 1520 may include a special parameter class, a database table, or other data structure, which may in turn include the parameters. The parameters may provide boundaries for the training data generation. The parameters listed and set may be based on the determined domain for the training data. The parameters may provide a minimum or a maximum value for different training data input vectors. Other values of the parameters may be determined based on information from data foundation sources. For example, some parameters may be set based on internally available data, such as a database detailing resource locations or warehouses available, or resource availability or total inventory capacity. In other cases, some parameters may be set based on externally available data, such as network distance or shipping information for maximum shipping distance. In still other cases, some parameters may be set based on historical data, such as identified standard ranges or values for given variables (such as average number of items per job), which may be set to mimic the historical data or exceed or expand on the historical data. The parameter values may be set within the code itself, or may be read in from a file, registry, or database, or may be obtained through a user interface.

FIG. 15D depicts example code 1530 for a training data generator, and a call to the training data generator. A training data generator may be implemented as a class, a function, or another processing structure. In some embodiments, a single call to the training data generator may return a single set of training data (i.e. complete data for each input vector to the machine learning algorithm). In other embodiments, a single call to the training data generator may return data for a single training data object (i.e. data for one input vector, such as data or attributes for one warehouse). In still other embodiments, the training data generator may generate multiple sets of training data from a single call. In some embodiments, the training data generator may be a class instantiated as an object before it generates training data. In such cases, the training data generator may be instantiated with the parameters or one or more parameter classes. The training data generator may be called from another program, service, or system, or may be accessed through a user interface.

In some embodiments, the training data generator may use a seed value for generating training data, and may also use an input for the number of training data sets to generate. In cases where a seed value is not used for generating training data, the training data generator generally produces different data sets when it is called, whereas when called with a seed value, the training data generator generally produces similar data sets. A seed value may be used in generating training data to test or ensure that training data is generated differently based on changes to the parameters or other data-defining inputs, such as particular algorithms for generating data for a given input vector.

FIG. 15E depicts example code 1540 for defining a training data generator class. FIG. 15F depicts example code 1550 for defining a process or method for generating the training data. The method depicted in 1550 may be implemented within, or referenced by, the training generator class in 1540. Generally, training data consists of multiple training sets of input vectors, such as provisioning requests (e.g. resource request jobs) in the example. A single provisioning request may be a set of training data or a dictionary object, of which a specified number may be generated by the example code 1550. In some cases, output training data may be a vector of training data sets, which themselves may be a collection or one or more input vectors. Thus, the collection or vector of training data sets may have one or more sourcing requests, each of which may be one cycle or episode of training/testing (e.g. data for the input vectors to the machine-learning system). For the resource provisioning example, this means a resource request job may be a dictionary object or vector of the job vector, the availability vector, the cost vector, and the consignment vector, which generally is a single set of training data (one training cycle). The number of such dictionary objects or vectors may be created by a given number of calls to the training data generator (one set for one call) or by an input number to the training data generator (one call requesting an input number of training data sets).

FIG. 15G depicts example code 1560 for implementing and executing a training data generator for resource provisioning jobs. A sourcing request may be an object of the ProvisioningRequest class, which may initialize the input vectors and generator resource provisioning jobs, as well as the resource sources. The delivery vector in example code 1560 may be the consignment vector described herein. The example code 1560 illustrates initializing the training data input vectors and generating each of the input vectors (e.g. jobs, sources, availability, costs) based on the training data parameters. In some cases, the consignment vector (e.g. an output vector) may have expected training data generated and stored in it; in other cases, no data may be generated for the consignment vector (e.g. the vector will remain unchanged or may be initialized or set to zero or null).

Example 23—Additional Training Data Generation Processes

Figure 16A:
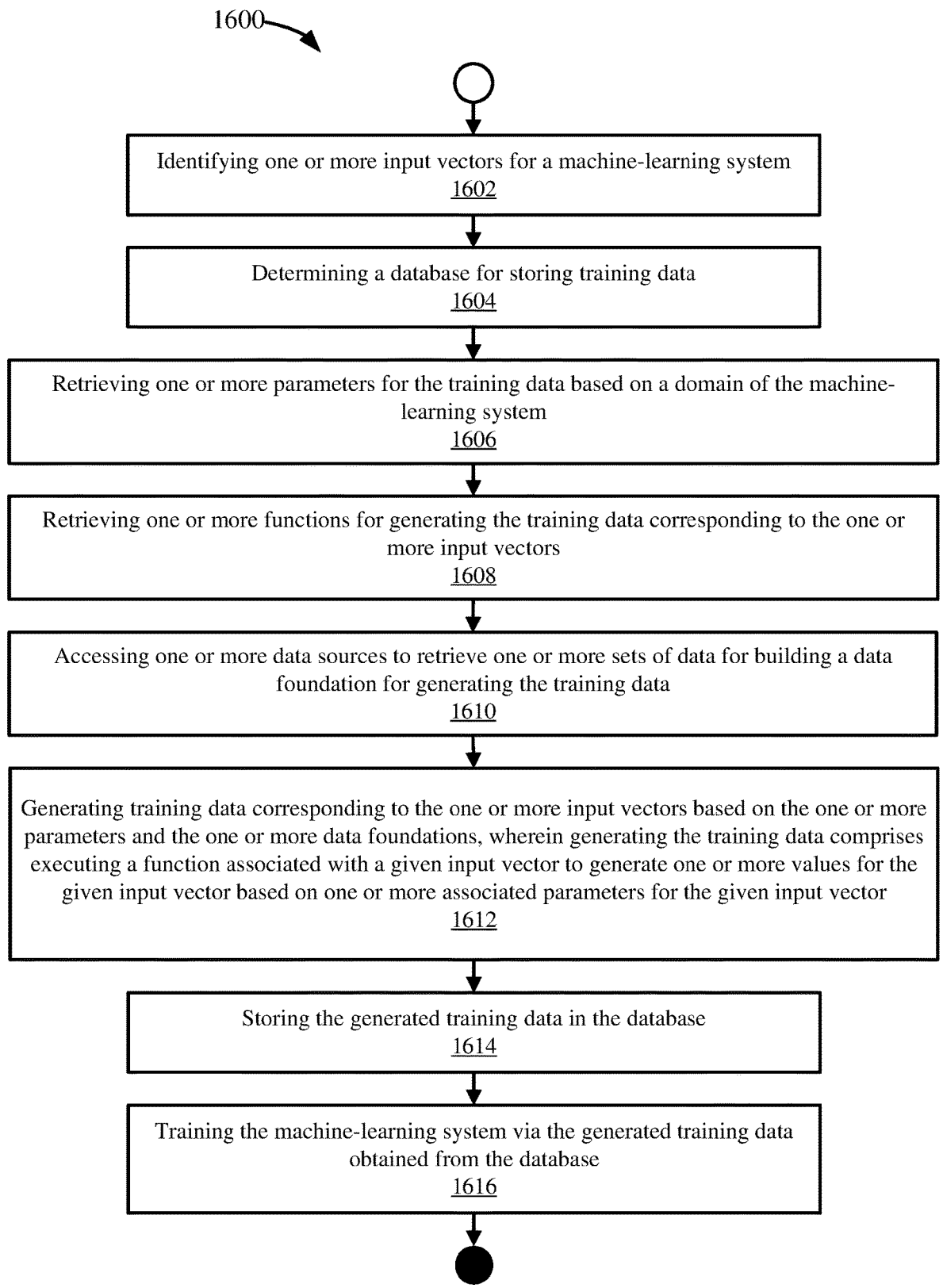
FIG. 16A is a flowchart illustrating a process for machine-learning using artificially generated training data.

FIG. 16A is a flowchart illustrating a process 1600 for machine-learning using artificially generated training data. One or more input vectors for a machine-learning system may be identified at 1602. A database for storing training data may be determined at 1604. One or more parameters for the training data based on a domain of the machine-learning system may be retrieved at 1606. One or more functions for generating the training data corresponding to the one or more input vectors may be retrieved at 1608. One or more data sources may be accessed to retrieve one or more sets of data for building a data foundation for generating the training data at 1610. Training data corresponding to the one or more input vectors may be generated based on the one or more parameters and the one or more data foundations at 1612. Generating the training data may include executing a function associated with a given input vector to generate one or more values for the given input vector based on one or more associated parameters for the given input vector. The generated training data may be stored in the database at 1614. The machine-learning system may be trained via the generated training data obtained from the database at 1616.

Figure 16B:
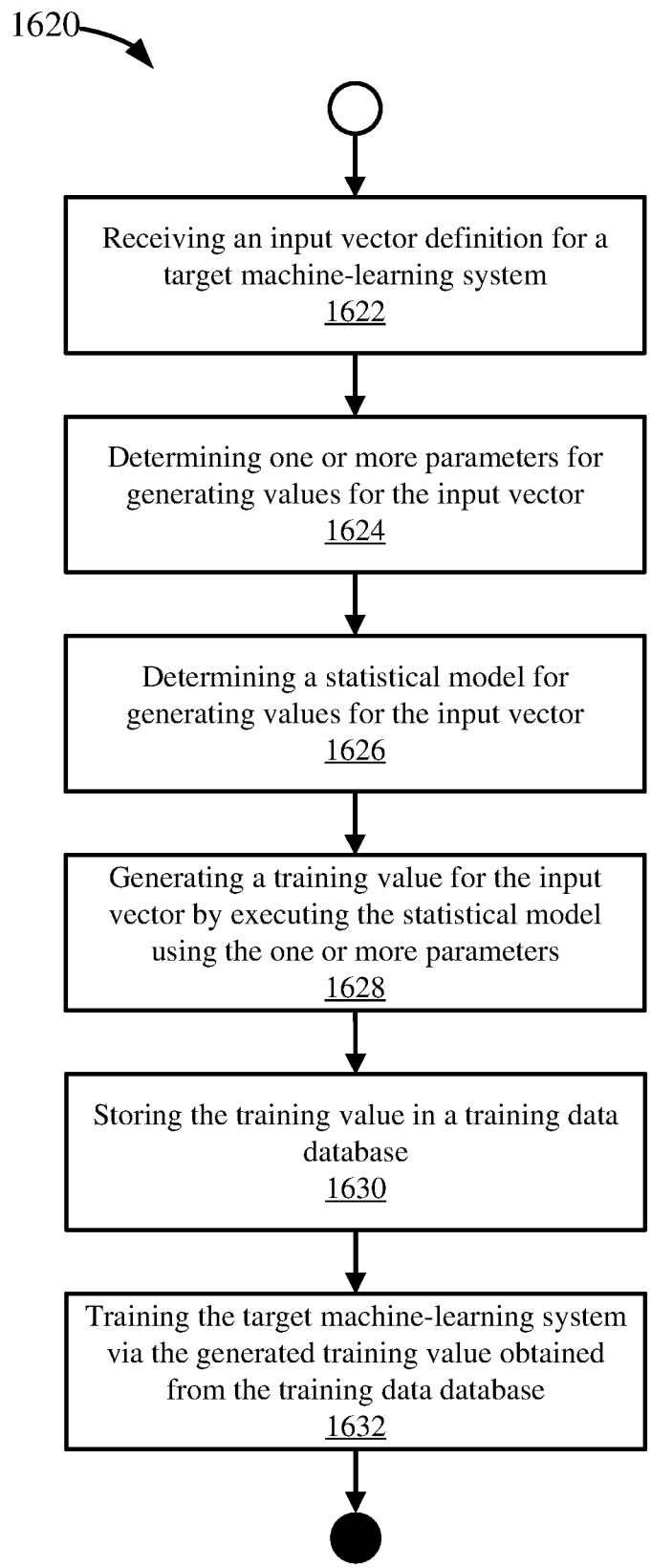
FIG. 16B is a flowchart illustrating a process for generating artificial training data.

FIG. 16B is a flowchart illustrating a process 1620 for generating artificial training data. An input vector definition for a target machine-learning system may be received at 1622. One or more parameters for generating values for the input vector may be determined at 1624. A statistical model for generating values for the input vector may be determined at 1626. A training value for the input vector may be generated by executing the statistical model using the one or more parameters at 1628. The training value may be stored in a training data database at 1630. The target machine-learning system may be trained via the generated training value obtained from the training data database at 1632.

Figure 16C:
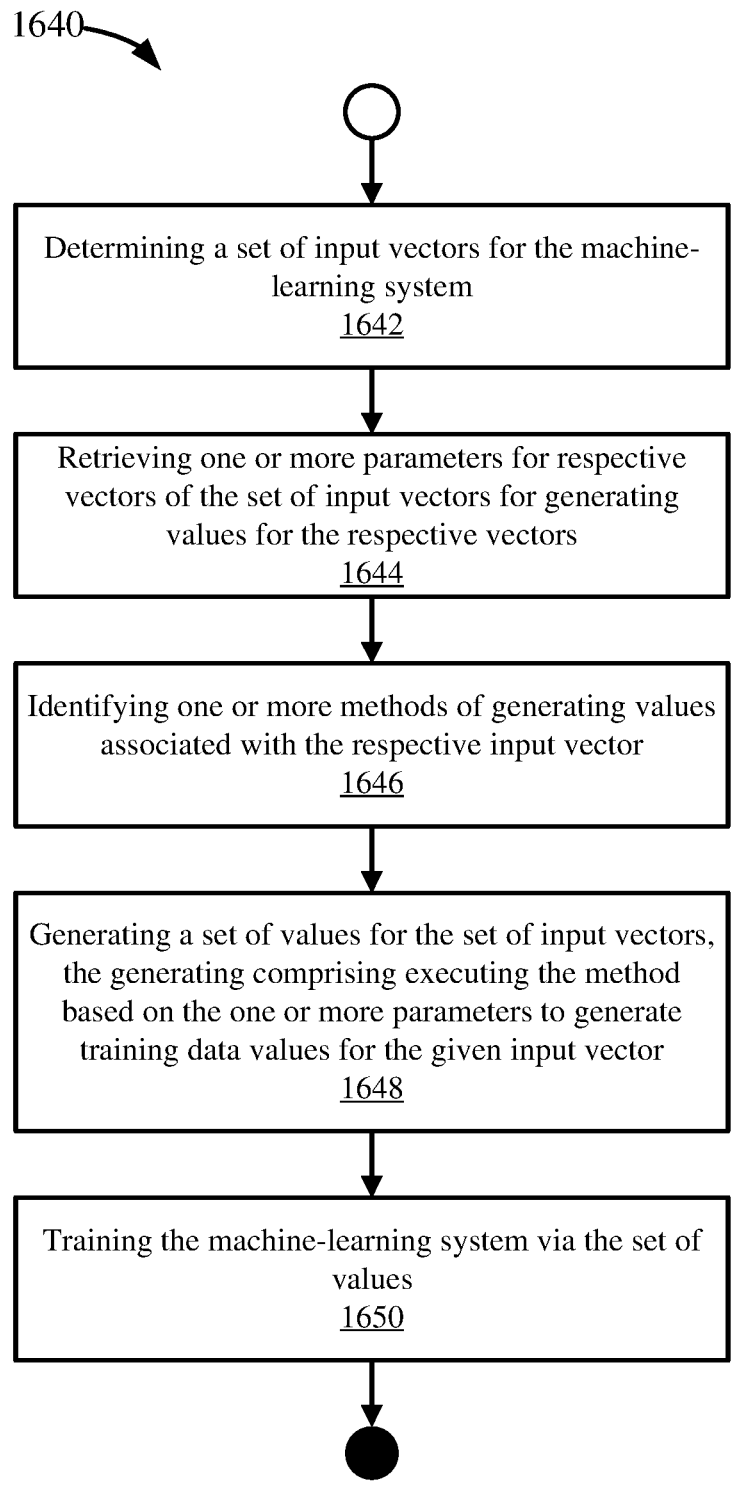
FIG. 16C is a flowchart illustrating a process for training a machine-learning system using artificial training data.

FIG. 16C is a flowchart illustrating a process 1640 for training a machine-learning system using artificial training data. A set of input vectors for the machine-learning system may be detected at 1642. One or more parameters for respective vectors of the set of input vectors for generating values for the respective vectors may be retrieved at 1644. One or more methods of generating values associated with the respective input vector may be identified at 1646. A set of values for the set of input vectors may be generated at 1648. Generating the one or more values may include executing the method based on the one or more parameters to generate training data values for the given input vector. The machine-learning system may be trained via the set of values at 1650.

Example 24—Computing Systems

Figure 17:
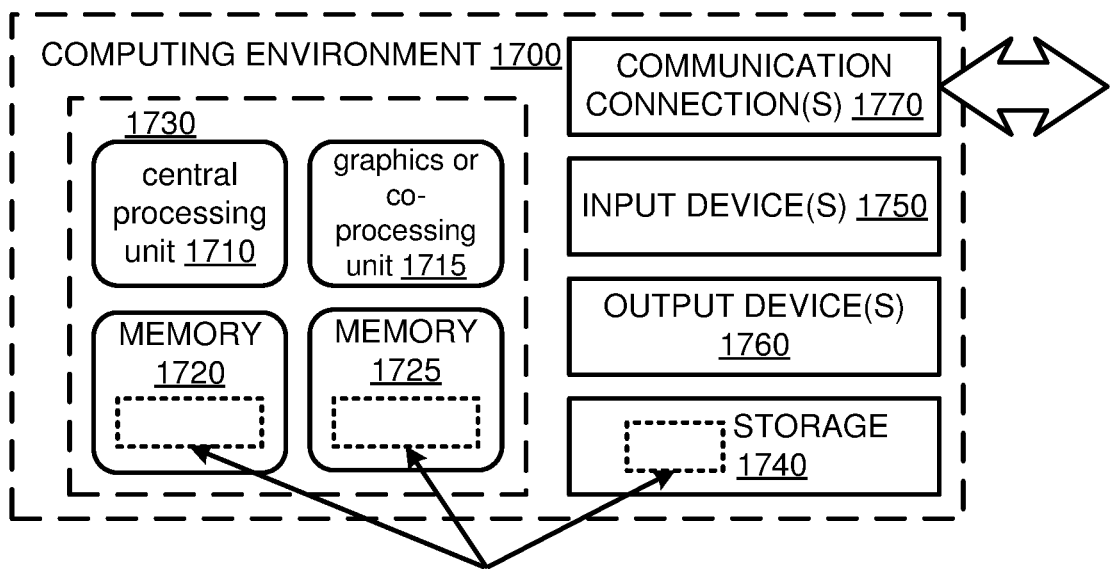
FIG. 17 is a diagram of an example computing system in which described embodiments can be implemented.

FIG. 17 depicts a generalized example of a suitable computing system 1700 in which the described innovations may be implemented. The computing system 1700 is not intended to suggest any limitation as to scope of use or functionality of the present disclosure, as the innovations may be implemented in diverse general-purpose or special-purpose computing systems.

With reference to FIG. 17, the computing system 1700 includes one or more processing units 1710, 1715 and memory 1720, 1725. In FIG. 17, this basic configuration 1730 is included within a dashed line. The processing units 1710, 1715 execute computer-executable instructions, such as for implementing components of the processes of FIGS. 2A-E, 3A-B, 4B, 7B, and 9A-C, the data structures of FIGS. 1A-B and 7A, or the systems of FIGS. 1, 4A, 5A-B, 6A-D, and 8A-C. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 17 shows a central processing unit 1710 as well as a graphics processing unit or co-processing unit 1715. The tangible memory 1720, 1725 may be volatile memory (e.g., registers, cache, RAM), non-volatile memory (e.g., ROM, EEPROM, flash memory, etc.), or some combination of the two, accessible by the processing unit(s) 1710, 1715. The memory 1720, 1725 stores software 1790 implementing one or more innovations described herein, in the form of computer-executable instructions suitable for execution by the processing unit(s) 1710, 1715. The memory 1720, 1725, may also store settings or settings characteristics, such as for the data structures in FIGS. 1A-B and 7A, systems in FIGS. 1, 4A, 5A-B, 6A-D, and 8A-C, or the steps of the processes shown in FIGS. 2A-E, 3A-B, 4B, 7B, and 9A-C.

A computing system 1700 may have additional features. For example, the computing system 1700 includes storage 1740, one or more input devices 1750, one or more output devices 1760, and one or more communication connections 1780. An interconnection mechanism (not shown) such as a bus, controller, or network interconnects the components of the computing system 1700. Typically, operating system software (not shown) provides an operating environment for other software executing in the computing system 1700, and coordinates activities of the components of the computing system 1700.

The tangible storage 1740 may be removable or non-removable, and includes magnetic disks, magnetic tapes or cassettes, CD-ROMs, DVDs, or any other medium which can be used to store information in a non-transitory way and which can be accessed within the computing system 1700. The storage 1740 stores instructions for the software 1790 implementing one or more innovations described herein.

The input device(s) 1750 may be a touch input device such as a keyboard, mouse, pen, or trackball, a voice input device, a scanning device, or another device that provides input to the computing system 1700. The output device(s) 1760 may be a display, printer, speaker, CD-writer, or another device that provides output from the computing system 1700.

The communication connection(s) 1780 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules or components include routines, programs, libraries, objects, classes, components, data structures, etc., that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

In various examples described herein, a module (e.g., component or engine) can be "coded" to perform certain operations or provide certain functionality, indicating that computer-executable instructions for the module can be executed to perform such operations, cause such operations to be performed, or to otherwise provide such functionality. Although functionality described with respect to a software component, module, or engine can be carried out as a discrete software unit (e.g., program, function, class method), it need not be implemented as a discrete unit. That is, the functionality can be incorporated into a larger or more general purpose program, such as one or more lines of code in a larger or general purpose program.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 25—Cloud Computing Environment

Figure 18:
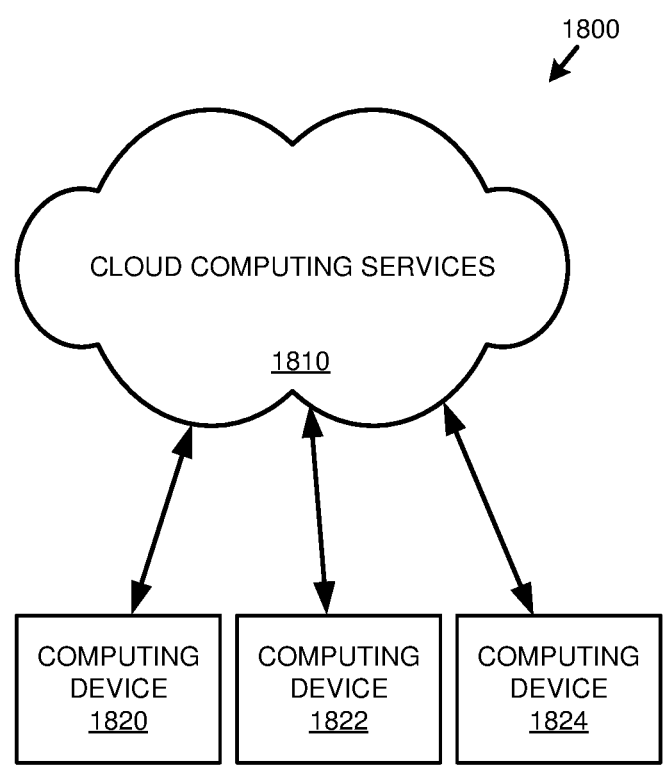
FIG. 18 is an example cloud computing environment that can be used in conjunction with the technologies described herein.

FIG. 18 depicts an example cloud computing environment 1800 in which the described technologies can be implemented. The cloud computing environment 1800 comprises cloud computing services 1810. The cloud computing services 1810 can comprise various types of cloud computing resources, such as computer servers, data storage repositories, networking resources, etc. The cloud computing services 1810 can be centrally located (e.g., provided by a data center of a business or organization) or distributed (e.g., provided by various computing resources located at different locations, such as different data centers and/or located in different cities or countries).

The cloud computing services 1810 are utilized by various types of computing devices (e.g., client computing devices), such as computing devices 1820, 1822, and 1824. For example, the computing devices (e.g., 1820, 1822, and 1824) can be computers (e.g., desktop or laptop computers), mobile devices (e.g., tablet computers or smart phones), or other types of computing devices. For example, the computing devices (e.g., 1820, 1822, and 1824) can utilize the cloud computing services 1810 to perform computing operations (e.g., data processing, data storage, and the like).

Example 26—Implementations

Although the operations of some of the disclosed methods are described in a particular, sequential order for convenient presentation, it should be understood that this manner of description encompasses rearrangement, unless a particular ordering is required by specific language set forth. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media, such as tangible, non-transitory computer-readable storage media, and executed on a computing device (e.g., any available computing device, including smart phones or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example, and with reference to FIG. 17, computer-readable storage media include memory 1720 and 1725, and storage 1740. The term computer-readable storage media does not include signals and carrier waves. In addition, the term computer-readable storage media does not include communication connections (e.g., 1780).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. It should be understood that the disclosed technology is not limited to any specific computer language or program. For instance, the disclosed technology can be implemented by software written in C++, Java, Perl, JavaScript, Python, Ruby, ABAP, SQL, Adobe Flash, or any other suitable programming language, or, in some examples, markup languages such as html or XML, or combinations of suitable programming languages and markup languages. Likewise, the disclosed technology is not limited to any particular computer or type of hardware.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the invention is defined by the following claims. We therefore claim as our invention all that comes within the scope and spirit of these claims.

What is claimed is:

1. A computing system comprising:
one or more memories;
one or more hardware processing units coupled to the one or more memories; and
one or more computer readable storage media storing computer-executable instructions that, when executed, cause the computing system to perform operations comprising:
training a machine-learning dynamic provisioning agent, wherein the training comprises:
generating a set of training data input vectors representing a training job, wherein the set of training data input vectors comprises a training job vector having one or more items;
determining a set of sequential states based on the set of training data input vectors;
determining a set of available actions based on the set of training data input vectors;
initializing a provisioning state based on the set of sequential states; and,
sequentially provisioning the one or more items of the training job vector, wherein the sequentially provisioning comprises:
selecting an action from the set of available actions;
calculating a score for the action based on a scoring function;
updating the machine-learning dynamic provisioning agent with the calculated score corresponding to the selected action and the provisioning state; and
updating the provisioning state to a next state from the set of sequential states; and
provisioning a production job via the trained machine-learning dynamic provisioning agent, wherein the provisioning a production job comprises:
receiving an input vector representing the production job having one or more job components;
obtaining one or more additional data vectors representing additional production job data;
for the one or more job components respectively, calculating one or more action values corresponding to one or more provisioning options based on the one or more additional data vectors;
for the one or more job components respectively, selecting one or more provisioning options for the respective one or more job components based on the corresponding one or more action values;
aggregating the one or more selected provisioning options corresponding to the respective one or more job components; and
providing the aggregated one or more selected provisioning options.

2. The computing system of claim 1, the operations further comprising:
executing on the selected one or more provisioning options to obtain the one or more respective job components.

3. The computing system of claim 1, wherein the machine-learning dynamic provisioning agent comprises a neural network.

4. The computing system of claim 1, wherein the machine-learning dynamic provisioning agent comprises a Q-matrix.

5. The computing system of claim 1, wherein selecting the one or more provisioning options comprises executing a Monte Carlo tree search based on the one or more action values.

6. A method, implemented in a computing system comprising at least one hardware processor and at least one memory coupled to the at least one hardware processor, comprising:
training a machine-learning dynamic provisioning agent, wherein the training comprises:
generating a set of training data input vectors representing a training job, wherein the set of training data input vectors comprises a training job vector having one or more items;
determining a set of sequential states based on the set of training data input vectors;
determining a set of available actions based on the set of training data input vectors;
initializing a provisioning state based on the set of sequential states; and,
sequentially provisioning the one or more items of the training job vector, wherein the sequentially provisioning comprises:
selecting an action from the set of available actions;
calculating a score for the action based on a scoring function;

updating the machine-learning dynamic provisioning agent with the calculated score corresponding to the selected action and the provisioning state; and updating the provisioning state to a next state from the set of sequential states; and provisioning a production job via the trained machine-learning dynamic provisioning agent, wherein the provisioning a production job comprises:

receiving an input vector representing the production job having one or more job components;

obtaining one or more additional data vectors representing additional production job data;

for the one or more job components respectively, calculating one or more action values corresponding to one or more provisioning options based on the one or more additional data vectors;

for the one or more job components respectively, selecting one or more provisioning options for the respective one or more job components based on the corresponding one or more action values;

aggregating the one or more selected provisioning options corresponding to the respective one or more job components; and providing the aggregated one or more selected provisioning options.

7. The method of claim 6, further comprising:

executing on the selected one or more provisioning options to obtain the one or more respective job components.

8. The method of claim 6, wherein the machine-learning dynamic provisioning agent comprises a neural network.

9. The method of claim 6, wherein the machine-learning dynamic provisioning agent comprises a Q-matrix.

10. The method of claim 6, wherein selecting the one or more provisioning options comprises executing a Monte Carlo tree search based on the one or more action values.

11. One or more non-transitory computer readable storage media comprising:

computer-executable instructions that, when executed by a computing system comprising at least one hardware processor and at least one memory coupled to the at least one hardware processor, cause the computing system to train a machine-learning dynamic provisioning agent, wherein the computer-executable instructions that cause the computing system to train the machine-learning dynamic provisioning agent comprise:

computer-executable instructions that, when executed by the computing system, cause the computing system to generate a set of training data input vectors representing a training job, wherein the set of training data input vectors comprises a training job vector having one or more items;

computer-executable instructions that, when executed by the computing system, cause the computing system to determine a set of sequential states based on the set of training data input vectors;

computer-executable instructions that, when executed by the computing system, cause the computing system to determine a set of available actions based on the set of training data input vectors;

computer-executable instructions that, when executed by the computing system, cause the computing system to initialize a provisioning state based on the set of sequential states; and, computer-executable instructions that, when executed by the computing system, cause the computing system to sequentially provision the one or more items of the training job vector, wherein the computer-executable instructions that cause the computing system to sequentially provision the one or more items of the training job vector comprise:

computer-executable instructions that, when executed by the computing system, cause the computing system to select an action from the set of available actions;

computer-executable instructions that, when executed by the computing system, cause the computing system to calculate a score for the action based on a scoring function;

computer-executable instructions that, when executed by the computing system, cause the computing system to update the machine-learning dynamic provisioning agent with the calculated score corresponding to the selected action and the provisioning state; and computer-executable instructions that, when executed by the computing system, cause the computing system to update the provisioning state to a next state from the set of sequential states; and computer-executable instructions that, when executed by the computing system, cause the computing system to provision a production job via the trained machine-learning dynamic provisioning agent, wherein the computer-executable instructions that cause the computing system to provision a production job comprise:

computer-executable instructions that, when executed by the computing system, cause the computing system to receive an input vector representing the production job having one or more job components;

computer-executable instructions that, when executed by the computing system, cause the computing system to obtain one or more additional data vectors representing additional production job data;

computer-executable instructions that, when executed by the computing system, cause the computing system to, for the one or more job components respectively, calculate one or more action values corresponding to one or more provisioning options based on the one or more additional data vectors;

computer-executable instructions that, when executed by the computing system, cause the computing system to, for the one or more job components respectively, select one or more provisioning options for the respective one or more job components based on the corresponding one or more action values;

computer-executable instructions that, when executed by the computing system, cause the computing system to aggregate the one or more selected provisioning options corresponding to the respective one or more job components; and computer-executable instructions that, when executed by the computing system, cause the computing system to provide the aggregated one or more selected provisioning options.

12. The one or more non-transitory computer readable storage media of claim 11, wherein the computer-executable instructions that cause the computing system to provision a production job further comprise:

Computer-executable instructions that, when executed by the computing system, cause the computing system to execute on the one or more selected provisioning options to obtain the one or more respective job components.

13. The one or more non-transitory computer readable storage media of claim 11, wherein the machine-learning dynamic provisioning agent comprises a neural network.

14. The one or more non-transitory computer readable storage media of claim 11, wherein the machine-learning dynamic provisioning agent comprises a Q-matrix.

15. The one or more non-transitory computer readable storage media of claim 11, wherein selecting the one or more provisioning options comprises executing a Monte Carlo tree search based on the one or more action values.

* * * * *